United States Patent [19]
Pickett

[11] Patent Number: 5,197,024
[45] Date of Patent: Mar. 23, 1993

[54] METHOD AND APPARATUS FOR EXPONENTIAL/LOGARITHMIC COMPUTATION

[76] Inventor: Lester C. Pickett, 178 Centre, Suite 21, Mountain View, Calif. 94041

[21] Appl. No.: 863,218

[22] Filed: Apr. 3, 1992

Related U.S. Application Data

[63] Continuation of Ser. No. 598,185, Oct. 12, 1990, abandoned, which is a continuation of Ser. No. 366,080, Jun. 14, 1989, abandoned.

[51] Int. Cl.$^5$ ............................................. G06F 7/38
[52] U.S. Cl. .................................................. 364/748.5
[58] Field of Search ................ 364/748.5, 748, 736, 364/736.5, 747

[56] References Cited

U.S. PATENT DOCUMENTS

| | | | |
|---|---|---|---|
| 3,099,742 | 7/1963 | Bryne et al. | 235/150 |
| 3,194,951 | 7/1965 | Shaefer | 235/154 |
| 3,402,285 | 9/1964 | Wang | 235/160 |
| 3,436,533 | 4/1969 | Moore et al. | 235/154 |
| 4,046,999 | 9/1977 | Katsuoka et al. | 235/150.53 |
| 4,062,014 | 12/1977 | Rothgordt et al. | 340/347 DD |
| 4,063,082 | 12/1977 | Nussbaumer | 364/728 |
| 4,158,889 | 6/1979 | Monden | 364/753 |
| 4,583,180 | 4/1986 | Kmetz | 364/748.5 |
| 4,720,809 | 1/1988 | Taylor | 364/748.5 |
| 4,727,508 | 2/1988 | Williams | 364/748.5 |
| 4,747,067 | 5/1988 | Jagodnik, Jr. et al. | 364/715 |
| 4,823,301 | 4/1989 | Knierim | 364/748 |
| 4,839,846 | 6/1989 | Hirose et al. | 364/748 |

FOREIGN PATENT DOCUMENTS 56-68834 6/1981 Japan ................................. 364/748.5

OTHER PUBLICATIONS

Combet et al., "Computation of the Base Two Logarithm of Binary Numbers", IEEE Transactions on Electronic Computers, pp. 863-867, 1965.

Swartzlander, Jr. et al., "The Sign/Logarithm Number System", IEEE Transactions on Computers, pp. 1238-1242, 1978 (Dec.).

Lee et al., "The Focus Number System", IEEE Transactions on Computers, pp. 1167-1170, Nov. 1970.

Edgar et al., "Focus Micro-Computer Number System", Communications of the ACM, vol. 22, No. 3, Mar. 1979, pp. 166-177.

(List continued on next page.)

*Primary Examiner*—Long T. Nguyen
*Attorney, Agent, or Firm*—Brooks & Kushman

[57] ABSTRACT

A method and apparatus for use in or with a general-purpose computing environment employs particularly efficient exponential and logarithmic function generation in combination with a logarithmic data format, herein called an exponential/logarithmic (E/L) or exponential floating-point (E-FLP) computational system, to attain general-purpose exponential floating-point (E-FLP) numerical processing comparable in effectiveness to conventional floating-point (C-FLP) processing of similiar precision and dynamic range. An E/L (or E-FLP) quantity according to the invention has an exponential floating-point (E-FLP) value that is inferred from its logarithmic fixed-point (L-FXP) representation or "format" value which when employed with exponential and logarithmic transformations according to the invention yields rapid and precise computational results. [Direct combinatorial construction provides increased speed in microprogrammed embodiments and provides pipe-lined operation in embodiments routing operands in close sequence.] E-FLP computations and their associated L-FXP implementations are disclosed, including the elementary transcendental functions (exponential, logarithm, sine, cosine, tangent and their inverses, etc.). E-FLP computations are characterized by fast multiplication-oriented arithmetic and particularly fast logarithms, exponentials, powers and roots.

27 Claims, 4 Drawing Sheets

OTHER PUBLICATIONS

Lo et al., "A Hardwired Generalized Algorithm for Generating the Logarithm Base-K by Iteration", IEEE Transactions on Computers, vol. 36, No. 11, Nov. 1987, pp. 1363–1367.

N. G. Kingsbury and P. J. W. Rayner, "Digital Filtering Using Logarithmic Arithmetic", Electronic Letters, Jan. 28, 1971, 56–58.

"Integrated-Circuit Logarithmic Arithmetic Units", *IEEE Computer Transactions*, May 1985, 475–483, J. H. Lang et al.

"A 20-Bit Logarithmic Number Processor", *IEEE Computer Transactions*, Feb., 1988, 190–200, F. J. Taylor et al.

T. Stouraitis and F. J. Taylor, "Analysis of Logarithmic Number System Processors", *Transactions on Circuits and Systems*, May, 1988, 519–527.

"A Simple but Realistic Model of Floating-Point Computation", W. S. Brown, *ACM Transactions on Mathematical Software*, vol. 7, No. 4, Dec., 1981.

"Handbook of Mathemical Functions with Formulas, Graphs, and Mathematical Tables", Edited by Milton Abramowitz and Irene A. Stegun, National Bureau of Standards Applied Mathematics Series 55, Issued Jun., 1964.

"The Implementation of Logarithmic Arithmetic", by A. Bechtosheim and T. Gross, Computer Systems Laboratory, Stanford University Dec. 1, 1980.

"A Parallel Search Table for Logarithmic Arithmetic", by A. Bechtosheim and T. Gross, Computer Systems Laboratory, Stanford University, Mar. 15, 1980.

"Redundant Logarithmic Arithmetic", IEEE Transactions on Computer, vol. 39, No. 8, Aug. 1990, 1077–1086, by M. G. Arnold, T. A. Bailey, J. R. Cowles and J. J. Cupal.

"Extending the Precision of the Sign Logarithm Number System" (M. S. Thesis) M. G. Arnold, University of Wyoming, Laramie, Wyoming, Jul. 1982.

"A Class of Algorithms for Automatic Evaluation of Certain Elementary Functions in a Binary Computer", Thesis by Bruce Gene DeLugish, 1970 (pp. 49–56; 7–15; 25–37).

The TTL Data Book vol. 2, 1985, Texas Instruments, pp. 3-357/366, 3-377/383, 3-577/581, 3-709/720, 3-851/855, 3-857/861, 3-895/898, 3-917/921 and 3-922/925.

1956 edition of Webster's New Collegiate Dictionary by G. & C. Merriam Co., pp. 22, 529, 575, 672–673 and 787.

1983 edition of Webster's New Universal Unabridged Dictionary by Simon & Shuster, pp. 45, 1134, 1227–1228, 1434 and 1688.

"A 10-ns Hybrid Number System Data Execution Unit for Digital Signal Processing Systems", *IEEE Journal of Solid-State Circuits*, vol. 26, Bi, 4, Apr. 1991, pp. 590–599, by F. Lai.

*IBM Research Report* RC 14521 (#64941), Mar. 22, 1989 entitled "A Hybrid Number System Processor with Geometric and Complex Arithmetic Capabilities", by F. Lai et al.

Article entitled "Uncalculated Art", *Science*, May 24, 1991, p. 1185.

5,197,024

METHOD AND APPARATUS FOR EXPONENTIAL/LOGARITHMIC COMPUTATION

This is a continuation of co-pending application Ser. No. 598,185 filed on Oct. 12, 1990, now abandoned, which is a continuation of U.S. Ser. No. 366,080 filed Jun. 14, 1989, now abandoned.

REFERENCE TO A RELATED APPLICATION

Reference is made to the patent application Ser. No. 07/366,376 filed Jun. 14, 1989, now abandoned. Said application is filed concurrently with the present invention in the name of the present inventor and entitled "Method and Apparatus for Generating Mathematical Functions." The concurrent invention addresses the generation of restricted-range fixed-point mathematical functions of restricted-range arguments with the functions having derivatives of restricted magnitude. The present application addresses the generation of fixed-point functions of generally wide range having derivatives of generally unrestricted magnitude with the generated functions corresponding to an implementation of general-purpose floating-point operations and functions.

BACKGROUND OF THE INVENTION

A portion of the disclosure of this patent document contains material to which a claim of copyright protection is made. The owner has no objection to the facsimile reproduction of the patent document or the patent disclosure, as it appears in the Patent and Trademark Office patent file or records, but reserves all other rights whatsoever.

1. Field of the Invention

This invention relates generally to numerical processing and more particularly to the field of floating-point number processing. More specifically, the invention relates to an apparatus and method for an exponential/logarithmic (E/L) general-purpose computational system based on particularly efficient fixed-point (FXP) generators of exponential and logarithmic functions in combination with a completely logarithmic data format. By comparison, a prior-art conventional floating-point (C-FLP) system is based on a FXP multiplier component and employs a partially or incompletely exponential/logarithmic data format.

2. Description of the State of the Art

There has been a paucity of actually working logarithmic data processors, and even fewer which have been used commercially, and virtually none for general-purpose use. Certain problems involved in the use or implementation of logarithmic processors are believed to have either not yet been recognized or not yet solved.

Prior art general-purpose logarithm evaluation, as compared with additions and subtractions and multiplications, have been inefficient and expensive—so much so that the inefficiency and expense are widely regarded as inevitable penalties on the logarithm operation itself. For example, a commercial C-FLP processor might execute logarithmic operations ten to twenty times slower than its relatively expensive multiplication operation.

Moreover, C-FLP systems seem to obey no recursive pattern for extending numerical precision. A popular conjecture among theorists holds that for arbitrarily high precision there is no fixed polynomial of the value of the first n digits of log x which can predict the value of the (n+1)-th digit with a probability greater than one half. Even if this conjecture is eventually proven, then the constraints which this would place on the construction of general-purpose logarithmic generators is more apparent than real for at least the following three important reasons: First, general-purpose logarithmic generators of even quite high fixed precision are, nevertheless, not of arbitrarily high precision. Second, limiting consideration to the first n digits of only the single function log x is a somewhat arbitrary and often unacknowledged restriction. Third, the polynomial form provides quiet compliance with the de facto dogma of C-FLP analysis whose tenets include: a) there is only one possible form of practical floating-point processor, b) the primitive economical operations of its "arithmetic" are restricted to the operations of addition, subtraction, and multiplication (with division not always quite included), and c) the multiplication operation is of a particular fixed degree of precision.

The conventional C-FLP multiplication operation is more expensive than the C-FLP addition or subtraction operations. Thus the minimax polynomial, which generally minimizes the required quantity of such multiplications, has become the mainstay of functional approximation for optimal C-FLP evaluation. To a certain extent, such polynomials also minimize the quantity of additions which is the more important consideration in E-FLP, as hereinafter explained.

A C-FLP computing environment usually contains such facilities as a library of scientific functions and a set of data conversions for interfacing with other data types. The appropriate correlatives of these facilities are also needed in an E-FLP computing environment, as hereinafter explained.

However, C-FLP computation was introduced almost four decades ago and met immediate and widespread acceptance. Designers of C-FLP processors made them easy to use. Confirmation of their skill can be found in the fact that entire generations of C-FLP users have been able to remain largely unaware of how a C-FLP processor actually works. The first such processors were implemented in software with multiplication speed suffering severely. The search for faster multiplication continued for decades. Hardware multipliers were investigated, but in many applications they were found to be too expensive to be of wide practical value.

The designers of the early processors were aware that so-called "logarithmic" arithmetic would be substantially equivalent to C-FLP arithmetic and that it would provide the ultimate in performance for floating-point multiplication: the floating-point multiplication would then be effected by the ultrarapid fixed-point addition. On the other hand, "logarithmic" addition and subtraction would correspond to intractable scientific library functions for which the impossibility of efficient generation was deemed obvious. Therefore, this development path was not pursued.

Many C-FLP processor designers since those early times have been of the opinion that the obstacles to efficient general-purpose "logarithmic" computation are inherent and unavoidable. This view is consistent with the fact that there has been no prior art account of any attempt to construct a processor capable of highly efficient general-purpose "logarithmic" computation.

In a specialized area of digital computation, N. G. Kingsbury and P. J. W. Rayner, in "Digital Filtering Using Logarithmic Arithmetic," *Electronic Letters*, Jan.

28, 1971, 56–58, proposed applying logarithmic arithmetic to digital filtering calculations. They proposed a processor using direct table look-up. Their processor necessarily had both its precision and its dynamic range severely restricted.

Exemplary early applications of logarithmic computation as are follows: A digital flow computer in U.S. Pat. No. 3,099,742 to Byrne, et al. in 1963; Calculating apparatus in U.S. Pat. No. 3,402,285 to Wang in 1968; and Digital Log Computer in U.S. Pat. No. 3,436,533 to Moore, et al. in 1969.

More recently, in "Integrated-Circuit Logarithmic Arithmetic Units," *IEEE Computer Transactions*, May 5, 1985, 475–483, J. H. Lang et al. have constructed a hardware logarithmic processor using direct table look-up. This processor possesses the equivalent of only 3.844 range bits and only 5.156 bits of precision, i.e., only 4.156 bits of mantissa. Lang et al. also include a comprehensive bibliography of the investigations of logarithmic arithmetic from the time of Kingsbury and Rayner up to 1985. All such prior art processors are based on direct table look-up using look-up indices which are substantially as large as the corresponding data-format value. The associated comparatively large table expense prohibits their use in all but the most highly specialized applications allowing very small data formats. Even here, particularly attentive experts are required in order to rigorously justify the use of arithmetic possessing such meager levels of precision and dynamic range. Casual general-purpose use is entirely out of the question.

Still more recently, in "A 20-Bit Logarithmic Number Processor," *IEEE Computer Transactions*, February 1988, 190–200, F. J. Taylor et al. have designed a hardware logarithmic processor performing the six operations: addition, subtraction, multiplication, division, square, and square root. The particular direct look-up of table values is modified only to the extent of selection among a few direct look-ups to tables having successively fewer bits of output but still with comparatively large numbers of bits of input which severely restricts precision and economy. The 12-bit mantissa with 7 bits of dynamic range provide levels of precision and dynamic range that would be adequate for a much wider range of practical applications if the processor also provided the logarithmic and exponential operations required for easy interface with C-FLP and FXP data associated with such equipment as analog-to-digital and digital-to-analog data converters. T. Stouraitis and F. J. Taylor analyze the error characteristics of this 20-bit processor in "Analysis of Logarithmic Number System Processors," *Transactions on Circuits and Systems*, May, 1988, 519–527.

Taylor et al. also make the fair observation that "The logarithmic number system, or LNS, has been studied for many years in a somewhat casual manner." In particular, none of these investigations has identified the specific equivalence of logarithmic computation to C-FLP computation. This equivalence has instead been denied. Moreover, there has been no prior-art processor capable of general-purpose exponential and logarithmic operations so efficient and economical that they are reasonably considered to be part of the processor's "arithmetic" along with addition, subtraction, multiplication, and division rather than expensive, inefficient library functions. Even further, despite the continuing rapid technology advances which affect the economics of storing look-up tables, all of these prior-art processor designs provide levels of precision which are clearly inadequate for general-purpose use.

In contrast, known C-FLP processors are designed for more general-purpose computation. This has come to mean that at least 20–24 significant bits or the equivalent of 6–7 significant decimal digits of precision is provided together with enough dynamic range to make overflow and underflow easily avoidable. Applications requiring more than this level of precision are common with popular computer languages such as BASIC and FORTRAN regularly providing access to more than twice this precision. There are also numerous applications within control systems and many other kinds of instrumentation using 10-, 12-, and 14-bit analog-to-digital and digital-to-analog converters wherein about 15–17 significant bits is ample precision for the carefully designed calculations which are characteristic of such applications. This is about the least precision which can claim to be widely applicable to general-purpose use even in this restricted sense.

C-FLP systems based on software implementations of numerical functions are known. However, the known software C-FLP systems can seldom provide adequate mixes of performance, function, and economy in volume-manufactured realtime microprocessor-based controllers.

The present invention targets problems which have been thought unsolvable, problems which have not been recognized, and problems which are major obstacles to practical implementation of an E/L system. Major problems not recognized as such in the prior art include areas of analysis, notation, and terminology associated with such commonly used functions as the elementary logarithms and exponentials. These areas need to be extended in a number of distinctly fundamental directions.

SUMMARY OF THE INVENTION

According to the invention, a method and apparatus for use in or with a general-purpose computing environment employs efficient exponential and logarithmic function generation in combination with a logarithmic data format, herein called an exponential/logarithmic (E/L) computational system, to attain general-purpose exponential floating-point (E-FLP) numerical processing comparable in effectiveness to conventional floating-point (C-FLP) processing of similar precision and dynamic range. An exponential/logarithmic (E/L) quantity according to the invention has an exponential floating-point (E-FLP) value that is inferred from its logarithmic fixed-point (L-FXP) representation or "format" value which when employed with exponential and logarithmic transformations according to the invention yields rapid and precise computational results.

E-FLP computations and their associated L-FXP implementations are disclosed, including the elementary transcendental functions (logarithm, exponential, sine, cosine, tangent and their inverses, etc.). [Direct combinatorial construction provides increased speed in microprogrammed embodiments and provides pipe-lined operation in embodiments routing operands in close sequence.] E-FLP computations are characterized by fast multiplication-oriented arithmetic and particularly fast logarithms, exponentials, powers and roots.

Applications range from software numerical processors for low-cost real-time microprocessor-based controllers requiring multi-kiloflops (where "flops" refers to "floating-point operations per second") of floatingpoint computation of 16–24 significant bits to general-purpose computational systems of 20–60+significant bits with multi-megaflops to multi-gigaflops performance. General application areas include difficult computational areas most needing simultaneous qualitative improvements in function, performance, economy, and ease-of-use. In a specific embodiment, E-FLP operations are rendered practical without the use of C-FLP hardware, yet at speeds comparable thereto.

An E/L system contains particularly efficient generators for exponential (i.e., antilogarithmic) and logarithmic data transformations. As shown hereinafter, besides the exponential and logarithmic generators, an E/L system may require few, if any, components beyond a comparatively simple means for performing arithmetic logic functions (addition and substraction, digit-wise logic and digit-place shifts) and means for generalized partitioning, assembling and distributing of data field values. No multiplier is required, although a multiplier can be employed to speed certain complex operations.

Particularly rapidly executing generator devices for generating logarithmic and exponential functions are known. These function generators are characterized by substantially non-iterative, i.e., essentially combinatorial, construction. Function generation using direct look-up in a random access ROM (read-only memory) is well known. Such direct look-up uses the input signal as an addressing index and allows such function generation to be as rapid as a single ROM access time. However, using direct look-up for precision beyond about 16 significant bits requires comparatively large, and thus expensive, ROMs. Other logarithmic and exponential (i.e., anti-logarithmic) function generator devices are known, although some such devices use iterative construction and thus suffer a severe penalty in speed. Exemplary among these other function generators are the following: the logarithmic and anti-logarithmic generators described in U.S. Pat. No. 3,099,742 to Byrne et al.; U.S. Pat. No. 4,062,014 to Rothgordt, et al.; U.S. Pat. No. 4,158,889 to Monden; U.S. Pat. No. 4,046,999 to Katsuoka et al.; and U.S. Pat. No. 3,194,951 to Schaefer. Important improvements to logarithmic and exponential function generators are disclosed in a copending patent application by the inventor herein.

An E-FLP multiplication or division operation is implemented solely by an L-FXP arithmetic logic operation of addition or subtraction, respectively. An E-FLP addition or subtraction operation may be implemented as a sequence of three L-FXP operations, namely, 1) an exponential, 2) an arithmetic logic operation (i.e., addition or subtraction, respectively), and 3) a logarithm. However, an E/L computational system contains both an ultrafast L-FXP exponential generator and an ultrafast L-FXP logarithm generator, as well as arithmetic logic, to implement said E-FLP addition and subtraction operations. Therefore, an E/L computation system usually provides the reverse sequence as well, namely, 1) a logarithm, 2) an arithmetic logic operation, and 3) an exponential, to implement the difficult L-FXP multiplication and division operations. In fact, even a sequence such as the following: 1) a first exponential, 2) an arithmetic logic operation, and 3) a second exponential, is also comparatively efficient both for general E-FLP computations as well as for general L-FXP computations, as shown hereinafter. In contrast, the sequence of: 1) a first logarithm, 2) an arithmetic logic operation, and 3) and second logarithm, is comparatively less effective as a basis for general computation, although it certainly can fit instances of more specialized computations.

Each E/L quantity has both an E-FLP (exponential floating-point) value and a L-FXP (logarithmic fixed-point) value. The E-FLP value is inferred from the L-FXP representation or format value which is stored explicitly in a computer. This L-FXP format value is useful to E-FLP computation in many ways, as shown hereinafter, for which C-FLP computation has no parallel.

This E/L system (also called an E-FLP system) is structured to accommodate the same kinds of computations as would be performed by a C-FLP system of similar precision and dynamic range. This invention provides computational operations and generates results which are functionally equivalent to C-FLP computation. Yet this invention provides this equivalence in such a novel and unconventional manner that it effectively broadens this field well beyond C-FLP computation.

While the prior-art C-FLP universe includes a very considerable body of experience related to all aspects of the theory, analysis, algorithms, and applications of effective and efficient C-FLP use, the fact that most of this experience is directly applicable to E-FLP computation is a great convenience to E-FLP users, as hereinafter explained. In particular, a calculation optimized for most efficient C-FLP execution will essentially always execute at least moderately well in E-FLP simply by converting the C-FLP data and constants into E-FLP form, and substituting E-FLP operations for the elementary C-FLP operations. This simplicity provides easy conversion of an existing C-FLP application and ensures that the converted E-FLP calculation is rapidly put "on the air" in trouble-free operation. Further E-FLP optimization can then proceed on its own schedule.

The highest levels of performance are provided when the invention is implemented directly in dedicated hardware for general-purpose computation as well as for more specialized applications such as signal and image processing requiring particularly high performance. The hardware and its associated operations can, however, be implemented particularly simply. This simplicity permits economical firmware and software implementations of the invention to provide new levels of performance which approach that of existing C-FLP hardware processors. Such software and firmware implementations provide qualitatively new levels of combined performance, function, economy, and ease-of-use even on the simpler microprocessors having no instruction for direct multiplication.

This invention can be used 1) for: numerical computation, E-FLP computation, L-FXP computation, significant digit computation, combinatorial analysis, mathematical special functions, mathematical function libraries, specialized application functions, real-time sampled-data servo systems, real-time interval computation, real-time error measure computation, microprogrammed processors, logarithmic converters and normalizers, exponential converters and denormalizers, real-time control, process control, signal processing, telemetry, signal conditioning, engine control, motor control, guidance, navigation, statistical analysis, data reduction, radar, avionics, bionics, nucleonics, microprocessors, pipe-lined processors, parallel processors, reduced-instruction-set computers (RISC), and stand-alone processors; and 2) for providing lower life-cycle costs:

more function, greater performance, easier design and design update, greater reliability, less and simpler hardware, less weight, less space, less power, fewer parts, fewer suppliers, fewer delivery schedules, easier built-in-test (BIT), and more economical repair.

The exponential generator is capable of the sort of data transformation required to convert an E-FLP normal number from its E-FLP data format into an equivalent C-FLP number. The logarithmic generator provides the reverse data conversion. With these exponential and logarithmic transformations implemented as economical elementary operations, the expensive multiplier component of the C-FLP processor architecture, as explained hereinafter, is no longer a critical component of this new architecture. Accordingly, the ensuing discussion will presume that an E-FLP system does not contain the FXP multiplier component typically used in a C-FLP system.

DESCRIPTION OF THE SPECIFIC EMBODIMENTS

Figure 1A:
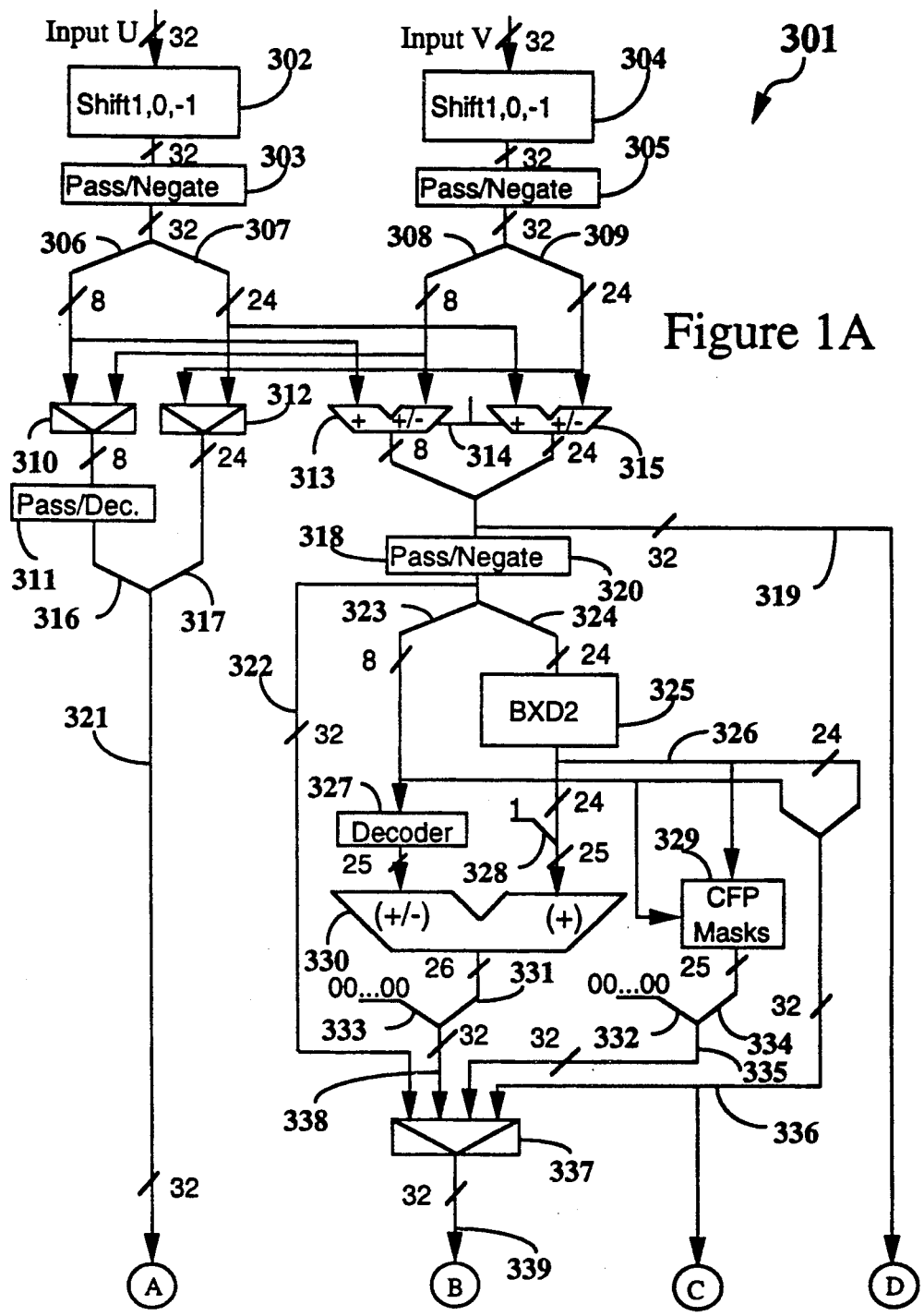
FIG. 1A is a block diagram of a first portion of the basic logic for a 32-bit data format exponential/logarithmic (E/L) processor.

The present invention constitutes an extension to the class of data processing systems known as floating-point systems. As a floating-point system the invention does not comprise a conventional floating-point (C-FLP) system. The invention instead provides a novel architecture, including a set of novel primordial objects with which the architecture is implemented, upon which a novel exponential/logarithmic (E/L) system (also called an E-FLP system) can be built.

The functions described herein can be implemented in either hardware, firmware, or software or some combination thereof. It is anticipated, but without any intended limitation on the scope of the invention, that the most efficient implementation will be such a combination with many of the kernel functions (described hereinafter) implemented in firmware and with some of the most fundamental kernel functions implemented in hardware.

For most-purposes herein, the preferred embodiment is described in the context of a single CPU computer system. However the architecture lends itself to multiple CPU systems and certain modifications for multiple CPU systems are described hereinafter.

The present invention targets problems which have been thought unsolvable, problems which have not been recognized as problems, and problems which are major obstacles to practical implementation of general function generators. Major problems not recognized as such in the prior art include areas of analysis, notation, and terminology associated with such commonly used functions as the elementary exponentials and logarithms. These areas need to be extended in a number of distinctly fundamental directions.

The present invention is directed at an integrated solution of the problems associated with the effective use of E/L operations when combined with the problems involved with the practical implementation of a processor providing such operations.

For better understanding of the disclosed novel general-purpose unified E/L computational system, its disclosure includes the following:

1) A consistent expanded notation for exponentials and logarithms together with various novel related functions, series expansions, approximations, and computational interpretations which both the designer and the user of an E-FLP system should find helpful.

2) A multiplication-oriented E-FLP computation. The novel theory for implementation of E/L processors includes new formulae of general fundamental significance to the fields of computation, mathematics, engineering, and science as well as to the efficient use of E-FLP processors.

3) Equivalence of E-FLP to C-FLP. E-FLP being functionally equivalent to C-FLP immediately ensures the applicability of C-FLP computational experience in the effective use of E-FLP computation. This equivalence extends well into the design of floating-point systems generally. Disclosure is made that the interconversion of data between a given C-FLP system and its correlative E-FLP system of most closely equivalent precision and dynamic range need affect only their respective significant-digit data fields of their equal-sized data formats. This allows the prevailing C-FLP conventions and standards regarding the sign and integer biased-exponent data fields to retain their rationale in E-FLP. This represents a major contribution to the standardization of E-FLP systems as well as to the standardization of their interfaces with C-FLP systems.

4) Data-mode conversions. Computational mode conversions between E-FLP, C-FLP, and FXP are integrated and unified with the exponential and logarithmic functions. Several novel properties, and computational interpretations of these conversion functions are disclosed.

5) Signed E-FLP addition. The L-FXP operation implementing a signed E-FLP addition is a FXP logarithm of a sum or difference of FXP exponentials. The most elementary E-FLP addition is the increment function inc $\hat{z} = \hat{z} + 1$ for a signed E-FLP variable $\hat{z}$. The design of efficient generation of this function is disclosed in great detail as is its use as the basis for general signed E-FLP addition.

6) Library of scientific E-FLP functions. A novel unified generation of a library of E-FLP scientific functions is disclosed. A comprehensive set of trigonometric and hyperbolic functions together with an equally comprehensive set of inverse functions are included.

7) An E-FLP system with real-time error measures. An E-FLP system which can, for each result of a primary E-FLP calculation, perform a secondary E-FLP calculation related to an evaluation of expected mean squared-error in the primary L-FXP value. The secondary calculations are typically performed at lesser precision than the primary calculations which allows them to be particularly efficient and economical.

8) An E-FLP system for real-time interval computation. An E-FLP system which can, for each result of a primary E-FLP calculation, perform one or more secondary calculations related to an evaluation of absolute error limits within which the primary L-FXP result must lie. These secondary calculations are typically performed at lesser precision than the primary calculations.

9) General use of E-FLP computation is disclosed and compared with C-FLP.

10) General applications of E-FLP systems are disclosed.

CONVENTIONS, NOTATION, AND TERMINOLOGY

In order to assist in understanding the invention, the following definitions and terminology are used.

GENERAL TERMINOLOGY

The terms computer, data-processing system, number-processing system, and number processor are used interchangeably in the following descriptions. The term "object" refers to any basic system construct such as a look-up table, function generator, look-up-table value interpolator, memory page or segment, or pipe-line stage. Whenever digit, bit, byte, or word positions are described using numerical indices, position zero is the position immediately to the left of the radix-point with positive positions further to the left. Negative positions are to the right of the radix-point.

The basic or primordial objects used in the invention perform unscaled (e.g., fixed-point) numerical operations. The set of such objects includes signal detectors and modulators configured as logical gates, registers, multiplexers (MUXs), adders, subtracters, shifters, address look-up tables, function look-up tables, look-up-table value interpolators, logarithmic function generators, exponential function generators, E-FLP incrementer, E-FLP decrementer, and scientific library function generators based upon continued-expoential or products-of-exponential series expansions. In particular, the expensive component of FLP, i.e., the FXP multiplier, is usually not required.

NOTATION FOR LOGARITHMS AND EXPONENTIALS

The following definitions are used herein:

$$\text{axp } u = a^u \text{ and alg } u = \log_a u \quad (1)$$

$$\text{axd } u = -1 + \text{axp } u = a^u - 1 \quad (2)$$

$$\text{ald } u = \text{alg}(1 + u) \quad (3)$$

for $0 < a$, wherein other letters or symbols can be substituted for a, and particularly $$\text{bxp } u = 2^u \text{ and blg } u = \log_2 u \quad (4)$$

$$\text{bxd } u = -1 + \text{bxp } u = 2^u - 1 \quad (5)$$

$$\text{bld } u = \text{blg}(1 + u), \quad (6)$$

(i.e., b≡2 wherein the "b" is a mnemonic for "binary") and $$\text{dxp } u = 10^u \text{ and dlg } u = \log_{10} u \quad (7)$$

(i.e., d≡10 wherein the "d" is a mnemonic for "decimal"), and $$\text{exp } u = e^u \text{ and elg } u = \ln u \quad (8)$$

$$\text{exd } u = -1 + \text{exp } u \quad (9)$$

$$\text{eld } u = \text{elg}(1+u) = \ln (1+u). \quad (10)$$

Also, there are the constants $$q_a = \text{alg } e = 1/\ln a \quad (11)$$

$$Q_a = \text{alg } q_a = (\ln (1/\ln a))/\ln a \quad (12)$$

wherein e is the base of the natural logarithm. When a=2≡b, the subscript is usually omitted, i.e., $$q = \text{blg } e = 1/\ln 2 \quad (13)$$

$$Q = \text{blg } q = (\ln (1/\ln 2))/\ln 2. \quad (14)$$

There is the further convention that the uppercase forms AXP, AXD, ALG, and ALD refer to functions whose arguments are restricted to particular domains chosen by the designer, e.g., for implementation in hardware. However, the arguments of the upper-case functions BLD F=bld F and BXD F=bxd F are restricted to unsigned fractions, i.e., $0 \leq F < 1$, thereby also restricting the BLD and BXD values themselves to this same fractional interval. These BLD and BXD functions are usually chosen for particularly high-performance L-FXP implementation in a binary E-FLP system.

E-FLP AND L-FXP CONVENTIONS

A Novel E-FLP Computational System

A completely exponential/logarithmic (E/L) computational system (also called an E-FLP system) is the novel computational system described herein for the first time. Although an E-FLP system may be used much the same as a conventional floatingpoint (C-FLP) system, its internal construction is radically different. An E-FLP system is based on high-performance logarithmic and exponential generators. The expensive central component of a C-FLP processor, the fixed-point (FXP) multiplier, is not required in an E-FLP processor and is often absent.

In particular, the present description of the theory and construction of an E-FLP system is most clearly described in terms of the guiding principle of doing whatever is necessary in order to avoid direct FXP multiplication operations. Thus such direct FXP multiplication operations are presumed to be absent. The remarkable result of using this heuristic principle of avoiding such internal FXP multiplication is the construction of a complete E-FLP computational system which provides E-FLP computation that is strongly oriented toward particularly efficient "multiplicative"

E-FLP operations including multiplication, division, logarithms, exponentials, roots, and powers.

The logarithms, exponentials, and other functions may be generated with speed and economy by direct table look-up only for comparatively low-precision applications. At general-purpose levels of precision, however, other generation means are required.

One type of function generation that employs multipliers to interpolate values in compact look-up tables has recently been described by A. S. Noetzel in "An Interpolating Memory Unit for Function Evaluation: Analysis and Design," *IEEE Transactions on Computers*, March, 1989, 377-384, A preferred alternative is described by the applicant in the concurrently filed copending application "Method and Apparatus for Generating Mathematical Functions." The copending application describes a novel interpolation of values in compact look-up tables without direct FXP multiplication operations. The table values themselves provide this novel internal interpolation efficiently in a manner which corresponds to the combined E-FLP and L-FXP computation of a comparatively low-precision E-FLP system, again without requiring direct FXP multiplication.

E-FLP Computational Mode. The primary computational mode of an E-FLP system is that of performing general-purpose automatically scaled E-FLP calculations as would be performed by a C-FLP system of similar precision and dynamic range. The E-FLP "arithmetic" is greatly expanded relative to that of C-FLP. In particular, the typical execution time of an E-FLP logarithm or exponential is usually between that of an E-FLP-multiplication time and an E-FLP-addition time. The ultra-rapid E-FLP multiplication or division is implemented as an L-FXP addition or subtraction, respectively, of the L-FXP format values. An E-FLP square or square root operation is implemented by doubling or halving, respectively, the L-FXP format value. The E-FLP reciprocal is implemented as an L-FXP sign change. Thus all of these operations are particularly economical and rapid in a binary E-FLP computational system.

All constant E-FLP roots or powers may be implemented as single L-FXP multiplications of the L-FXP format values by constants. Thus these E-FLP operations are much simpler than such roots and powers in C-FLP. [This L-FXP multiplication operation may be easily avoided by instead using the economical L-FXP logarithmic and exponential operations.] Even further, the execution time of an E-FLP hyperbolic function or its inverse need not exceed about three addition times while the execution time for an E-FLP trigonometric function or its inverse seldom exceeds about four to five addition times.

Moreover, E-FLP computation also has a comprehensive computational mode wherein each E-FLP value and operation has two or more simultaneous and potentially useful interpretations, as explained hereinafter. This circumstance introduces a completely new dimension to E-FLP computation which has no viable parallel in C-FLP computation. The user retains the freedom to use E-FLP like C-FLP and to ignore this dimension until particularly difficult calculations are encountered whereupon this extra dimension can often provide considerably increased performance and economy. This novel multi-valued multi-mode computation is furtger described hereinafter.

Internal Structure of an E-FLP System

According to the invention, an E-FLP system operates on classes of numbers identical with, or essentially equivalent to, corresponding classes of numbers in the "most nearly equivalent" C-FLP system (the EC-FLP system), there usually being at least two classes of numbers in each. According to the invention, the first is the class of nonsingular "normal" E-FLP valves described hereinafter. According to the invention, the second is a class of singular values which are identical with the corresponding singular values in the EC-FLP system. According to the invention, an E-FLP system may also operate on a class of nonsingular "unnormalized" (also called "denormalized" or "subnormal") values which can be closely equivalent to any corresponding class of unnormalized numbers of the EC-FLP system. In E-FLP, as in C-FLP, an unnormalized number is usually converted into an extended normal number for processing.

The basic ordering of the format values for the E-FLP normal and nonnormal numbers can, and generally should, closely resemble that which is employed for the corresponding EC-FLP normal and nonnormal numbers. Table 1 tabulates quantitative measures of the basic parameters of binary E-FLP and C-FLP systems. The uniformly close equivalences are particularly evident.

TABLE 1

©Pickett 1989

| parameter | E-FLP | C-FLP |
|---|---|---|
| value | $\hat{u} = (-1)^{S_u} 2^{N_u + F_u}$ | $\tilde{u} = (-1)^{S_u} 2^{N_u}(1 + G_u)$ |
| sign bit $S_u$ | 0/1 | 0/1 |
| bias | $\beta$ | $\beta$ |
| exponent (biased) | $E_u = \beta + N_u \cdot F_u$ <br> $= \beta + u$ | $E_u = B + N_u$ |
| exponent (unbiased) | $u = N_u \cdot F_u$ <br> $= E_u - \beta$ | $N_u = E_u - \beta$ |
| characteristic | $N_u$ | $N_u$ |
| mantissa | $F_u$ | 0 |
| fraction | $F_u$ | $G_u$ |
| significand | 1 | $1 + G_u$ |
| range bits | d | d |
| fraction bits | p − 1 | p − 1 |
| precision | p | p |
| blg$|u|_{max}$ | $N_{max} + 1 - 2^{-p} =$ | $N_{max} + 1 + \text{bld}(-\tfrac{1}{2}2^{-p}) \approx$ |

TABLE 1-continued

| | ©Pickett 1989 | |
| parameter | E-FLP | C-FLP |
| --- | --- | --- |
| $blg\|u\|_{min}$ | $\dfrac{N_{max} + F_{max}}{N_{min}}$ | $\dfrac{N_{max} + F_{max}}{N_{min}}$ |
| (rel err$_{trunc}$)$_{max}$ | $bxd\ 2^{-p+1} \approx 2^{-p+1-Q}$ | $\dfrac{bxp(-p+1)}{1+G} = 2^{-p+1-bldG}$ |
| (rel err$_{trunc}$)$_{min}$ | 0 | 0 |
| (rel err$_{rnd}$)$_{max}$ | $bxd\ 2^{-p} \approx 2^{-p-Q}$ | $\dfrac{bxp(-p)}{1+G} = 2^{-p-bldG}$ |
| (rel err$_{rnd}$)$_{min}$ | $bxd(-2^{-p}) \approx 2^{-p-Q}$ | $\dfrac{-bxp(-p)}{1+G} = -2^{-p-bldG}$ |

A single-precision binary E-FLP system may for example use a 32-bit data format with 1 sign bit, 8 bits for the characteristic and 23 bits for the mantissa. Further singular values serve identical functions both in C-FLP and in E-FLP. Thus the relative ordering of data format values may be substantially identical in both data formats. One result of such common relative ordering is that an implementation of the C-FLP compare (operating on C-FLP values) may be used without alteration as an E-FLP compare (operating on E-FLP values).

Double-Valued, Double-Mode Data

A normal E-FLP number is a nonsingular signed value $\hat{u}$ which may be inferred from a sign bit $S_u$, a nonzero E-FLP base a, an exponent data field quantity $E_u$, and an associated value $\beta$ called the exponent bias such that $E_u = U + \beta$ wherein $U = N_u.F_u$ is a fixed-point signed exponent with signed integer portion $N_u$ and unsigned fraction portion $F_u$. This inference proceeds according to an inferential mapping called the "normal" equation, which may be stated in the following alternative ways:

$$\hat{u} = (-1)^{S_u} a^{E_u - \beta} \quad (15)$$
$$= (-1)^{S_u} a^{U} \quad (16)$$
$$= (-1)^{S_u} a^{N_u \cdot F_u}. \quad (17)$$

With the clear understanding that $S_u$ and $E_u$ are the actual data-field values of the data format, the L-FXP quantity U may conveniently be referred to simply as the "format value" of $\hat{u}$ when there is no confusion with the technical details of bias or sign bit.

This normal equation is algebraically very simple as $N_u$ and $F_u$ together meaningfully constitute the single quantity U. [In C-FLP, for contrast, the corresponding single quantity constructed by prefixing the integer exponent $M_u$ to the significand (or fraction) $D_u$ has only very isolated uses outside the compare operation.] A useful feature of this simplicity is that each E-FLP operation producing the E-FLP result $\hat{u}$ necessarily also produces the L-FXP value U which is a potentially useful FXP logarithm of $|\hat{u}|$ and which is always immediately available as $\hat{u}$'s data-format value. The format value $U = N_u.F_u$, wherein $N_u$ is a signed integer and $F_u$ is an unsigned fraction, may be represented in terms of exponentially weighted radix-r digits with $N_u$ and $F_u$ residing in d-digit and p-digit data fields, respectively, of the data format. (When r=2, however, a (p-1)-bit fraction corresponds more closely to a C-FLP p-bit significand encoded as a (p-1)-bit fraction with the constant 1-bit "hidden," i.e., implicit.)

When the value of the system base a is common to all data quantities as is the case for C-FLP systems, the data format need not assign additional space for this value. But in marked contrast to prior-art C-FLP, the circumstance of the format value U being a single coherent exponent permits a set of E-FLP operations to be implemented without reference to the specific value of a. This set of operations particularly includes the monadic (one-operand) E-FLP operations $1/\hat{u}$, $\sqrt{\hat{u}}$, $\sqrt[3]{\hat{u}}$, $\hat{u}^2$, and any other constant root or power of $\hat{u}$. The dyadic (two-operand) E-FLP multiplication and division operations are also included as long as the same value of a applies to both operands and the result. In fact, insofar as any of these operations are affected, the value of a could be integer or real, or even complex. For each of the foregoing monadic operations there is also the formal alternative of invoking a new value for a in lieu of executing the operation, although this very likely modifies (and perhaps drastically) the meaning of related calculations. Thus such a change is not to be invoked casually.

Multi-Valued Mixed-Mode Operations

The economical pair of E-FLP operations $\hat{u}' = axp$ $\hat{u} \equiv a^{\hat{u}}$ and $\hat{u} = alg\ \hat{u}' \equiv \log_a \hat{u}'$ are particularly versatile. Executing either of these fast operations (taking $\hat{u}$ as the input for the former operation or $\hat{u}'$ as the input for the latter) corresponds to starting with one E-FLP value and its L-FXP format value and executing a single fast operation to produce two new quantities, the E-FLP result and its L-FXP format value. Each of these four quantities is related to the other three by one or two mathematical operations, or a data-mode conversion, or both, as indicated in Table 2.

The number of logarithmic or exponential mathematical operations and a FLOAT (i.e., FXP-to-E-FLP) or FIX (i.e., E-FLP-to-FXP) conversion operations, if present, are indicated in parenthesis, e.g., (1 m,1 c) means one logarithm or exponential mathematical operation (1 m) and one FLOAT or FIX conversion operation (1 c). [Note that, for example, $\hat{u} = U'$ stands for the pair of conversions $u = U'$ and $\hat{U}' = \hat{U}' = \hat{u}$.]

TABLE 2

| | ©Pickett 1989 | | |
| | U | $\hat{u}$ | $\hat{u}'$ | U' |
| --- | --- | --- | --- | --- |
| U | — | $U = alg\|\hat{u}\|$ (1m, 1c) | $U = alg\|alg\ \hat{u}'\|$ (2m, 1c) | $U = alg\|U'\|$ (1m) |
| $\hat{u}$ | $\hat{u} = (-1)^{S_u} a^U$ (1m, 1c) | — | $\hat{u} = alg\ \hat{u}'$ (1m) | $\hat{u} = U'$ (2c) |
| $\hat{u}'$ | $\hat{u}' = a^{(-1)^{S_u} a^U}$ (2m, 1c) | $\hat{u}' = a^{\hat{u}}$ (1m) | — | $\hat{u}' = a^{U'}$ (1m, 1c) |

TABLE 2-continued

© Pickett 1989

| U | û | û' | U' |
|---|---|---|---|
| U' U' = $(-1)^{S_u}a^U$ (1m) | U' = û (2c) | U' = alg\|û'\| (1m, 1c) | — |

This set of relations corresponds to twelve mathematical and ten conversion operations for a total of twenty-two operations. This brings no complication to the E-FLP user as all the extra relations may simply be ignored. But when the experienced E-FLP user encounters a need for the very fastest evaluation of transcendental expressions which are particularly difficult and slow in C-FLP, this rapidly expanding set of efficient useful E-FLP alternatives offers an immediate contrast with C-FLP. Other instances also often occur, particularly when an E-FLP exponential or logarithmic operation accompanies a FLOAT or FIX operation, respectively. Here a simple reinterpretation both of the data value and of the data mode can provide the instantaneous result of both operations with neither operation actually requiring execution.

Such striking economies in E-FLP have no parallel in C-FLP. For û'=alg û with 0<û, the equations u'=û'= $(-1)^{S_{u'}}a^U$=alg û=alg $a^U$=U=Û=$(-1)^{SU}a^{alg|U|}$ allow direct identification of a first set of example relations $$\hat{u}' = \text{alg } \hat{u} \quad (18)$$

$$U' = \text{alg}|U| \quad (19)$$

$$u' = U \quad (20)$$

$$\hat{u}' = \hat{U} \quad (21)$$

which show that the E-FLP logarithmic operation û'=alg û on a positive E-FLP quantity û with L-FXP format value U yields an E-FLP result û' with its L-FXP format value U' wherein U' is the result of the L-FXP logarithmic operation alg|U|. There is û'=$(-1)^{S_{u'}}a^{alg|u'|}$=Û=$(-1)^{SU}a^{alg|U|}$ which corresponds to a FXP-to-E-FLP data-mode-conversion operation. Similarly, for the E-FLP operation û=$a^{u'}$ on signed normal E-FLP quantity û', the equations u=û $a^{(-1)S_u a U}$ = $a^{u'}$ = $a^{(-1)S_{u'}a U}$ = $a^{(-1)S_{u'}a alg|u'|}$ = $a^{(-1)SU a alg|U|}$ = $a^U$ = $a^U$ allow direct identification of a second set of example relations $$\hat{u} = a^{\hat{u}'} \quad (22)$$

$$|U| = a^U \quad (23)$$

$$U = u' \quad (24)$$

$$\hat{U} = \hat{u}' \quad (25)$$

which correspond inversely to the foregoing four relations (18), (19), (20), and (21), respectively.

These equations show that the E-FLP exponential operation û=$a^{\hat{u}'}$ on E-FLP quantity û' with L-FXP format value U' yields an E-FLP result û with its L-FXP format value U wherein U is the result of the L-FXP exponential operation (with signing) $(-1)^{S_{u'}}a^U$. There is U=$(-1)^{S_{u'}}a^{alg|u'|}$=u' which corresponds to the E-FLP-to-FXP data-mode-conversion operation. Prior art C-FLP has no such operations offering so many simultaneous potentially useful interpretations.

NORML, FLAT, and FLOAT Data-Mode Conversions

Data type INTEGER is the only FXP data mode accompanying most C-FLP systems. Thus the E-FLP FLOAT operation for FXP-to-E-FLP conversion is often associated with this restricted form of FXP operand. The more general FXP-to-C-FLP conversion is simply called "normalization", i.e., conversion to C-FLP normal data form $r^M D$ wherein $r^k \leq D < r^{k+1}$ for some specific value of signed integer k. The "E-FLP normalization" operation converts a nonzero signed FXP quantity u into the E-FLP normal form u=û=$(-1)^{S_u}a^U$=$(-1)^{S_u}a^{N_u.F_u}$, i.e., it extracts the format quantity U=$N_u.F_u$ corresponding to E-FLP value û wherein U=alg|u|. Thus "E-FLP normalization" can reasonably be called "logarithmization" and the term "normalization" can continue to mean the "C-FLP normalization".

The E-FLP FLOAT conversion of a radix-r nonzero FXP value u into the normal E-FLP value û=$(-1)^{S_u}a^{N_u.F_u}$ consists of the following operations: 1) the extraction of $S_u$, $M_u$, and $D_u$ by normalizing $u_{FXP}$ into C-FLP normal form as ũ=$(-1)^{S_u}r^{M_u}D_u$ wherein $r^k \leq D_u < r^{k+1}$, 2) the logarithm alg $r^{M_u}$=$M_u$alg r, followed by 3) a restricted-range FXP logarithm alg $D_u$.

The value for the logarithm in operation 2) can be effciently retrieved from a (p+1)-entry look-up table indexed by $M_u$ when a≠r. However, choosing a=r, whence k=0, allows k+$F_u$=alg $D_u$ to be an unsigned fraction. Then $N_u$=$M_u$ and the $M_u$+k addition is not required. Thus it is efficiency rather than mathematical necessity which dictates a=r with the assignment a=r=2 usually being most efficient on binary hardware. Thus there is a natural interest in clarifying the close connection between binary E-FLP and the maximally efficient hidden-bit form of binary C-FLP.

The discussion of binary E-FLP systems is greatly aided by defining the functions bld u≡blg(1+u)≡$\log_2(1+u)$ and bxd u≡$-1$+bxp u≡$2^u-1$. These two functions bld u and bxd u, respectively, are referred to as the binary diff-logarithm and binary diff-exponential of argument u. These functions are inverses of each other, i.e., bld bxd u=u and bxd bld u=u over appropriate ranges of u. When the arguments of bld and bxd are restricted to nonnegative fractional values, the BLD and BXD are written in upper-case form to emphasize that 1) both the operand and the result of each of these operations remain fractional, and 2) these functions may be physically implemented in such form within an E-FLP system.

In a binary E-FLP system wherein a=2≡b, the complete logarithmization û=FLOAT(u), i.e., an evaluation of $S_u$ and an evaluation of the E-FLP format value U=blg|u|=blg($2^{N_u}D_u$))=blg($2^{N_u}(1+\{D_u\})$)=blg(-$2^{N_u}(1+G_u)$)=blg $2^{N_u}$+blg(1+$G_u$)=$N_u$+blg(1+$G_u$)=$N_u$+bld $G_u$=$N_u$+BLD $G_u$=$N_u.F_u$, for binary value u, becomes the following pair of operations: a) ũ=NORML(u), i.e., extract $S_u$, $N_u$, and $G_u$ by normalizing u to C-FLP normal form ũ=$(-1)^{S_u}2^{N_u}(1+G_u)$, wherein $0 \leq G_u < 1$, and then b) û=FLAT (ũ), i.e., complete the binary logarithmization of u via the L-FIX binary difflogarithm of restricted argument $F_u$=BLD $G_u$, which converts ũ into û.

The E-FLP FLOAT operation produces û from u as a data-mode conversion through NORML and FLAT in sequence, possibly under the restriction that u be integer. The C-FLP exponent bias is included primarily in order to simplify detection of overflow and underflow. The exponent bias performs essentially identical functions in E-FLP. [This permits free choice of the k value when it can be included in such bias without incurring further execution time penalty.]

DENORML, FLEX, and FIX Data-Mode Conversions

The names DENORML, FLEX, and FIX, respectively, are given to the inverses of data conversions NORML, FLAT, and FLOAT. Thus the FIX E-FLP-to-FXP conversion operation $u=FIX(\hat{u})$ is implemented as $(-1)^{S_u}a^{N_u.F_u}$ in this reverse sequence: b') $\tilde{u}=FLEX(\hat{u})$, i.e., start the exponentiation (de-logarithmization) of $\hat{u}$ via the base-a exponential of restricted argument, namely $a^{F_u}$ in the equation $(-1)^{S_u}a^{N_u}a^{F_u}=(-1)^{S_u}a^{N_u}D_u$, wherein $D_u=\text{axp } F_u$, thereby converting $\hat{u}$ to $\tilde{u}$; then a') $u=\text{DENORML}(\tilde{u})$, which completes the exponentiation by performing the denormalization and, when required, includes the final FXP negation, i.e., $u=(-1)^{S_u}a^{N_u}D_u$.

In a binary E-FLP system wherein $a=2 \equiv b$, the E-FLP-to-FXP conversion $u=FIX(\hat{u})$, is implemented as $(-1)^{S_u}2^{N_u.F_u}$ in this reverse sequence: b') $\tilde{u}=FLEX(\hat{u})$, i.e., start the exponentiation (de-logarithmization) of $\hat{u}$ via the binary exponential of restricted argument, namely as $2^{F_u}$ in the equation $(-1)^{S_u}2^{N_u}2^{F_u}=(-1)^{S_u}2^{N_u}(1+G_u)$, wherein $G_u=\text{bxd } F_u=\text{BXD } F_u$, then a') $u=\text{DENORML}(\tilde{u})$, which completes the exponentiation by performing the denormalization $u=(-1)^{S_u}2^{N_u}D_u$, wherein $D_u=1+G_u$ and any required final FXP negation is included. [Note that, as for BLD above, BXD is upper-case as a mnemonic reminder that 1) both the operand and the result of this operation remain fractions, and 2) this function may be physically implemented as a L-FXP function in an E-FLP system.] In summary, the basic data-mode conversions are as follows:

| | |
|---|---|
| $\tilde{u} = \text{NORML}(u)$ | $u = \text{DENORML}(\tilde{u})$ |
| $\hat{u} = \text{FLAT}(\tilde{u})$ | $\tilde{u} = \text{FLEX}(\hat{u})$ |
| $\hat{u} = \text{FLOAT}(u)$ | $u = \text{FIX}(\hat{u})$, | wherein only minor modifications of these conversions are necessary to accommodate either signed or unsigned integer FXP data types.

E-FLP Relates to the Brown Model

In "A Simple but Realistic Model of Floating-Point Computation," *ACM Transactions on Mathematical Software*, December, 1981, 445–480, W. S. Brown describes a formal model of C-FLP computation wherein such computation is viewed as an elementary form of interval computation. A central feature of this model is that the numerical representation of each atomic (i.e., most elementary) interval is considered to include some nonzero error whose magnitude is generally not less than that of a single rounding or truncation error. Based on such nonzero error bounds of its operands, corresponding nonzero error bounds can be inferred for a given implementation of each of the basic C-FLP operations.

The equivalent model of E-FLP computation is in many respects even simpler because multiplication and division are the only really fundamental dyadic operations in E-FLP computation (because the condition flags which can be derived from the division operation effectively constitute the compare operation). These operations, in being implemented as L-FXP addition and subtraction, respectively, meet the strongest possible precision requirements in giving exact results for exact operands. Furthermore, even for inexact operands these L-FXP addition and subtraction operations offer particularly simple expressions both for absolute error bounds and for mean squared-error estimates of results in terms of the corresponding error measures of their operands. Such expressions yield, respectively, related absolute bounds for multiplicative error and for estimates of mean squared multiplicative error in the E-FLP multiplication and division operations.

FUNDAMENTAL FORMULA OF E-FLP

As implemented in the spirit of the Brown model, the E-FLP subtraction operation $u-v$ can encounter a severe loss of precision when u and v are both nonzero of the same sign, and of closely similar magnitudes. If either u or v is inexact (to the extent of including a single rounding error, say) then such loss of precision is inherent and is as unavoidable in C-FLP as it is in E-FLP. On the other hand if u and v are to be taken as exact then the loss of precision is not inherent. The subtraction operation in C-FLP is usually implemented such that the result is exact in such cases. Although a finite representation of the exact result is formally impossible in E-FLP, a precise procedure is available, nonetheless, to calculate a full-precision result, e.g., with precision limited only by rounding to a finite data-format size. Such a precise procedure is possible according to the product series expansion $$u - v = \text{sign}(u)\frac{\sqrt{uv}}{q_a}\left(\text{alg}\frac{u}{v}\right)\prod_{j=1}^{\infty}\text{axp}\left(c_j\left(\text{alg}\frac{u}{v}\right)^{2j}\right), \quad (26)$$

$$\left|\text{alg}\frac{u}{v}\right| < 2\pi q_a,$$

$$c_j = B_{2j}/(2j(2j)!q_a^{2j-1}), \quad q_a = \text{alg } e$$

wherein $B_{2j}$ is the 2j-th Bernoulli number. The first few of the Bernoulli numbers are: $B_0=1$, $B_1=-\frac{1}{2}$, $B_2=1/6$, $B_3=0$, $B_4=-1/30$, $B_5=0$, $B_6=1/42$, $B_7=0$, $B_8=-1/30$, $B_9=0$, $B_{10}=5/66$, $B_{11}=0$, $B_{12}=691/2730$, $B_{13}=0$ and $B_{14}=7/6$.

E-FLP evaluation of this formula is actually comparatively efficient as it uses only functions which are elementary operations of the E-FLP "arithmetic" and which execute generally faster than the E-FLP addition and subtraction operations. The convergence is particularly rapid for $|\text{alg}(u/v)| << 2\pi q_a$ which is the region wherein this formula is usually most needed.

When $a=2\equiv b$ the subscript of $q_a$ (and of $Q_a$ hereinafter) is often omitted. The fundamental equation (26) for a binary E-FLP system then takes the following form:

$$u - v = \text{sign}(u)\frac{\sqrt{uv}}{q}\left(\text{blg}\frac{u}{v}\right)\prod_{j=1}^{\infty}\text{bxp}\left(c_j\left(\text{blg}\frac{u}{v}\right)^{2j}\right), \quad (27)$$

$$\left|\text{blg}\frac{u}{v}\right| < 2\pi q.$$

$$c_j = B_{2j}/(2j(2j)!q^{2j-1}), \quad q = \text{blg } e.$$

The right hand side of (26) is essentially multiplicative (in the relatively precise sense that the logarithm of the magnitude of the result can be evaluated directly from the logarithms of the magnitudes of the arguments without incurring any but low order error). Formula (26) or one or another of its many closely related forms such as (28) hereinafter, finds ubiquitous application throughout the theory, design, and implementation of E-FLP processors as well as in the practical application of these processors to optimized E-FLP computation. Formula (26) together with the elementary relation $u+v=(u^2-v^2)/(u-v)$ often leads to effective transformation of additive algebraic expressions, viz., $u-v$ and $u+v$, into more multiplicative forms, i.e., into products of exponentials. These useful transformations are completely new series expansions and regularly provide new insight into the problem at hand as well as being available for generally easing evaluation and retaining precision. Thus with small risk of overstatement equation (26) may be called the fundamental formula of E-FLP.

PRODUCT-DIFFERENCE-OF-EXPONENTIALS

When the magnitudes of E-FLP values u and v are represented as exponentials of respective L-FXP exponent values U and V, the fundamental E-FLP formula (26) corresponds to the following fundamental formula of L-FXP, which may also be called the product-difference-of-exponentials (PDOE) series expansion:

$$a^U - a^V = \left(\frac{U-V}{q_a}\right) \text{axp}(\tfrac{1}{2}(U+V)) \prod_{j=1}^{\infty} \text{axp}\left(\frac{B_{2j}(U-V)^{2j}}{2j(2j)! q_a^{2j-1}}\right), \; |U-V| < 2\pi q_a, \; q_a = \text{alg } e \quad (28)$$

$$= \left(\frac{U-V}{q_a}\right)\text{axp}\left(\tfrac{1}{2}(U+V) + \sum_{j=1}^{\infty} \frac{B_{2j}(U-V)^{2j}}{2j(2j)! q_a^{2j-1}}\right) \quad (29)$$

$$= \text{sign}(U-V)\text{axp}(Y - Q_a + \tfrac{1}{2}(U+V) + \Sigma), \; Y = \text{alg}|U-V|,$$

$$\Sigma = \sum_{j=1}^{\infty}(-1)^{j+1}\text{axp}(d_j + j2Y), \; Q_a = \text{alg } q_a, \; d_j = \text{alg}|B_{2j}/(2j(2j)!q_a^{2j-1})| \quad (30)$$

wherein the term $j2Y$ may be realized very efficiently as successive additions of Y or 2Y. Thus equation (26) avoids addition operations while equation (30) avoids multiplication operations. Setting $V=0$ in the preceding set of equations produces the product-of-exponentials series expansion for $axd\;U$.

As indicated above, when $a=2\equiv b$ the subscripts on $q_a$ and $Q_a$ are often omitted. Thus the PDOE equations (28)–(30) may take the following binary forms:

$$2^U - 2^V = \left(\frac{U-V}{q}\right)\text{bxp}(\tfrac{1}{2}(U+V)) \prod_{j=1}^{\infty}\text{bxp}\left(\frac{B_{2j}(U-V)^{2j}}{2j(2j)!q^{2j-1}}\right), \; |U-V| < 2\pi q, \; q = \text{blg } e \quad (31)$$

$$= \left(\frac{U-V}{q}\right)\text{bxp}\left(\tfrac{1}{2}(U+V) + \sum_{j=1}^{\infty}\frac{B_{2j}(U-V)^{2j}}{2j(2j)!q^{2j-1}}\right) \quad (32)$$

$$= \text{sign}(U-V)\text{bxp}(Y - Q + \tfrac{1}{2}(U+V) + \Sigma) \; Y = \text{blg}|U-V|, \quad (33)$$

$$\Sigma = \sum_{j=1}^{\infty}(-)^{j+1}\text{bxp}(d_j + j2Y), \; Q = \text{blg } q, \; d_j = \text{blg}|B_{2j}/(2j(2j)!q^{2j-1})|.$$

As a practical matter, when an E-FLP processor is implemented in the spirit of the Brown model mentioned above, the user's need for the foregoing sort of precise subtraction is comparatively rare though not completely absent. An economical way to accomodate both situations while taking into acount count their respective relative frequencies of execution, is to implement a loss-of-precision (LOP) condition flag to indicate that the particular subtraction operation setting the flag can be repeated (on the original operands) using the first few terms of formula (26) when such a precise result is desired.

CONTINUED-EXPONENTIAL SERIES EXPANSIONS

The economical exponentials of E-FLP and L-FXP computations lead to the use of functional expansions of exponential expressions "continued" within other exponentials. Thus for positive u there is $$\begin{aligned}
&c_1 u \text{axp}(c_2 u \text{axp}(c_3 u \text{axp}(c_4 u \text{axp}(\ldots)))) \\
&= c_1 a^U \text{axp}(c_2 a^U \text{axp}(c_3 a^U \text{axp}(c_4 a^U \text{axp}(\ldots)))) \quad (34)\\
&= c_1 \text{axp}(U + c_2 \text{axp}(U + c_3 \text{axp}(U + c_4 u \text{axp}(\ldots)))) \quad (35)\\
&= s_1 \text{axp}(C_1)\text{axp}(U + s_2 \text{axp}(C_2)\text{axp}(U + \\
&\quad s_3 \text{axp}(C_3)\text{axp}(U + s_4 \text{axp}(C_4)\text{axp}(U \ldots)))), \quad (36)\\
&\quad s_k = \text{sign } c_k, \; C_k = \text{alg}|c_k| \\
&= s_1 \text{axp}(C_1 + U + s_2 \text{axp}(C_2 + U + s_3 \text{axp}(C_3 + U + \\
&\quad s_4 \text{axp}(C_4 + U \ldots)))) \quad (37)
\end{aligned}$$

wherein the initial "E-FLP" expression avoids additions and the final "L-FXP" format expression avoids multiplications (other than by signs). When polynomials derived from truncated convergent power series are converted to this form, the inner exponentials can be evaluated economically at less than full precision. One function in particular, $\text{ald}(u/q_a)\equiv\log_a(1+u/q_a)$, finds application in the look-up-table-based function generators of many E-FLP systems and is thus of particular interest. The continued-exponential series expansion for this function is $$\text{ald}(u/q_a) = \quad (38)$$

$$u\text{axp}\left(-\tfrac{1}{2}u\text{axp}\left(-\tfrac{5}{12}u\text{axp}\left(-\tfrac{47}{120}u\text{axp}\left(-\tfrac{12917}{33840}u\cdot\right.\right.\right.$$

-continued $$\text{axp}\left(-\frac{329458703}{874222560} u + \ldots \right)\Big)\Big)\Big)\Big)\Big).$$

Replacing u with $ha^U$, there is $$\text{ald}(hq_a^{-1}a^U) = h\text{axp}\left(U - \frac{1}{2} h\text{axp}\left(U - \frac{5}{12} h\text{axp}(U - \quad (39)\right.\right.$$

$$\frac{47}{120} h\text{axp}\left(U - \frac{12917}{33840} h\text{axp}(U -$$

$$\frac{329458703}{874222560} h\text{axp}(U + \ldots ))))))$$

$$= h\text{axp}(U - h\text{axp}(U' - h\text{axp}(U'' - \quad (40)$$

$$h\text{axp}(U''' + \ldots )))), |hq_a^{-1}a^U| < 1,$$

$$U' = U + \text{alg}(1/2)$$
$$U'' = U + \text{alg}(5/12),$$
$$U''' = U + \text{alg}(47/120).$$

E-FLP Addition and Subtraction

Introduction. The principal problem in implementing the E-FLP addition and subtraction operations involves generating the radix-r format value W of the E-FLP result $w = \hat{u} \pm \hat{v}$ given the radix-r format values U and V, respectively, of $\hat{u}$ and $\hat{v}$. The relations $$|a^U \pm a^V| = a^{\text{alg}|a^U \pm a^V|} = a^W \quad (41)$$

show that the fixed-point functions $\text{alg}|a^U \pm a^V|$ must be generated. When U, V, and $Y = U - V$ have p radix-r digits of fraction, there is the further restriction $T = |Y| < \text{alg}(2r^p) = p \text{ alg } r + \text{alg } 2$ for outside this region the magnitude of one E-FLP operand is less than a rounding error of the other.

The primary symmetries of the $\text{alg}|a^U \pm a^V|$ functions allow transformation of the problem of generating this pair of dyadic (two-argument) functions of the two signed arguments U and V into the smaller problem of generating the two monadic (single-argument) functions alg $|a^T \pm 1|$ of a single unsigned argument $T = |Y|$ wherein $Y = U - V$.

The fixed-point addition and subtraction operation can be used comparatively freely because they are fast, economical, and exact. After the initial $Y = U - V$ subtraction, there are the following elementary relations: $a^U \pm a^V = a^U(1 \pm a^{-Y}) = a^{U + \text{alg}(1 \pm a^{-Y})}$ when $V < U$ and $a^U \pm a^V = \pm a^V + a^U = \pm a^V(1 \pm a^Y) = \pm a^{V + \text{alg}(1 \pm a^Y)}$ when $U < V$. Each of these "simpler" functions $\text{alg}|1 \pm a^{-|Y|}| = \text{alg } |1 \pm a^{-T}|$ now requires only one exponential and one logarithm (instead of the original two exponentials and one logarithm). Despite this improvement, however, prior-art generators for both of these functions remain distinctly inefficient.

INTEGRATED E-FLP ADDITION AND SUBTRACTION

Definitions

The signed-integer and unsignedfraction portions of X are denoted by [X] and {X}, respectively. Hereinafter, AXP refers to the axp function generator capable of handling nonnegative fraction operand values. In one context ALG D refers to a alg function generator capable of handling operand values restricted to $r^J \leq D < r^{J+K+1}$. In another context ALG(d+v) refers to a alg function generator capable of handling the particular restricted domain which the designer may choose for d+v.

The signed subtraction $Y = U - V$ may be performed in two parts using separate subtracters, say. Thus the signed-integer subtraction $[T] = [U] - [V] - C$ follows the subtraction of unsigned fractions $-C + \{T\} = \{U\} - \{V\}$ wherein C is the carry-out/borrow status, i.e., $C = 1$ when $\{U\} < \{V\}$ and $C = 0$ otherwise. There is also $[-Y] = [V] - [U] - 1 + C + Z_{\{Y\}}$, $Z_{\{Y\}} = [1 - \{Y\}]$, and $\{-Y\} = \{1 - \{Y\}\}$.

For the E-FLP subtraction $a^U - a^V$, the condition $U = V$ must be detected for assigning the singular value zero to the result.

Integrated E-FLP Addition and Subtraction for General Base a and Radix r

A compactly, integrated formula for the format value W of the result $\hat{w}$ of the E-FLP addition and subtraction of two general unsigned normal E-FLP numbers $\hat{u}$ and $\hat{v}$ possessing format quantities U and V, respectively, can take the following form:

$$W = \text{alg}|a^U \pm a^V| \quad (42)$$
$$= [T] + \min(U,V) + P, \quad (43)$$
$$T = |Y|, Y = U - V$$
$$P = \text{alg}(\text{AXP}\{T\} \pm a^{-[T]})$$

wherein the sign of P or [P] or even all of P may be made available to the user as alternative loss-of-precision (LOP) indicators. The similar case for $a = 2 = b$ is described in greater detail hereinafter.

Once the quantity AXP{T} in (43) is generated and the quantity $d = \text{AXP}\{T\} \pm a^{-[T]}$ is evaluated, then d may be logarithmized. That is, first normalize d to the form $r^M D$ wherein $r^J \leq D < r^{J+K+1}$ for particular constant signed integers J and K, e.g., $1 \leq D < r$ for $J = K = 0$. Then $\text{alg}(r^M D)$ may be evaluated as the sum M alg $r + \text{ALG D}$ wherein ALG D is an alg function generator that is capable of handling an operand D restricted to $r^J \leq D < r^{J+K+1}$. Although values for the first term of this sum can be efficiently derived from a (p+1)-entry lookup table indexed by M, the choice $a = r$ is usually the more economical alternative.

Loss-of-Precision (LOP) Status Flag

More and more left shifting is required in the normalization of d producing $r^M D$ as M and P become successively more negative. This in turn amplifies any error included in d such as a rounding error. Or if T is taken to be exact then there is the error in d which results from generating AXP{T} and $a^{-[T]}$ to a precision of only about p digits rather than p-M digits (wherein $M < 0$). Thus [P] or P can be used as a LOP status indicator variable or just its sign can be used as a more compact LOP status flag. A user given access to such LOP information can then be warned that if U and V are both taken to be exact rather than sharing at least one rounding error, say, between them then a full-precision result is available by effecting the subtraction via the fundamental formula of E-FLP.

This approach is particularly practical and economical in complying with the spirit of the Brown model mentioned above while avoiding the necessity of expensive generation of AXP{T} at up to double precision. Thus the user may transcend the Brown model (to the extent of generating a full-precision subtraction of particular operands when their errors are smaller than a typical rounding error) in the important but comparatively rare instances when that is desired. Moreover, the fundamental formula provides this "increased precision" without the neeed to extend the basic precision of the E-FLP arithmetic.

Each execution of this compactly integrated direct exponential-logarithmic form of E-FLP addition or subtraction implementation requires the fixed execution-time cost of both a restricted-range AXP operation and a restricted-range ALG generation with enough precision for p digits of $\{T\}$. Up to an additional two guard digits are required to yield uniformly rounded results as long as LOP does not occur.

For Binary Base and Radix, $a = r = 2 \equiv b$ with $J = K = 0$. For positive Y wherein $Y = U - V$ there is $$
\begin{align}
2^U \pm 2^V &= 2^V(2^{U-V} \pm 1), V < U \tag{44}\\
&= 2^V(2^Y \pm 1), 0 < Y = U - V \tag{45}\\
&= 2^V(2^{\lfloor Y \rfloor + \{Y\}} \pm 1) \tag{46}\\
&= 2^{\lfloor Y \rfloor + V}(2^{\{Y\}} \pm 2^{-\lfloor Y \rfloor}) \tag{47}\\
&\approx 2^{\lfloor Y \rfloor + V}(\text{bxp}\{Y\} \pm 2^{-\lfloor Y \rfloor}) \tag{48}\\
&\approx 2^{\lfloor Y \rfloor + V}(1 + \text{bxd}\{Y\} \pm 2^{-\lfloor Y \rfloor}) \tag{49}\\
&\approx 2^{\lfloor Y \rfloor + V}(1 + \text{BXD}\{Y\} \pm 2^{-\lfloor Y \rfloor}) \tag{50}\\
&= 2^{\lfloor Y \rfloor + V} d, 0 < d < 3 \tag{51}\\
&= 2^{\lfloor Y \rfloor + V} 2^M (1 + g), 0 \leq g < 1 \tag{52}\\
&= 2^{\lfloor Y \rfloor + V + \text{blg} 2^M + \text{blg}(1+g)} \tag{53}\\
&= 2^{\lfloor Y \rfloor + V + \text{blg} 2^M + \text{bldg}} \tag{54}\\
&\approx 2^{\lfloor Y \rfloor + V + M + \text{BLDg}} \tag{55}\\
&\approx 2^{\lfloor Y \rfloor + V + M \cdot G}, G = \text{BLDg} \tag{56}\\
&= 2^{\lfloor Y \rfloor + V + P + \{P\}}, P = M \cdot G \tag{57}\\
&= 2^{\lfloor Y \rfloor + V + P} (= 2^{\lfloor U \rfloor - C + \{V\} + P}) \tag{58}\\
&= 2^W. \tag{59}
\end{align}
$$

For negative Y there is $$
\begin{align}
2^U \pm 2^V &= \pm 2^V + 2^U, U < V \tag{60}\\
&= \pm 2^U(2^{V-U} \pm 1) \tag{61}\\
&= \pm 2^U(2^{-Y} \pm 1), Y = U - V < 0 \tag{62}\\
&= \pm 2^U(2^{-\lfloor Y \rfloor + \{-Y\}} \pm 1) \tag{63}\\
&= \pm 2^{\lfloor -Y \rfloor + U}(2^{\{-Y\}} \pm 2^{-\lfloor -Y \rfloor}) \tag{64}\\
&\approx \pm 2^{\lfloor -Y \rfloor + U}(\text{bxp}\{-Y\} \pm 2^{-\lfloor -Y \rfloor}) \tag{65}\\
&\approx \pm 2^{\lfloor -Y \rfloor + U}(1 + \text{bxd}\{-Y\} \pm 2^{-\lfloor -Y \rfloor}) \tag{66}\\
&\approx \pm 2^{\lfloor -Y \rfloor + U}(1 + \text{BXD}\{-Y\} \pm 2^{-\lfloor -Y \rfloor}) \tag{67}\\
&= \pm 2^{\lfloor Y \rfloor + U} d, 0 < d < 3 \tag{68}\\
&= \pm 2^{\lfloor -Y \rfloor + U} 2^M(1 + g), 0 \leq g < 1 \tag{69}\\
&= \pm 2^{\lfloor -Y \rfloor + U + \text{blg} 2^M + \text{blg}(1+g)} \tag{70}\\
&= \pm 2^{\lfloor -Y \rfloor + U + M + \text{bldg}} \tag{71}\\
&\approx \pm 2^{\lfloor -Y \rfloor + U + M + \text{BLDg}} \tag{72}\\
&\approx \pm 2^{\lfloor -Y \rfloor + U + M \cdot G}, G = \text{BLDg} \tag{73}\\
&= \pm 2^{\lfloor -Y \rfloor + U + P + \{P\}}, P = M \cdot G \tag{74}\\
&= \pm 2^{\lfloor -Y \rfloor + U + P} (= \pm 2^{\lfloor V \rfloor - 1 + C + Z\{Y\} + \{U\} + P}) \tag{75}\\
&= \pm 2^W. \tag{76}
\end{align}
$$

Integrated Binary E-FLP Addition and Subtration

Similar to the preceding integrated addition and subtraction for general base-a, a compactly integrated formula for the format value W of the result ŵ of the binary E-FLP addition and subtraction of the two general unsigned normal binary E-FLP numbers û and v̂ possessing format quantities U and V, respectively, can take the form of $$
\begin{align}
W &= \text{blg}|2^U \pm 2^V| \tag{77}\\
&= \lfloor T \rfloor + \min(U, V) + P, \tag{78}\\
&\quad T = |Y|, Y = U - V\\
&\quad P = \text{blg}(\text{bxp}\{T\} \pm 2^{-\lfloor T \rfloor})\\
&\quad = \text{blg}(1 + \text{BXD}\{T\} \pm 2^{-\lfloor T \rfloor})\\
&\quad = \text{bld}(\text{BXD}\{T\} \pm 2^{-\lfloor T \rfloor})
\end{align}
$$

wherein the sign of P or $\lfloor P \rfloor$ or even all of P may be made available to the user as alternative loss-of-precision (LOP) indicators.

Once the quantity $1 + \text{BXD}\{T\}$ in (78) is generated and $2^{-\lfloor T \rfloor}$ is added or subtracted to yield a quantity $d = 1 + \text{BXD}\{T\} \pm 2^{-\lfloor T \rfloor}$, d, can be logarithmized. For example, d may be first normalized to the form $2^M(1+g)$ wherein M is an integer and $0 \leq g < 1$. Then $\text{blg}(2^M(1+g)) = M + \text{blg}(1+g) = M + \text{BLDg} = M.G$ may be evaluated.

However, when the leading 1-bit of $1 + \text{BXD}\{T\}$ remains "hidden," i.e., implicit, then $d' = \{\text{BXD}\{T\} \pm 2^{31} \lfloor T \rfloor\}$ which may or may not be accompanied by an overflow carry from the addition or an underflow borrow from the subtraction. The required normalization can include the implicit 1-bit without requiring that this bit needlessly take up space in an accumulator or data register. The following cases must be handled:

1) If no overflow carry or underflow borrow accompanies d' then $M = 0$ and $g = d'$, no normalizing shifting is required, and BLD g can proceed immediately;

2) An overflow carry indicates that the normalization requires a) setting $M = 1$ and b) performing a single bit place logical right shift on d', i.e., $g = d'/2$, and c) generating BLD g;

3) An underflow borrow (which occurs comparatively infrequently for uniformly distributed U and V) cancels out the implicit 1-bit whereupon the complete logarithmization blg d' is required, i.e., a) normalizing d' to extract M and g wherein $d' = 2^M(1 + g)$ with $0 \leq g < 1$ and b) BLD g; such that $\text{bld}(\text{BXD}\{T\} \pm 2^{-\lfloor T \rfloor}) = M + \text{BLD g}$ in all cases.

Loss-of-Precision (LOP) Status Flag in Binary E-FLP

M and P become successively more negative as more and more left shifting is required in the normalization of d' producing $2^M(1+g)$. This left shifting in turn amplifies any error included in d', such as a rounding error. On the other hand, if the magnitude of the error in T is much less than a typical rounding error, then there is still the error in d' which results from generating BXD $\{T\}$ and $2^{-T}$ to a precision of only about p significant bits rather than p-M bits (wherein $M < 0$). Thus $\lfloor P \rfloor$ or P can be used as a LOP status indicator variable, or just its sign can be used as a more compact LOP status flag.

A user given access to such LOP information can then be warned that if U and V are both taken to be exact (rather than sharing at least one rounding error, say, between them) then a full-precision result is available by realizing the subtraction via the fundamental formula of E-FLP. This approach is particularly practical and economical in complying with the spirit of the Brown model mentioned above while avoiding the necessity of expensive generation of BXD $\{T\}$ at up to double precision. Thus the user may transcend the Brown model (to the extent of generating a full-precision subtraction of particular operands when their errors are smaller than a typical rounding error) in the important but comparatively rare instances when that is desired. Moreover, the fundamental formula provides this "increased precision" without any need to extend the basic precision of the E-FLP arithmetic.

Faster Negation of Binary T

In general the foregoing generation will require up to two low-order guard bits suffixed to T and succeeding variables, in order to generate uniformly-rounded results within the spirit of the Brown model. When this is done, the error in the one's-complement approximation of the two's-complement negation 1-T is attenuated by $2^{-2}$ relative to a low-order count of the original T. Yet this complement requires no carry-propagation time and no special handling of the two's-complement carry-out $Z_{\{T\}} = \lfloor 1-\{T\}\rfloor$ when $\{T\} = 0$. A bias compensating for the constant deficit introduced by this one's-complement approximate negation can often be easily combined with the $2^{-\lfloor T \rfloor}$ value, i.e., effectively executed after rather than before the BXD$\{T\}$ generation. This has the effect of further reducing by up to about two thirds even this attenuated error contribution. Thus in this negation the major advantages of both types of complement are made available while avoiding the major disadvantages of both.

Each execution of this compactly-integrated direct exponential-logarithmic form of E-FLP addition or subtraction implementation requires the fixed execution-time cost of both a BXD generation and a BLD generation with enough precision for p signficant bits of $\{T\}$. Up to an additional two guard bits are required in order to yield uniformly-rounded results as long as LOP does not occur.

An Alternative Implementation of E-FLP Addition and Subtraction

Further Definitions

In the foregoing design each E-FLP addition or subtraction operation requires executing both of the restricted-range AXP and ALG (or BXD and BLD) function generations at full precision. The costs of these full-precision function generations escalate as their associated precision increases. The alternative method described hereinafter allows construction of the full-precision E-FLP addition and subtraction operations without demanding that these AXP and ALG (or BXD and BLD) function generators perform at the full precision of the E-FLP system.

Further Definitions. The general base-a mur and lus functions are defined as $$\text{amr } x \equiv \text{alg}(a^x + 1) \equiv \text{alg (axp } x + 1) \tag{79}$$

$$\text{als } x \equiv \text{alg } |a^x - 1| \equiv \text{alg } |\text{axp } x - 1| \tag{80}$$

with the base-a murlus functions further defined as follows:

$$\text{aml}_+ x \equiv \text{amr} x \tag{81}$$

$$\text{aml}_- x \equiv \text{als } x \tag{82}$$

For $a = 2 \equiv b$, the corresponding binary (i.e., base-2) mur and lus functions are defined as follows:

$$\text{bmr } x \equiv \text{blg}(2^x + 1) \equiv \text{blg(bxp } x + 1) \tag{83}$$

$$\text{bls } x \equiv \text{blg } |2^x - 1| \equiv \text{blg } |\text{bxp } x - 1| \tag{84}$$

with the binary murlus functions further defined as $$\text{bml}_+ x \equiv \text{bmr } x \tag{85}$$

$$\text{bml}_- x \equiv \text{bls } x \tag{86}$$

Elementary properties of these functions include the following functional equations:

$$\text{amr } x = x + \text{amr}(-x), \; -\infty < x < \infty \tag{87}$$

$$\text{als } x = x + \text{als}(-x), \; -\infty < x < \infty \tag{88}$$

$$\text{aml}_\pm x = x + \text{aml}_\pm(-x), \; -\infty < x < \infty \tag{89}$$

$$\text{bmr } x = x + \text{bmr}(-x), \; -\infty < x < \infty \tag{90}$$

$$\text{bls } x = x + \text{bls}(-x), \; -\infty < x < \infty \tag{91}$$

$$\text{bml}_\pm x = x + \text{bml}_\pm(-x), \; -\infty < x < \infty \tag{92}$$

which provide easy access to function values of positive arguments when the corresponding values are known for negative arguments and vice versa. [A subscript + or − is required on the "aml" in order to specify "amr" and "als," respectively. However, if both functions are to be specified but in a particular order, then "aml$_\pm$" and "aml$_\mp$" can be written as "aml" and "alm," respectively, without ambiguity. Nevertheless, for added clarity, all subscripts will be explicity.]

There are also the following alternative statements of what is essentially a single elementary relation:

$$\text{amr } x = \text{als } 2x - \text{als } x, \; -\infty < x < \infty \tag{93}$$

$$\text{aml}_+ x = \text{aml}_-(2x) - \text{aml}_-(x), \; -\infty < x < \infty \tag{94}$$

$$\text{bmr } x = \text{bls } 2x - \text{bls } x, \; -\infty < x < \infty \tag{95}$$

$$\text{bml}_+ x = \text{bml}_-(2x) - \text{bml}_-(x), \; -\infty < x < \infty \tag{96}$$

which, for $x = U$, derives the format value of the E-FLP operation $\hat{u} + 1$ from the identity $\hat{u} + 1 \equiv (\hat{u}^2 - 1)/(\hat{u} - 1)$. The signs for the binary murlus functions are $$\text{bml}_\pm x = |\text{bml}_\pm x|, \; 1 \leq x \tag{97}$$

$$\text{bml}_\pm x = \pm |\text{bml}_\pm x|, \; x < 1. \tag{98}$$

Continued-Exponential Series Expansions at Strongly Negative Arguments. When $x << 0$ with $a^x << 1$, the following direct expansions as continued-exponential series converge rapidly:

$$\begin{aligned}
\text{aml}_\pm x &\equiv \text{alg}|a^x \pm 1| &(99)\\
&= \text{alg}(1 \pm a^x) &(100)\\
&= \text{ald}(\pm a^x) &(101)\\
& &(102)\\
&= \text{ald}(\pm q_a^{-1} a^{Q_a + x}), \begin{cases} q_a \equiv \text{alg} e = (\ln a)^{-1} \\ Q_a \equiv \text{alg} \text{alg} e = (\ln a)^{-1} \ln q_a \end{cases}\\
&= \text{ald}(\pm q_a^{-1} a^T), \; T = Q_a + x &(103)\\
&\mp \pm \text{axp}(T \mp \text{axp}(T' \mp \text{axp}(T'' \mp \ldots))), &(104)\\
&T = T + \text{alg}(1/2), \; T' = T + \text{alg}(5/12)
\end{aligned}$$

wherein the restricted-range AXP suboperations of the inner exponentials demand less precision than those of the outer exponentials. Fewer and fewer exponentials are required as the argument goes more negative until for $x < -p$ alg $r - \text{alg } 2 - Q_a$ no calculation at all is required as the exact value is then less than a rounding error.

For $a = 2 \equiv b$, the preceding set of equations with $x << 0$ takes the following more specific binary form:

$$\begin{aligned}
\text{bml}_\pm x &\equiv \text{blg}|2^x \pm 1| &(105)\\
&= \text{blg}(1 \pm 2^x) &(106)\\
&= \text{bld}(\pm 2^x) &(107)
\end{aligned}$$

-continued $$= \text{bld}(\pm q^{-1}2^{Q+x}), \begin{cases} q = \text{blg}e = (\ln 2)^{-1} \\ Q = \text{blgblg}e = (\ln 2)^{-1}\ln q \end{cases} \quad (108)$$

$$= \text{bld}(\pm q^{-1}2^T), \; T = Q + x \quad (109)$$

$$= \pm \text{bxp}(T \mp \text{bxp}(T' \mp \text{bxp}(T'' \mp \ldots)))), \quad (110)$$
$$T' = T + \text{blg}(1/2), \; T'' = T + \text{blg}(5/12)$$

wherein the restricted-range BXD suboperations of the inner exponentials demand less precision than those of the outer exponentials. Fewer and fewer exponentials are required as the argument goes more negative until for $x < -p - 1 - Q$ no calculation at all is required as the exact value is then less than a rounding error.

Interpolation of Lookup-Table Values

There is the further alternative of interpolating between economical, comparatively sparse $\text{aml}_\pm$ lookup-table values to speedup generation of these functions. This alternative becomes particularly useful for argument domains wherein the above methods require generating the restricted-range ALG and AXP (or BLD and BXD) functions at substantially full precision in generating $\text{aml}_\pm x$ (or $\text{bml}_\pm x$) values of full precision.

Expressions for this interpolation correction for a radix-r positive argument value $x = u + hv > 0$ with $0 \leq v < 1$ and $h = r^{-n}$ may be derived as follows:

$$\text{aml}_\pm(u + hv) = \text{aml}_\pm(u' + h(d + v)), \; u' = u - hd, \; 0 \leq d < r, \; d = d \quad (111)$$
$$= u + (\text{aml}_\pm(-u') - h) + \text{ald}_\pm(hq_a^{-1}a^{T\pm}), \quad (112)$$
$$T_\pm = \text{ALG}(d + v) - (\text{aml}_\pm(-u') - h) - h + h\tfrac{1}{2}(d + v) +$$
$$\sum_{j=1}^{\infty} (-1)^{j+1}h^{2j}q_a^{d_j} + 2jALG(d+v), \; d_j = \text{alg}|B_{2j}/(2j(2j)!q_a^{2j-1})|$$
$$= u + (\text{aml}_\pm(-u') - h) + h\text{axp}(T_\pm - h\text{axp}(T_\pm' - h\text{axp}(T_\pm'' - \ldots))), \quad (113)$$
$$T_\pm' = T_\pm + \text{alg}(1/2), \; T_\pm'' = T_\pm + \text{alg}(5/12).$$

For $a = r = 2 \equiv b$ with $d = 1$ and $x = u + hv > 0$ wherein $0 \leq v < 1$ and $h = 2^{-n}$, the preceding set of equations describes the interpolation of $\text{bml}_\pm$ lookup table values for a binary positive argument value. The equations may take the following more specific binary form:

$$\text{bml}_\pm(u + hv) = \text{bml}_\pm(u' + h(1 + v)), \; u' = u - h, \quad (114)$$
$$= u + (\text{bml}_\pm(-u') - h) + \text{bld}_\pm(hq^{-1}2^{T\pm}), \quad (115)$$
$$T_\pm = \text{BLG}v - (\text{bml}_\pm(-u') - h) - h + u' + h\tfrac{1}{2}(1 + v) +$$
$$\sum_{j=1}^{\infty} (-1)^{j+1}h^{2j}2^{d_j} + 2jBLDv, \; d_j = \text{blg}|B_{2j}/(2j(2j)!q^{2j-1})|$$
$$= u + (\text{bml}_\pm(-u') - h) + h\text{bxp}(T_\pm - h\text{bxp}(T_\pm' - h\text{bxp}(T_\pm'' - \ldots))), \quad (116)$$
$$T_\pm' = T_\pm + \text{blg}(1/2), \; T_\pm'' = T_\pm + \text{blg}(5/12).$$

First-Order Interpolation of Binary Murlus Table Values

With $0 < u' = u - h$, retrieve lookup-table value $(\text{bml}\pm(-u') - h)$ with an error magnitude that is on the order of $h^2$. Indicating by BLD1 and BXD1, respectively, the BLD and BXD operations having an error magnitude on the order of h, evaluate $$M.G = \text{BLD1}(v) - (\text{bml}\pm(-u') - h), \quad (117)$$

$$\text{bml}_\pm(u + hv) \approx u + (\text{bml}\pm-(-u') - h) + h2^M(1 + \text{BXD1}(G)) \quad (118).$$

Second-Order Interpolation of Binary Murlus Table Values

For $0 < u' = u - h$, retrieve lookup-table value $(\text{bml}\pm(-u') - h)$ with an error magnitude that is on the order of $h^3$. With BLD1 and BXD1 defined as before and indicating by BLD2 and BXD2, respectively, the BLD and BXD operations having an error magnitude on the order of $h^2$, evaluate $$M.G = \text{BLD2}(v) - (\text{bml}\pm(-u') - h) - h + h\tfrac{1}{2}(1 + v) \quad (119)$$

$$M'.G' = M.G - 1 \quad (120)$$

$$M''.G'' = M'.G' - h2^M(1 + \text{BLD1}(G')) \quad (121)$$

$$\text{bml}_\pm(u + hv) \approx u + (\text{bml}\pm- \\ (-u') - h + h2^{M''}(1 + \text{BXD2}(G''))) \quad (122).$$

Comparing this second-order process with the preceding one of first order, the necessary additional correction terms are shown to be particularly simple to include. As described above, the BLD2 and BXD2 generations are highly efficient when implemented with first-order interpolation of economical, comparatively sparse table values. These tables also permit ultra-rapid direct lookup of the BLD1 and BXD1 values.

Third and Higher-Order Interpolation

Successively higher-order interpolation processes of this type require that the table values and the BLD and BXD operations become successively more accurate. Restricting the error to be on the order of $h^m$ wherein $h = r^{-n} \ll 1$, table size grows linearly with m and exponentially with n. On the other hand the complexity of the interpolation procedure eventually grows combinatorially (read exponentially) with m and, at least superficially, would seem to remain constant or change only linearly with n. But in a practical design such as a microprogrammed implementation, most data values require alignment along boundaries of registers of predetermined size. Thus there is the potential for major speedup or slowdown to accompany small changes in particular values of n.

Further Reduction: Mur from Lus

In principle, reduction to a single function generator is possible because the generation of the base-a mur function amr $x \equiv \text{alg}(a^x + 1)$ can proceed solely from the base-a lus function als $x \equiv \text{alg}|a^x - 1|$. The relation amr $x = \text{als } 2x - \text{als } x$ is the basis, although this requires generating two separate evaluations of this function. This approach avoids the need for a separate amr function generator. This method is available for practical use only if both als 2x and als x are generated to the precision required for amr x. However, an E-FLP implementation can comply with the spirit of the Brown model of C-FLP computation without requiring full precision in the generation of als x in the region adjacent to the logarithmic singularity of this function. Thus for maximum performance amr x usually must be generated separately from als x, i.e., with two function generators being required rather than just one.

INTEGRATED E-FLP PROCESSOR (FIGS. 1A, 1B AND 1C)

Basic E-FLP Logic

Figures 1A, 1B, 1C:
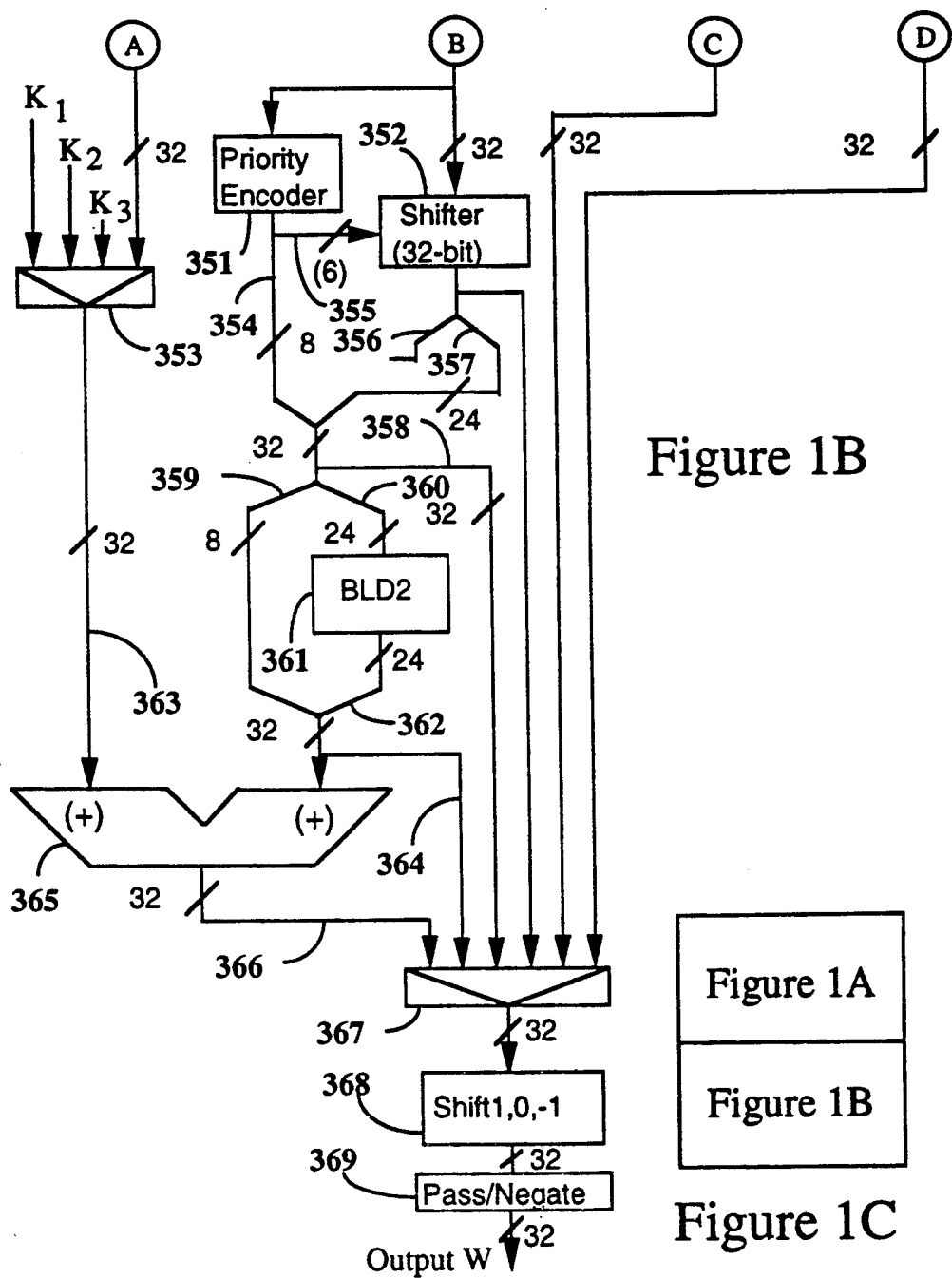
FIG. 1B is a block diagram of a second portion of the basic logic for a 32-bit data format exponential/logarithmic (E/L) processor.
FIG. 1C is a block diagram showing how the logic of FIG. 1A interfaces with the logic of FIG. 1B.

FIG. 1A and FIG. 1B connected as shown in FIG. 1C provide a block diagram of the basic logic of a processor of E-FLP data represented in a 32-bit data format. This processor can also interface efficiently with 32-bit C-FLP data and with signed or unsigned FXP data of up to 24 bits.

The components shown in this block diagram are readily constructed from well known, standardized components such as the following TTL devices: part type 7493, a 4-bit binary counter; part type 7495, a 4-bit parallel-access shift register; part type 74154, a 4-line to 16-line (priority) decoder; part type 74181, a 4-bit ALU (arithmetic logic unit); part type 74253, a dual 4-line to 1-line MUX (multiplexer); part type 74257, a quadruple 2-line to 1-line MUX (multiplexer); and part type 74278, a 4-bit priority (encoder) register. Texas Instruments is an exemplary manufacturer of such devices.

The simple shifters 302, 304 and 369 may each be constructed as a barrel shifter using sixteen type 74253 MUXes or eight type 7495 shift registers. Each of the 32-bit Pass/Negate elements 303, 305, 320 and 369 includes eight type 74257 MUXes and elementary logical gating. The 8-bit Pass/Decrement function 311 includes two type 74283 adders, two type 74257 MUXes and elementary logical gating. The 8-bit ALU 313 and the 24-bit ALU 315 include two and six, respectively, type 74181 ALUs. The 8-bit MUX 310 and the 24-bit MUX 312 include two and six, respectively, type 74257 MUXes. The 32-bit MUXes 337 and 353 each include sixteen type 74253 MUXes. Decoder 327 includes two type 74154 decoders. The priority encoder 351 includes two type 74278 priority encoders. The 32-bit wide shifter 352 can be a fast barrel shifter for non-iterative shifting or can be more economical by instead including eight type 7495 shift registers and a type 7493 counter for iterative shifting. The 25-bit adder 330 includes six type 74283 adders for a 24-bit adder and logic gating for the 1-bit extension. The 32-bit adder 365 includes eight type 74283 adders. The CFP masking function 329 includes two type 74154 decoders and logic gating. The 32-bit MUX 367 includes sixteen type 74253 MUXes and sixteen type 74257 MUXes. The diff-exponential function generator 325 and the diff-logarithmic function generator 361 can each be a comparatively expensive 24-bit input/24-bit output ROM (read-only memory), although a considerably more economical alternative is disclosed in a copending patent application by the inventor herein.

E-FLP operations require that the singular values, the sign bits, the bias, and the tests for overflow and underflow be handled generally the same as they are in C-FLP. Thus such details are not shown. When the 32-bit inputs to the Shifters 302 and 304 are E-FLP data, they are considered to be de-biased, sign-extended FXP format values of the E-FLP operands $\hat{u}$ and $\hat{v}$, respectively. When such data is in the C-FLP format the input shifters usually pass the data unshifted (i.e., a zero bit-place of shift) because such a C-FLP operation is seldom useful. Similarly, the input Pass/Negate functions 303 and 305 usually pass C-FLP data unaltered because negation of the entire format of a C-FLP quantity is seldom desired.

Thus the Input-U Shifter 302 and Pass/Negate function 303, the Input-V Shifter 304 and Pass/Negate function 305, and the Output-W Shifter 368 and Pass/Negate function 369 are "functionality amplifiers" for E-FLP data. These logic blocks require comparatively few logic gates to implement many useful E-FLP operations and functions.

Hence the basic set of 4 dyadic C-FLP operations 1) $\hat{u} + \hat{v} \rightarrow \hat{w}$, 2) $\hat{u} - \hat{v} \rightarrow \hat{w}$, 3) $\hat{u} \times \hat{v} \rightarrow \hat{w}$, and 4) $\hat{u} \div \hat{v} \rightarrow \hat{w}$ is greatly expanded into the following set of $4 \times 6 \times 6 \times 6 = 864$ one-pass E-FLP operations $$(\hat{u}^{\pm i, \pm 1, \pm 2} \times \hat{v}^{\pm i, \pm 1, \pm 2})^{\pm i, \pm 1, \pm 2} \rightarrow \hat{w} \quad (123)$$

$$(\hat{u}^{\pm i, \pm 1, \pm 2} \div \hat{v}^{\pm i, \pm 1, \pm 2})^{\pm i, \pm 1, \pm 2} \rightarrow \hat{w} \quad (124)$$

$$(\hat{u}^{\pm i, \pm 1, \pm 2} + \hat{v}^{\pm i, \pm 1, \pm 2})^{\pm i, \pm 1, \pm 2} \rightarrow \hat{w} \quad (125)$$

$$(\hat{u}^{\pm i, \pm 1, \pm 2} - \hat{v}^{\pm i, \pm 1, \pm 2})^{\pm i, \pm 1, \pm 2} \rightarrow \hat{w} \quad (126)$$

which is but slightly redundant. There is also the following second set of more than $6 \times 6 \times 6 \times 4 = 864$ one-pass E-FLP operations $$(K_i \times blg(\hat{u}^{\pm i, \pm 1, \pm 2} \times \hat{v}^{\pm i, \pm 1, \pm 2})^{\pm i, \pm 1, \pm 2} \rightarrow \hat{w} \quad (127)$$

$$(K_i \times blg(\hat{u}^{\pm i, \pm 1, \pm 2} \div \hat{v}^{\pm i, \pm 1, \pm 2})^{\pm i, \pm 1, \pm 2} \rightarrow \hat{w} \quad (128)$$

$$(bxp(\hat{u}^{\pm i, \pm 1, \pm 2} \times \hat{v}^{\pm i, \pm 1, \pm 2})^{\pm i, \pm 1, \pm 2} \rightarrow \hat{w} \quad (129)$$

$$(bxp(u^{\pm i, \pm 1, \pm 2} \div \hat{v}^{\pm i, \pm 1, \pm 2})^{\pm i, \pm 1, \pm 2} \rightarrow \hat{w} \quad (130)$$

which is somewhat more redundant than the preceding set. However, the corresponding C-FLP execution for these functions would generally be even slower and less economical. This set of operations can easily be extended to include the input and output sign changes, sign transfers, absolute values, signum function, compare, minimum, maximum, and clear-to-zero, etc. whose E-FLP implementations can be identical with their respective C-FLP implementations.

The components of this processor that are more expensive in terms of space and/or time are the BXD2 and BLD2 function generators. The 32-bit shifter can be implemented as a fast barrel shifter or as a more economical but slower iterative shifter. The other components relate to simple fixed-point operations: single-bit-place shifts, one's or two's complements, priority encoding, priority decoding, elementary masking, addition, subtraction, and multiplexer (MUX) operations which are fast and economical.

The repertoire of operations and functions which can be executed in a single pass through the processor includes the following: 1) E-FLP "arithmetic" including logarithms and exponentials, 2) conversions between E-FLP and C-FLP and FXP data formats, 3) miscellaneous E-FLP operations and functions, and 4) FXP operations. In order to emphasize that an E-FLP system can function extremely well without a FXP multiplier, none is included. Yet the system designer may well choose to include a fixed-point multiplier because it allows more general E-FLP roots and powers as single-pass operations. Such a multiplier is then also useful for FXP operations as well.

E-FLP Arithmetic

The operations of the E-FLP "arithmetic," roughly in order of increasing complexity of implementation, may be constructed as follows:

1) Square

The operation $\hat{u}^2 \rightarrow \hat{w}$ is implemented as the corresponding format value operation $2U \rightarrow W$. The sign bit is cleared, i.e., $0 \rightarrow S_w$. The Input-U signal is routed to the Shifter 302 whose control inputs select a single-bit-place left shift of U. The output from the Shifter 302 is routed to the Pass/Negate function 303 and is passed without modification. The output from the Pass/Negate function 303 is partitioned into an 8-bit MS portion 306 and a 24-bit LS portion 307 which are routed, respectively, to the first data inputs of the 8-bit Arithmetic Logic Unit (ALU) 313 and the 24-bit ALU 315. The 8-bit ALU 313 and the 24-bit ALU 315 together constitute a 32-bit ALU which produces the carry-out 314 from the 24-bit ALU 315. This carry-out is coupled to the control/selection logic (not shown) as well as to the carry-in input of the 8-bit ALU 313. Setting input V to zero routes this zero value through Shifter 304 and Pass/Negate function 305 which routes zeroes to the second data inputs of the ALUs 313 and 315. Thus the output from the Pass/Negate function 303 equals the output 319 from the ALUs 313 and 315. The outputs from the ALUs 313 and 315 are routed to the MUX 367 and passed without further alteration through the Shifter 368 and the Pass/Negate function 369 to appear as the output W.

2) Square Root

The operation $\hat{u}^{\frac{1}{2}} \rightarrow \hat{w}$ is implemented much the same as the Squaring operation above except that a right shift is selected instead of a left shift. Testing for illegal negative operand values is elementary and is not shown. [Alternatively, a signed square-root operation can be implemented for applications in control systems, etc.]

3) Reciprocal

The operation $1 \div \hat{u} \rightarrow \hat{w}$ is implemented the same as the foregoing square and square-root operations except that no shifts are selected and one negation by a Pass/Negate function is selected. The sign bit remains unaltered, i.e., $S_u \rightarrow S_w$.

4) Multiplication

The operation $\hat{u} \times \hat{v} \rightarrow \hat{w}$ is implemented as $U + V \rightarrow W$, i.e., as the corresponding format-value operation. The sign bit of the result is the modulo-2 sum (exclusive OR) of the sign bits of the two operands, i.e., $S_u \oplus S_v \rightarrow W_w$. [As in C-FLP, the bias is commonly used so that overflow and underflow can be easily detected merely by checking for the deviation of $S_w$ from $S_u \oplus S_v$.] The operation $\hat{u} \times \hat{v} \rightarrow \hat{w}$ is implemented much the same as the foregoing square, square root, and reciprocal operations except that neither shifts nor negation are selected but fixed-point additions by the ALUs 313 and 315 are selected.

5) Division

The operation $\hat{u} \div \hat{v} \rightarrow \hat{w}$ is implemented as the corresponding format-value operation $U - V \rightarrow W$. The sign bit of the result is the modulo-2 difference ($\equiv$ modulo-2 sum $\equiv$ exclusive OR) of the sign bits of the two operands, i.e., $S_u \ominus S_v \equiv S_u \oplus S_v \rightarrow S_w$. [As for the multiplication operation above the bias is commonly used so that overflow and underflow can be easily detected merely by checking for deviation of $S_w$ from $S_u \oplus S_v$.] The operation $\hat{u} \div \hat{v} \rightarrow \hat{w}$ is implemented like the foregoing multiplication operation except that fixed-point subtractions by the ALUs 313 and 315 are selected.

6) Exponentials

The operation bxp $\hat{u} \rightarrow \hat{w}$ is implemented using $(-1)^{S_u}$bxp $U \rightarrow W$ as the corresponding format-value operation and setting $0 \rightarrow S_w$. Tests for overflow and underflow can be performed as in C-FLP. With the Input V cleared to zero, the Input U is routed unaltered through the Shifter 302, the Pass/Negate function 303, the 32-bit ALU 313–315, and the Pass/Negate function 320. The output 322 from the Pass/Negate function 320 is partitioned into a MS 8-bit integer portion 323 and a LS 24-bit fraction portion 324 which is routed to the BXD2 function generator 325. The 24-bit fraction output from the BXD2 function generator 325 together with the 8-bit integer 323 constitute the 32-bit signal 336 which is routed through the MUX 337 to the 32-bit Shifter 352. The control/selection logic (not shown) intercepts the 8-bit integer portion for use as a shift count (overriding the input from the priority encoder 351) and replaces the integer portion of the actual input to the shifter 352 with the value of one, thereby producing a denormalization operation. The output from 352 is routed without further alteration directly through the MUX 367, through the Shifter 368, and on to the Pass/Negate function 369 wherein negation is selected only if the sign bit $S_u$ of $\hat{u}$ is set. Exponentials of other bases are generated by setting Input V to nonzero values.

7) Logarithms

The operation blg $\hat{u} \rightarrow \hat{w}$ is implemented as blg $|U| \rightarrow W$, with $S_U \rightarrow S_w$. Tests for zero or negative illegal operand values can be performed as in C-FLP. Neither overflow nor underflow can occur if the system provides at least a modest dynamic range. The operation blg $\hat{u}$ is implemented by routing the Input U unchanged to the output 319 of the 32-bit ALU 313–315 as described above. The output 319 from the 32-bit ALU 313–315 is routed to the Pass/Negate function 318 wherein negation is selected if 319 is negative. The output 322 from the Pass/Negate function 318 is routed through the MUX 337 to the Priority Encoder 351 and to the Shifter 352 which together perform a normalization operation. The fraction portion 357 of the output from the Shifter 352 is routed to the BLD2 function generator 361. [The integer portion 356 of the output from the Shifter 352 has the value unity and is not used here.] The fraction output 362 from the BLD2 function generator 361 together with the integer value 359 (equal to the value at 354) are routed directly through the MUX 367, the Shifter 368, and the Pass/Negate function 369. The sign bit of $\hat{w}$ is set if negation was selected at the Pass/Negate function 318. Alternatively, logarithms to other bases are generated by selecting a value $K_1$, $K_2$, or $K_3$ from MUX 353 and routing the selected value to the adder 365 for combining with the value at 364. The output 366 from the adder 365 is then routed through the MUX 367, the Shifter 368, and the Pass/Negate function 369.

8) Addition

Tests for zero operands or other singular values requiring individual treatment can be performed as in C-FLP. Otherwise the operation $\hat{u} + \hat{v} \rightarrow \hat{w}$ on signed normal E-FLP operands $\hat{u}$ and $\hat{v}$ is implemented as follows:

The Input U is routed unaltered through Shifter 302 and the Pass/Negate function 303 whereupon it is partitioned into an 8-bit integer portion 306 and a 24-bit fractional portion 307. Similarly, the Input V is routed unaltered through the Shifter 304 and the Pass/Negate function 305 whereupon it is partitioned into an 8-bit integer portion 308 and a 24-bit fractional portion 309. The integer portion 306 is routed to the first data inputs of the MUX 310 and the ALU 313 while the integer portion 308 of the output from the Pass/Negate function 305 is routed to the second data inputs of the MUX 310 and the ALU 313. The fraction 307 is routed to the first data inputs of the MUX 312 and the ALU 315 while the fraction 309 is routed to the second data inputs.

The subtraction operations are selected at ALUs 313 and 315 with the carry-out (borrow) 314 (identified above as C) from the ALU 315 routed to the control/selection logic (not shown) as well as directly to the carry-in input of the ALU 313. The outputs from the ALU 313 and the ALU 315 are combined into the 32-bit signal 319 (identified above as Y) and routed to the Pass/Negate function 320 wherein negation is selected if signal 319 is negative. (The output from the Pass/Negate function 320 is $T=|Y|$ as identified above.) The 24-bit ({T}) value 324 is routed to the BXD2 function generator 325 whose 24-bit fractional output 326 together with a prefixed 1-bit 328 are routed to a first data input of the Adder/Subtracter 330. The 8-bit integer [T] 323 is routed to the input of the Decoder 327 which produces a 25-bit output (with a 24-bit fraction) whose value is closest to $2^{-[T]}$. This 25-bit output from the Decoder 327 is routed to the second data input of the Adder/Subtracter 330. If $S_u = S_v$ then an addition operation by Adder/Subtracter 330 is selected, otherwise a subtract operation is selected. The 25-bit output 331 from the Adder/Subtracter 330 is routed to a zero-detector (not shown) which upon detecting a zero value assigns a value to the Output W corresponding to $0 \rightarrow \hat{w}$. The 7-bit zero value 333 together with the 25-bit value 331 constitutes the 32-bit value 338 which is routed through the MUX 337 to become the 32-bit value 339 which is routed to the Priority Encoder 351 and the Shifter 352 for normalization. The fraction portion 357 of the output from the Shifter 327 is routed to the BLD2 function generator 361. The integer output 354 (equal to the value 359) from the Priority Encoder 351 together with the fractional output 362 from the BLD2 function generator 361 as the 32-bit signal 364 is routed to a first data input the Adder 365.

If the (Y) value 319 is negative then the MUXs 310 and 312 select [U] 306 and {V} 309, respectively, else [V] 308 and {U} 307, respectively, are selected. The output of the MUX 310 is routed to the Pass/Decrement function 311 wherein a decrement operation is selected if $C=1$ and $0<Y$ or if $C=0$ and $Y<0$, otherwise the input is passed unaltered. [Note: This assumes that one's-complement negations are employed such that $Z_{\{Y\}} \equiv 0$.] The integer output 316 from the Pass/Decrement function 311 together with the fraction output 317 from the MUX 312 constitute the hybrid value 321 which is routed to the second data input of the Adder 365. The output 366 from the Adder 365 is routed without further alteration through the MUX 367, the Shifter 368, and the Pass/Negate function 369 to appear as Output W. The sign bit or greater MS portion of signal 364 can be routed to the Status as a Loss-Of-Precision (LOP) indicator.

9) Subtraction

The operation $\hat{u} - \hat{v} \rightarrow \hat{w}$ on signed normal E-FLP operands $\hat{u}$ and $\hat{v}$ are implemented simply by changing the sign of $\hat{v}$ and performing a signed E-FLP addition as described above.

10) Remainder

All normal E-FLP values are formally irrational, except for the tiny subset wherein the data format fraction is zero. Thus, there is no obvious way to implement operations to generate rational values. However, the FLAT and FLEX conversion operations are efficient. Therefore, according to the invention, an E-FLP value can be efficiently FLEX-converted into an equivalent C-FLP value, which is formally always a rational value, for C-FLP computations and subsequent FLAT-conversion of the result to E-FLP.

Thus, according to the invention, the E-FLP remainder function $\hat{u} \bmod \hat{v} \rightarrow \hat{w}$ can be effected as $$\text{FLAT}(\text{FLEX}(\hat{u}/\hat{v}) - \lfloor \text{FLEX}(\hat{u}/\hat{v}) \rfloor) \times \hat{v} \rightarrow \hat{w} \quad (131)$$

wherein, defining $\tilde{y} = \text{FLEX}(\hat{u}/\hat{v})$, the C-FLP operation $\tilde{y} - \lfloor \tilde{y} \rfloor$ requires only C-FLP masking and normalization, i.e., operations which can easily be sandwiched between the BXD2 and BLD2 function generators that implement the FLEX and FLAT conversions, respectively. Thus the remaider operation can be implemented to execute in a single pass through the E-FLP processor.

The format values for E-FLP values $\hat{u}$ and $\hat{v}$, i.e., Input U and Input V signals, respectively, are routed without modification to the MUXs 310 and 312 and to the ALUs 313 and 315 wherein a subtract operation is selected. The outputs 308 and 309 from the ALUs 313 and 315, respectively, together constitute the signal (identified above as Y) 319 which is passed through the Pass/Negate function 318 whereupon the fraction portion of Y is routed to the BXD2 Function Generator 325. The fraction output 326 from the BXD2 Function Generator 325 is routed to the primary data input of the function identified as C-FLP Masks 329 while the integer value 323 is routed to the control input of 329 to select the proper mask. Output 334 from the C-FLP Masks 329 together with the prefixing zero value 332 as necessary constitute the signal 335 which is routed through the MUX 337 to the Priority Encoder 351 and the Shifter 352 to complete any required normalization. The fraction portion 357 of the output from the Shifter 352 is routed to the BLD2 Function Generator 361. The integer output from the Priority Encoder 351 is associated with the fraction output from the Shifter 352 to constitute the signal 364 which is routed to a first input of the Adder 365. The MUXs 310 and 312 select [V] 307 and {V} 309, respectively. The output from the MUX 310 passes unaltered through the Pass/Decrement function 311 to become the integer value at 316. The integer 316 and the fraction output 317 from the MUX 312 constitute the signal 321 which is routed through the MUX 353 to the second input of the Adder 365. The output 366 from the Adder 365 is routed without further alteration through the MUX 367, the Shifter 368, and the Pass/Negate function 369 to appear as the Output W.

11) Integer

The Integer or Floor function is implemented much the same as the Remainder function except that different C-FLP masking is used and little or no normalization is required.

Data Conversions

1) FLOAT

The FXP-to-E-FLP FLOAT data conversion is implemented by assigning the FXP operand to Input U and performing the blg logarithm described above. Any $2^{-m}$ scale factor can be applied to the input provided the compensating factor $2^m$ is applied as an E-FLP multiplication to the result $\hat{w}$, i.e., if m is subsequently added to Output W. [Values of m having simple bit patterns permit this addition to be a particularly simple operation that does not require a fully general adder.]

2) FIX

The E-FLP-to-FXP FLOAT data conversion is implemented by setting the format value of the E-FLP operand to Input U and performing the bxp binary exponential function described above. Any $2^{-m}$ scale factor can be applied to the output provided the compensating factor $2^m$ is applied as an E-FLP multiplication to the E-FLP input $\hat{u}$, i.e., if m is added to Input U. [Values of m having simple bit patterns permit this addition to be a particularly simple operation that does not require a fully general adder.]

3) FLAT

The C-FLP-to-E-FLP FLAT data conversion $\tilde{u} \rightarrow \hat{w}$ is implemented by assigning the "data-format value," i.e., the integer and fraction of the C-FLP operand $\tilde{u}$ to the integer and fraction portions, respectively, of the Input U, setting the Input V to zero, and routing the Input U unchanged through the Shifter 302, the Pass/Negate function 303, the ALUs 313 and 315, the Pass/Negate function 320, the MUX 337, the Priority Encoder 351 (because of an incorporated special "pass" function) and the Shifter 352 (because of a special zero-bit-place shift) before partitioning into an integer portion 359 and a fraction portion 360. The fraction portion 360 is routed to the BLD2 Function Generator 361 whose (fraction) output 362 is reassociated with the integer value 359 to constitute the 32-bit signal 364 which is routed without further alteration through the MUX 367, the Shifter 368, and the Pass/Negate function 369 to appear as the Output W which is the format value of $\hat{w}$.

4) FLEX

The E-FLP-to-C-FLP FLEX data conversion $\hat{u} \rightarrow \tilde{w}$ is implemented by assigning the data format value of the E-FLP operand $\hat{u}$ to the Input U, clearing the Input V to zero, and routing the Input U unchanged through the Shifter 302, the Pass/Negate function 303, the ALUs 313 and 315, and the Pass/Negate function 320 before partitioning into an integer portion 323 and a fraction portion 324. The fractional portion 324 is routed to the BXD2 Function Generator 325. The (fraction) output 326 from the BXD2 Function Generator 325 is reassociated with the integer value 323 to constitute the 32-bit signal 336 which is routed without further alteration through the MUX 367, the Shifter 368, and the Pass/Negate function 369 to provide the Output W as the format value of the C-FLP output $\tilde{w}$.

5) NORML

The FXP-to-C-FLP NORML data conversion $U \rightarrow \tilde{w} \equiv \tilde{U}$ is implemented by assigning the FXP operand to the signal Input U, clearing the signal Input V to zero, and routing the Input U unchanged through the Shifter 302, the Pass/Negate function 303, the ALUs 313 and 315, the Pass/Negate function 320, and the MUX 337 to the Priority Encoder 351 and the Shifter 352 which together perform the normalization. The integer output 354 from the Priority Encoder 351 is associated with the fraction portion 357 of the output from the Shifter 352 to constitute a 32-bit signal 358 which is routed without further alteration through the MUX 367, the Shifter 368, and the Pass/Negate function 369 to appear as the Output W which is the format value of $\tilde{w} \equiv \tilde{U}$.

6) DENORML

The C-FLP-to-FXP DENORML data conversion $\tilde{u} \rightarrow W \equiv u$ is implemented by assigning the format value of the C-FLP operand $\tilde{u}$ to the Input U, clearing the Input V to zero, and routing the Input U unchanged through the Shifter 302, the Pass/Negate function 303, the ALUs 313 and 315, the Pass/Negate function 320, and the MUX 337 to the Shifter 352 which (as indicated above in the description of the Exponential operation) has control/selection logic (not shown) which intercepts the 8-bit integer portion for use as a shift count (overriding the input from the Priority Encoder 351) and replaces the integer portion of the actual input to the Shifter 352 with the integer value one to effect a denormalization operation. The output from the Shifter 352 is routed without further alteration directly through the MUX 367, the Shifter 368, and the Pass/Negate function 369 wherein negation is selected only if the sign bit $S_u$ of $\tilde{u}$ is set. Then Output $W = u_{FXP}$.

Miscellaneous E-FLP Operations

The following miscellaneous E-FLP operations have implementations that are identical with their C-FLP counterparts: Compare, Maximum, Minimum, Absolute Value, Change Sign, Sign Transfer, and Signum Function.

FXP Operations and Functions

Although the foregoing data conversions relate only to 24-bit FXP values, the 32-bit ALU (313 with 315) and the 32-bit Shifter 352 clearly constitute the core capability of a powerful processor of 32-bit FXP data including such operations and functions as the following: Add, Subtract, Compare, Negate, Absolute Value, Right-/Left Shifts, And, Or, and Exclusive Or.

Interface Circuit for Basic E-FLP Logic

Figure 2:
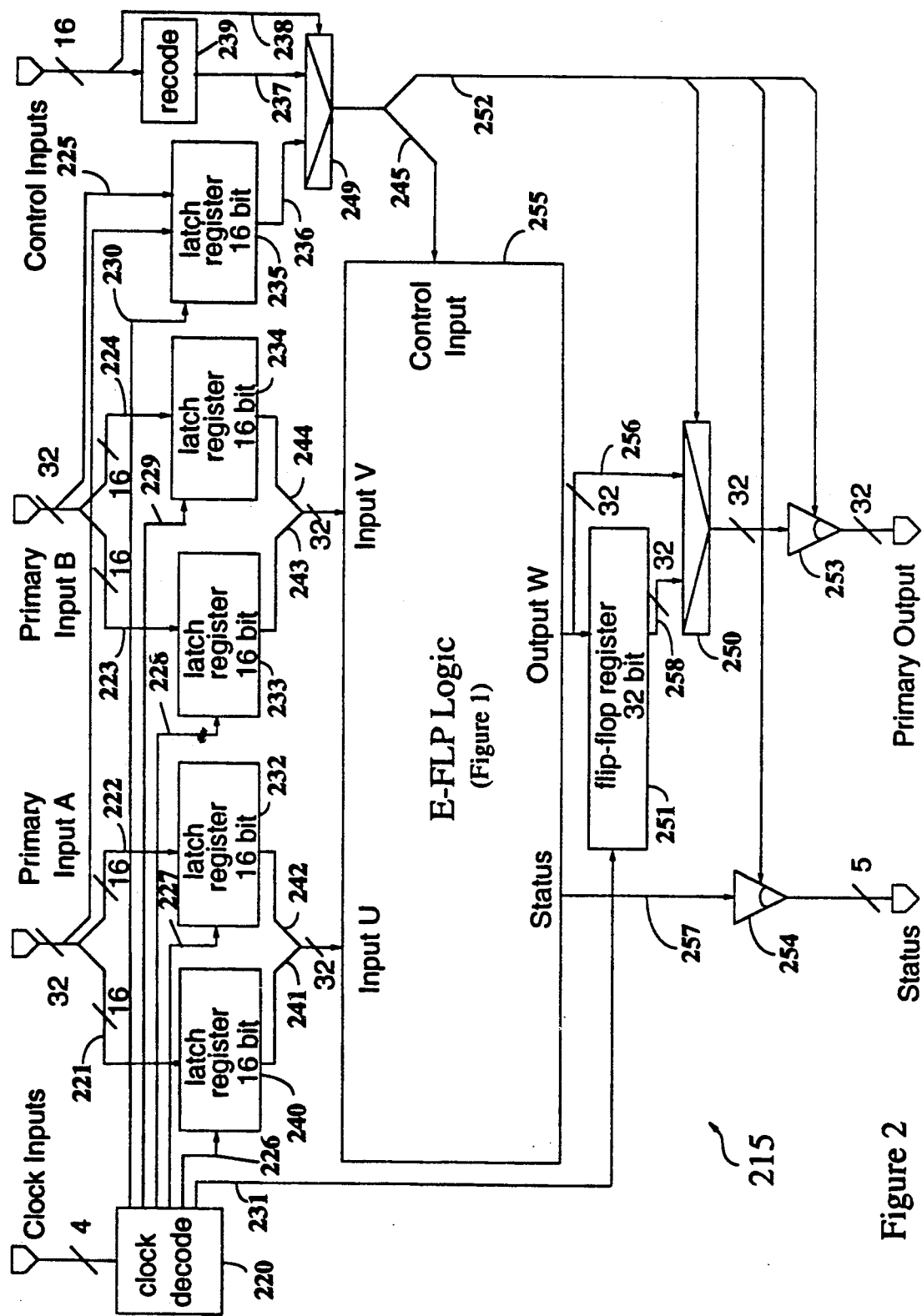
FIG. 2 is a block diagram of an interface circuit for the basic E/L logic of FIG. 1.

FIG. 2 is a block diagram of an interface circuit that allows the E-FLP logic 255 of FIG. 1A and FIG. 1B (which interface as shown in FIG. 1C) to easily interface to a wide variety of computing systems with a minimal amount of additional components. Such systems include common microprocessor-based computers, processors built from off-the-shelf processor building-blocks, and processors built from fully customized circuits. The small number of external interface pins permits the circuit to be built in low-cost packages.

Pipe-lining, which is commonly used to speedup processors, is also supported. The Latch registers 240, 232, 233, 234, the Flip-Flop register 251, and the output MUX 250 are controlled by clock signals 226, 227, 228, 229, 230, and 231, respectively, and control signals 252, which allow the circuit to contain zero, one, or two pipe-line stages.

Bus interfaces of 16, 32, or more bits in width are easily supported. For example, all 32 bits of the Input U can be loaded simultaneously into the registers 240 and 232 by the simultaneous clock signals 226 and 227 and routed via the 16-bit busses 241 and 242 to form the 32-bit Input U. Similarly, all 32-bits of the Input V can be loaded simultaneously into the registers 233 and 234 by the simultaneous clock signals 228 and 229 which are routed via the 16-bit busses 243 and 244 to form the 32-bit Input V. Systems providing only 16 bits at a time can be accommodated by independently activating the clock signals 226, 227, 228, and 229.

The Clock Inputs are routed to the clock decode logic 220 which in turn controls the register clock lines 226, 227, 228, 229, 230, and 231. A particular one 238 of the Control Inputs and control signals 237 generated by the Decoder 239 selects the functions to be performed by the E-FLP Logic 255. The Control Input to the E-FLP Logic 255 is a portion 245 of the outputs from the control MUX 249. Complex systems that need access to all possible functions of the E-FLP Logic use the control register 235 together with the Control Inputs. Simpler systems may have access to a subset of the possible functions by using only the control register 235, or only a subset of the Control Inputs.

The 32-bit Output W is routed via the 32-bit bus 256 to the Flip-Flop register 251 and to a first data input of the MUX 250 with the output 258 of the register 251 routed to a second data input of the MUX 250.

The output from the MUX 250 is routed to the output Tri-state Driver 253. The output Status 257 from the E-FLP Logic 255 is routed to the output Tri-state Driver 254. Output Tri-state Drivers 253 and 254 provide easy interface to the many systems which use tri-state busses for routing data between components of the system.

LIBRARY OF E-FLP SCIENTIFIC FUNCTIONS

Introduction

A general-purpose E-FLP computational system must provide the user with the same operations and functions that a user of a general-purpose C-FLP system expects to have available. In particular, a general-purpose E-FLP computational system must have a library of scientific functions that includes the trigonometric and hyperbolic functions and their respective inverse functions.

Hyperbolic Functions and Their Inverses

The hyperbolic and inverse hyperbolic functions, their derivatives, and their indefinite integrals are well known, but for easy reference they are listed in the attached Appendix D.

The hyperbolic functions and their inverses as well as their derivatives and integrals may be constructed almost entirely from exponentials and logarithms of real arguments, which are particularly efficient operations in E-FLP computation. The only exceptions are that the integrals of sech u and of arcsech u include arctan u and arcsin u, respectively. Hence the balance of these many functions effectively becomes a part of the "arithmetic" of an E-FLP processor. Similarly, any function comprising but a few logarithmic, exponential, root, power, addition, or subtraction operations (together with a liberal sprinkling of low-cost multiplication, division, reciprocal, square, and square root operations, etc.) may properly be said to belong to an E-FLP processor's repertoire of elementary operations.

Trigonometric Functions and Their Inverses

The trigonometric functions and their inverses may be constructed from exponentials and logarithms, respectively, of complex arguments. However, the exponentials and logarithms of real arguments are most fundamental to E-FLP. This circumstance usually makes the hyperbolic functions and their inverses somewhat more efficient than the trigonometric functions and their inverses. Nevertheless, there can be a great deal of symmetry between these two classes of functions as they are evaluated in E-FLP. These symmetries are most prominent in the product formulas for these functions given hereinafter.

Range Reduction

The range reductions which are required for the arguments of the trigonometric functions are related in a natural way to argument intervals that are rational fractions of the period $2\pi$.

According to the invention, the FLEX conversion of an E-FLP value into a C-FLP value gives access to all the usual C-FLP operations on rational values as well as access to particular forms of the integer, fraction, floor, ceiling, and remainder operations which need not require any C-FLP or FXP multiplication or division operations. Such C-FLP operations are well known and need not be described here. Once such C-FLP operations are performed, a FLAT reconversion back to E-FLP is required at some point before concluding with the balance of the E-FLP operations. However, the required FLEX and FLAT conversions are particularly efficient in E-FLP. Thus the class of elementary E-FLP operations also includes such elementary C-FLP operations.

Range reduction for both $\sin \pi u$ and $\cos \pi u$ may proceed by reducing the argument to a single quadrant. Then, in order to provide similar rates of convergence, about twice as much of the quadrant interval is relegated to evaluation by the product series for the sine as for the cosine. Range reduction for $\tan \pi u$ may similarly proceed by reducing the argument to a half quadrant as the reciprocal relationship with $\cot \pi u$ allows an additional halving of the corresponding interval for the sine and cosine. Yet if the product series formula for $\tan \pi u$ is used for argument values as large as $u = \frac{1}{4}$, then it does not converge as rapidly as do the product series for $\sin \pi u$ and $\cos \pi u$ for $u = \frac{1}{8}$ and $u = 1/6$, respectively.

Increased Convergence. Increased convergence for this mid-quadrant region can be realized by including a product series for $\tan (\pi/4 + \pi u)$. The exponent for such an expansion would be a power series for $\ln \tan (\pi/4 + \pi u)$. This function is well known as the inverse Gudermannian of argument $2\pi u$. The inverse Gudermannian is $$gd^{-1} u = \ln \tan (\pi/4 + u/2), \tag{132}$$

which has the power series expansion $$gd^{-1} u = \sum_{n=0}^{\infty} \frac{(-1)^n E_{2n} u^{2n+1}}{(2n+1)!}, \ |u| < \pi/2 \tag{133}$$

$$= u + \frac{1}{6} u^3 + \frac{1}{24} u^5 + \frac{61}{5040} u^7 + \ldots, \ |u| < \pi/2 \tag{134}$$

wherein $E_n$ is the n-th Euler number. The Euler numbers of odd index are all zero. The first few Euler numbers of even index are: $E_0 32\ 1$, $E_2 = -1$, $E_4 = 5$, $E_6 = -61$, $E_8 = 1385$ and $E_6 = -50,521$.

A property of gd u is that if $x = gd\ y$ then $iy = gd\ ix$, wherein $i = \sqrt{-1}$. Thus the Gudermannian has the series expansion $$gd\ u = \sum_{n=0}^{\infty} \frac{E_{2n} u^{2n+1}}{(2n+1)!}, \ |u| < \pi/2 \tag{135}$$

$$= u - \frac{1}{6} u^3 + \frac{1}{24} u^5 - \frac{61}{5040} u^7 + \ldots, \; |u| < \pi/2. \quad (136)$$

The product series expansion $$\tan(\pi/4 + \pi u) = \exp(gd^{-1} 2\pi u) \quad (137)$$

$$= \prod_{n=0}^{\infty} \exp\left(\frac{(-1)^n E_{2n}(2\pi u)^{2n+1}}{(2n+1)!}\right), \; |u| < \tfrac{1}{4} \quad (138)$$

$$= \exp\left(\sum_{n=0}^{\infty} \frac{(-1)^n E_{2n}(2\pi u)^{2n+1}}{(2n+1)!}\right), \; |u| < \tfrac{1}{4} \quad (139)$$

$$= \exp\left((2\pi u) + \frac{1}{6}(2\pi u)^3 + \frac{1}{24}(2\pi u)^5 + \frac{61}{5040}(2\pi u)^7 + \ldots\right), \; |u| < \tfrac{1}{4} \quad (140)$$

converges about half as rapidly as the product series for tan $\pi u$. So here again the relevant interval is split about 2 to 1 between different series for final evaluation.

Thus, according to one aspect of the invention, this range-reduction scheme uses essentially a single quadrant and range-reduction logic, a uniform function-approximating form, and uniform worst-case convergences for the primary functions. The worst-case convergences for the inverse functions are also comparatively uniform. Moreover, the hyperbolic functions and their inverses for the ranges not covered by a rapidly converging product series can easily be evaluated directly in terms of the fast logarithms and exponentials that are central to the "arithmetic" of E-FLP computation.

PRODUCT SERIES FOR THE TRIGONOMETRIC AND HYPERBOLIC FUNCTIONS.

$$\sinh u = u \prod_{n=1}^{\infty} \exp\left(\frac{B_{2n} 2^{2n} u^{2n}}{2n(2n)!}\right), \; |u| < \pi \quad (141)$$

$$\sin u = u \prod_{n=1}^{\infty} \exp\left(\frac{(-1)^n B_{2n} 2^{2n} u^{2n}}{2n(2n)!}\right), \; |u| < \pi \quad (142)$$

$$\cosh u = \prod_{n=1}^{\infty} \exp\left(\frac{B_{2n}(2^{2n}-1) 2^{2n} u^{2n}}{2n(2n)!}\right), \; |u| < \pi/2 \quad (143)$$

$$\cos u = \prod_{n=1}^{\infty} \exp\left(\frac{(-1)^n B_{2n}(2^{2n}-1) 2^{2n} u^{2n}}{2n(2n)!}\right), \; |u| < \pi/2 \quad (144)$$

$$\tanh u = u \prod_{n=1}^{\infty} \exp\left(\frac{-B_{2n}(2^{2n}-2) 2^{2n} u^{2n}}{2n(2n)!}\right), \; |u| < \pi/2 \quad (145)$$

$$\tan u = u \prod_{n=1}^{\infty} \exp\left(\frac{-(-1)^n B_{2n}(2^{2n}-2) 2^{2n} u^{2n}}{2n(2n)!}\right), \; |u| < \pi/2 \quad (146)$$

E-FLP "DATA FORMAT" SERIES $$\mathrm{blg}(\sinh 2^U) = U - \sum_{n=1}^{\infty} (-1)^n \mathrm{bxp}(a_n + 2nU) \quad (147)$$

and $$\mathrm{blg}(\sin 2^U) = U - \sum_{n=1}^{\infty} \mathrm{bxp}(a_n + 2nU) \quad (148)$$

for $$a_n = \mathrm{blg}\left|\frac{q B_{2n} 2^{2n}}{2n(2n)!}\right|, \; U < \mathrm{blg}\pi. \quad (149)$$

$$\mathrm{blg}(\cosh 2^U) = -\sum_{n=1}^{\infty} (-1)^n \mathrm{bxp}(b_n + 2nU) \quad (150)$$

and $$\mathrm{blg}(\cos 2^U) = -\sum_{n=1}^{\infty} \mathrm{bxp}(b_n + 2nU) \quad (151)$$

for $$b_n = \mathrm{blg}\left|\frac{q B_{2n}(2^{2n}-1) 2^{2n}}{2n(2n)!}\right|, \; U < \mathrm{blg}\tfrac{1}{2}\pi. \quad (152)$$

$$\mathrm{blg}(\tanh 2^U) = U + \sum_{n=1}^{\infty} (-1)^n \mathrm{bxp}(c_n + 2nU) \quad (153)$$

and $$\mathrm{blg}(\tan 2^U) = U + \sum_{n=1}^{\infty} \mathrm{bxp}(c_n + 2nU) \quad (154)$$

for $$c_n = \mathrm{blg}\left|\frac{q B_{2n}(2^{2n}-2) 2^{2n}}{2n(2n)!}\right|, \; U < \mathrm{blg}\tfrac{1}{2}\pi. \quad (155)$$

Inverse Hyperbolic and Trigonometric Functions

The following continued-exponential series can be used to evaluate the inverse hyperbolic and trigonometric functions:

$$\mathrm{arcsinh}\, u = u \exp(-a_1 u^2 \exp(-a_2 u^2 \exp(-a_3 u^2 \ldots))), \; |u| < 1 \quad (156)$$

$$\mathrm{arcsin}\, u = u \exp(a_1 u^2 \exp(a_2 u^2 \exp(a_3 u^2 \ldots))), \; |u| < 1 \quad (157)$$

$$a_1 = 1/6, \; a_2 = 11/30, \; a_3 = 5099/13860 \quad (158)$$

$$\mathrm{arcsinh}\, u = \ln 2u + \frac{b_1}{u^2} \exp\left(\frac{-b_2}{u^2} \exp\left(\frac{-b_3}{u^2} \exp\left(\frac{b_4}{u^2} \ldots\right)\right)\right), \; 1 < |u| \quad (159)$$

-continued $$\text{arccosh}u = \ln 2u - \frac{b_1}{u^2}\exp\left(\frac{b_2}{u^2}\exp\left(\frac{b_3}{u^2}\exp\left(\frac{-b_4}{u^2}\ldots\right)\right)\right), 1 < |u| \qquad (160)$$

$$b_1 = 1/4, b_2 = 3/8, b_3 = 53/144, b_4 = 5615/15264 \qquad (161)$$

$$\text{arctanh}u = u\exp(c_1 u^2 \exp(c_2 u^2 \exp(c_3 u^2 \ldots))), |u| < 1 \qquad (162)$$

$$\text{arctan}u = u\exp(-c_1 u^2 \exp(-c_2 u^2 \exp(-c_3 u^2 \ldots))), |u| < 1 \qquad (163)$$

$$c_1 = 1/3, c_2 = 13/30, c_3 = 6491/16380. \qquad (164)$$

These examples are but a few of the many new mathematical modeling alternatives made available by the efficient evaluation of the logarithmic and exponential functions. Moreover, the new notation allows a compact analysis using the new PDOE formula and the continued-exponential series expansions, which further amplifies the effectiveness of E-FLP computation. Appendix E provides an instance of the PDOE formula applied to an analysis of the arctanh function.

ABSOLUTE AND RELATIVE ERROR IN E-FLP

Introduction

Evaluation of C-FLP computational errors is quite difficult. In contrast, a close evaluation of E-FLP computational errors is sufficiently straightforward that it can actually be performed, both analytically and computationally. Furthermore, doing so for E-FLP provides clarification of the substantially equivalent C-FLP computation.

Definitions

A generic exact E-FLP value $u^* = 2^{U^*}$ is additively displaced an amount $\epsilon_u$ from its finite precision counterpart, the normal binary E-FLP quantity $u = 2^U$, when $u^*$'s (hypothetically) infinitely precise format value $U^*$ is displaced additively an amount $\epsilon_U$ from u's format value U. Thus, there are the following basic relations:

$$u^* = 2^{U^*}, u = 2^U \qquad (165)$$
$$u^* = u + \epsilon_u = u(1 + \epsilon_u/u) = u(1 + \varepsilon_u) \qquad (166)$$
$$2^{U^*} = 2^{U+\epsilon_U} \qquad (167)$$
$$\varepsilon_u = \epsilon_u/u \qquad (168)$$
$$2^{\epsilon_U} = 1 + \varepsilon_u, 0 \leq 1 + \varepsilon_u \qquad (169)$$

$$\epsilon_U = \text{blg}(1 + \varepsilon_u), -1 < \varepsilon_u \qquad (171)$$
$$= \text{bld}\epsilon_u, -1 < \varepsilon_u$$

$$\text{bxd}\epsilon_U = \varepsilon_u \qquad (172)$$
$$u\text{bxd}\epsilon_U = \epsilon_u \qquad (173)$$

where $1 + \varepsilon_u$ and $\varepsilon_u$, respectively, are referred to as the multiplicative and relative displacements of $u^*$ from u. Thus the (additive) absolute error displacement associated with the format value is directly related to a corresponding multiplicative error displacement of the E-FLP quantity. All absolute and relative errors $\epsilon$ and $\varepsilon$, respectively, whatever their subscripts, are signed. The symbols $\epsilon$ and $\varepsilon$, respectively, may be referred to as the "absolute" and "relative" epsilons. [Thus, in other contexts of E-FLP analysis, both absolute and relative deltas may also be defined.]

Generic positive exact (i.e., infinite-precision) $u^* = 2^{U^*}$, $v^* = 2^{V^*}$, and $w^* = 2^{W^*}$ are presumed to be additively displaced from their respective finite-precision normal binary E-FLP quantities $u = 2^U$, $v = 2^V$, and $w = 2^W$ by respective amounts $\epsilon_u$, $\epsilon_v$, and $\epsilon_w$ with further associated quantities defined as above.

An exact E-FLP operation $w^* = f(u^*, v^*)$ can be modeled by a corresponding finite-precision operation $w = f(u, v)$ provided only that the magnitude of the absolute error $\epsilon_w$ associated with w is kept sufficiently small. The next step is to observe that if $0 \leq 1 + \epsilon_w/w$ then there is $$\frac{w^*}{w} = \frac{f(u^*, v^*)}{f(u, v)} \qquad (174)$$

$$\frac{2^{W^*}}{2^W} = \frac{f(2^{U^*}, 2^{V^*})}{f(2^U, 2^V)} \qquad (175)$$

$$\frac{2^{W+\epsilon_W}}{2^W} = \frac{f(2^{U+\epsilon_U}, 2^{V+\epsilon_V})}{f(2^U, 2^V)} \qquad (176)$$

$$2^{\epsilon_W} = \frac{f(2^{U+\epsilon_U}, 2^{V+\epsilon_V})}{f(2^U, 2^V)} \qquad (177)$$

$$\epsilon_W = \text{blg}\left(\frac{f(2^{U+\epsilon_U}, 2^{V+\epsilon_V})}{f(2^U, 2^V)}\right) \qquad (178)$$

which provides a formula for the error associated with the format value of the result of the E-FLP operation $f(u,v)$. In the form as stated above, $f(u,v)$ must take into account any rounding or truncation errors which are introduced in the course of fitting W into a data format of finite size. This is often effected satisfactorily with the above analysis assuming that there are only input errors, and then simply adding a quantity $\epsilon_F$ to the right hand side of (178). Such $\epsilon_F$ depends on the details of the function F required to implement the operation $f$. In particular, $\epsilon_F$ depends on how the low order bits of W are terminated, e.g., as in restricting W to a data format of finite size.

Often $\epsilon_F$ is considered to be a constant such that $|\epsilon_F| \approx 2^{-p}$ where p is the precision of the E-FLP system. In other cases, however, the value of $\epsilon_F$ may be a function of U or V or other inputs. In still other cases, e.g., when W results from one or more right shifts of a full-precision interim quantity, a closer estimate of $\epsilon_F$ can be derived more directly. Yet for the important E-FLP multiply and divide operations, there is $\epsilon_F = 0$.

The format value W of a dyadic E-FLP operation is a function only of the two operand's format values U and V, i.e., $$W = F(U, V), \qquad (179)$$

while the absolute error $\epsilon_W$ associated with W takes the general form $$\epsilon_W = G(U, V, F(U, V), \epsilon_U, \epsilon_V, \epsilon_F) \qquad (180)$$

from which $\epsilon_w$ can be calculated according to the relation $\epsilon_w = w \, bxd \, \epsilon_W$.

Error in the Multiplication Operation

For the E-FLP multiplication operation, there is $$\frac{w^*}{w} = \frac{u^* v^*}{uv} \tag{181}$$

$$\epsilon_W = \epsilon_U + \epsilon_V. \tag{182}$$

Error in the Division Operation

For the E-FLP division operation, there is $$\frac{w^*}{w} = \frac{u^*/v^*}{u/v} \tag{183}$$

$$\epsilon_W = \epsilon_U - \epsilon_V. \tag{184}$$

Error in the Logarithm Function

For the operation $w = u \, blg \, v$, there is $$\frac{w^*}{w} = \frac{u^* \, blg \, v^*}{u \, blg \, v} \tag{185}$$

$$\epsilon_W = \epsilon_U + bld(\epsilon_V/V). \tag{186}$$

For any exact u, i.e., $\epsilon_U \equiv 0$, there is simply $\epsilon_W = bld(\epsilon_V/V)$.

Error in the Exponential Function

For the operation $w = u^v$, there is $$\frac{w^*}{w} = \frac{(u^*)^{v^*}}{u^v} \tag{187}$$

$$\epsilon_W = (\epsilon_U + (U + \epsilon_U) \, bxd \, \epsilon_V) \, bxp \, V. \tag{188}$$

For $w = 2^v$, i.e., $u = 2$, $U = 1$ and $\epsilon_U \equiv 0$, there is $\epsilon_W = 2^V bxd \, \epsilon_V$.

Error in the Addition Operation

For the operation $w = u + v$, the results are no less general if u is assumed to be the larger of the two operands (i.e., with $V < U$), then there is $$\frac{w^*}{w} = \frac{u^* + v^*}{u + v} \tag{189}$$

$$\epsilon_W = \epsilon_U + bld(2^{V-W} bxd(\epsilon_V - \epsilon_U)) \tag{190}$$

Error in the Subtraction Operation

For the operation $w = u - v$, where $v < u$ (i.e., $V < U$), there is $$\frac{w^*}{w} = \frac{u^* - v^*}{u - v} \tag{191}$$

$$\epsilon_W = \epsilon_U + bld(-2^{V-W} bxd(\epsilon_V - \epsilon_U)), \tag{192}$$
$$2^{V-W} bxd(\epsilon_V - \epsilon_U) < 1.$$

Error in the Subtraction Operation—The Special Region

The characterization of multiplicative and relative error associated with the subtraction operation has, historically, been a thorny issue in the analysis of the region about the point where C-FLP multiplicative error becomes unbounded (i.e., $\epsilon_W \to \infty$ as $2^{V-W} bxd(\epsilon_V - \epsilon_U) \to 1$ in the above example). Which is only to say that the general result of a subtraction cannot be constrained to be nonzero. This corresponds to the case where the more general absolute error remains finite but the multiplicative error is unbounded, although this is occasionally not recognized. Yet, even when this fundamental change of character has been identified, a clear description of the functional behavior in this region has remained absent. The following analysis based on the PDOE expansion provides a novel description of this region:

$$2^{\epsilon_W} = \frac{2^{U+\epsilon_U} - 2^{V+\epsilon_V}}{2^U - 2^V} = \frac{2^{U^*} - 2^{V^*}}{2^U - 2^V} \tag{193}$$

$$= \frac{(U^* - V^*)2^{\frac{1}{2}(U^* + V^*)} bxp \sum_{n=1}^{\infty} b_n(U^* - V^*)^{2n}}{(U - V)2^{\frac{1}{2}(U+V)} bxp \sum_{n=1}^{\infty} b_n(U - V)^{2n}}, \tag{194}$$

$$U \neq V, \, |U^* - V^*| < 2\pi q, \, |U - V| < 2\pi q,$$

$$b_n = \frac{B_{2n}}{2n(2n)! q^{2n-1}}$$

$$= \left(1 + \frac{\epsilon_U - \epsilon_V}{U - V}\right) 2^{\frac{1}{2}(\epsilon_U + \epsilon_V)}. \tag{195}$$

$$bxp \sum_{n=1}^{\infty} b_n((U - V + \epsilon_U - \epsilon_V)^{2n} - (U - V)^{2n})$$

$$= \left(1 + \frac{\epsilon_U - \epsilon_V}{U - V}\right) 2^{\frac{1}{2}(\epsilon_U + \epsilon_V)}. \tag{196}$$

$$bxp \sum_{n=1}^{\infty} b_n \sum_{m=1}^{2n} \binom{2n}{m} (U - V)^{2n-m} (\epsilon_U - \epsilon_V)^m,$$

wherein $B_{2n}$ is the 2n-th Bernoulli number.
Thus there is $$\epsilon_W = bld\left(\frac{\epsilon_U - \epsilon_V}{U - V}\right) + \frac{1}{2}(\epsilon_U + \epsilon_V) +$$

$$\sum_{n=1}^{\infty} b_n \sum_{m=1}^{2n} \binom{2n}{m} (U - V)^{2n-m} (\epsilon_U - \epsilon_V)^m, \tag{197}$$

provided that $-(U - V) < \epsilon_U - \epsilon_V$, i.e., requiring that the multiplicative error remain unsigned. The evaluation of the right hand side of this equation now depends sensitively both upon $U - V$ and $\epsilon_U - \epsilon_V$ when the magnitudes of either or both quantities are small.

Running Error Measures

Interval Computation (Round Up/Round Down)

According to the invention, directed rounding of E-FLP format values is the simplest form of interval computation to implement. Furthermore, such E-FLP directed rounding is directly equivalent to similar directed rounding of C-FLP values. Thus the procedures and techniques developed for using them in C-FLP computations are immediately applicable to E-FLP computations.

Sensitivity Computations

The foregoing formulas for $\epsilon_W$ are particularly efficient and economical to evaluate as E-FLP computations. Such values often do not require full precision which further enhances performance and economy. Thus, according to the invention, E-FLP computations can be performed on new types of composite numbers consisting of a primary E-FLP variable $\hat{u}$ together with one or more secondary E-FLP variables $(\epsilon_U)_i$ related to particular deviations from U, the format value of $\hat{u}$. The values of these secondary E-FLP variables can be applied to sensitivity calculations which are often of interest, but are usually too expensive to perform in C-FLP. However, the unique combination of E-FLP characteristics contributes to computing these quantities so easily that performance can be sufficient for real-time applications.

Interval Computation ("Naive")

The foregoing sensitivity computations can be used to provide high and low absolute error bounds on the format values of the E-FLP quantities used throughout a computation. This type of computation is sometimes referred to as "naive" interval computation because very pessimistic error estimates are often difficult or impossible to avoid.

Interval Computation (Statistical)

Mean-Square Error Estimate

A good measure of mean-square error often would be the most useful type of error estimate in C-FLP computation, but it is virtually always unavailable. The typical expensive remedy for this deficiency is to use much higher precision than is actually required.

According to the invention, a composite data type can let the primary E-FLP variable represent an estimated mean value and let a secondary E-FLP variable correspond to the displacement of the variance relative to that means. The basic characteristics of E-FLP computation clearly allow this type of computation to be performed relatively easily. In particular, expressions for error distributions often include integrals and derivatives of the error displacement formulae given above. However, these integrals and derivatives often use the exponential and logarithmic operations which are particularly efficient in E-FLP computation. For comparison, such error computations are impossibly difficult in C-FLP—both because the necessary error expressions are much more complicated and because the required nonlinear operations are comparatively inefficient.

Measures of mean square error are closely related to the variances of random variables. The variance of a sum of (possibly signed) random variables is known to be the sum of the variances of the individual variables. An exemplary reference is sections IX.4-5 in *An Introduction to Probability Theory and Its Application*, 1950, 227-233 by W. Feller, which shows that this relation is very general and typicaly remains valid even when distributions cannot be defined for the individual random variables.

The only E-FLP operations which are fundamentally dyadic (i.e., having two operands) are multiplication and division. However, the E-FLP multiplication and division operations are implemented, respectively, as addition and substraction operations on L-FXP format values. Therefore, estimates of mean square errors in the format values of individual E-FLP variables may be simply summed to realize a measure of mean square error in the format value of the result of a E-FLP multiplication or division operation. Moreover, as mentioned above, this relation remains effective comparatively generally.

As shown above, the E-FLP addition and subtraction operations are fundamentally unary (i.e., having only a single operand) and only add and subtract, respectively, a constant from a single general E-FLP quantity. As shown above, these fundamental unary E-FLP addition and subtraction operations need only be combined with E-FLP multiplication and division operations to realize the fully general E-FLP addition and subtraction operations. Thus comparatively straightforward analysis using standard distributions is effective in computing useful mean square estimates of the error propagated in lengthy E-FLP computations. An exemplary reference of statistical analysis and standard distributions is Chapter 2, "Statistics," by J. M. Cameron in *Basic Mathematical Formulas, Volume One*, 1960, 107-140, edited by D. H. Menzel. This reference includes a discussion of the "Law of Propagation of Error" and relates this law to the logarithmic-normal distribution.

Estimates of Higher Moments of Error Distributions

According to the invention, the composite data type can be used to approximate a distribution, e.g., assigning the primary E-FLP variable to the mean and letting the secondary E-FLP variables correspond to the displacements of the higher moments relative to the mean. Operations on such variables can then be used for estimating the interactions of random variables from given distributions.

COMPUTER INSTRUCTIONS FOR IMPROVED E-FLP OPERATION

The foregoing E/L computational system is very efficient when implemented in machine code. However, much of the execution time is expended in retrieving and decoding the instructions. Thus, the performance can be improved by incorporating the machine code sequence into a shorter code sequence employing specialized instructions, thereby considerably increasing the speed of E/L computation.

Each E-FLP operation must detect the nonnormal E-FLP values which require special processing. For example, particular forms of the instructions performing the fixed-point addition, subtraction, and right and left shift operations which implement, respectively, the E-FLP operations multiplication, division, square root and square operations on normal E-FLP values can incorporate automatic parallel detection of nonnormal values with comparatively few logic gates, thereby speeding up the processing of normal E-FLP values. Similarly, only comparatively few logic gates are required to implement such special instructions to provide automatic handling of the format value bias for still further speeding E-FLP operations.

Special instructions for generalized function generation can execute higher-precision computations as rapidly as standard machine code executes lower-precision computations. Such generalized function generating instructions enhance the performance in generating scientific library functions and engineering applications functions.

Figure 3A:
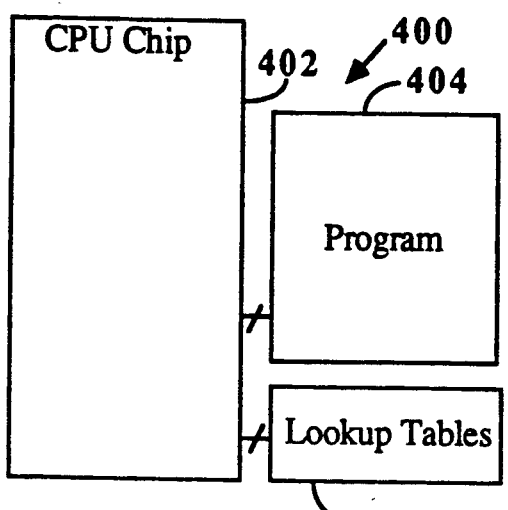
FIG. 3A is a block diagram of a first configuration for a general-purpose microprocessor employing, according to the invention, a program and look-up tables that are off-chip.

FIG. 3A is a block diagram of a first configuration 400 for a general-purpose microprocessor 402 employing, according to the invention, a program 404 and look-up tables 406 that are off-chip.

Figure 3B:
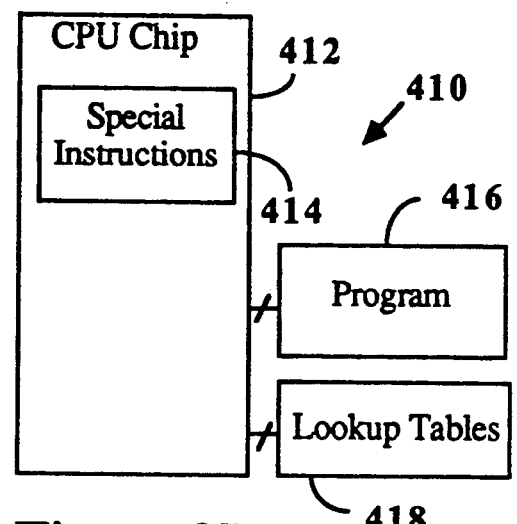
FIG. 3B is a block diagram of a second configuration for a general-purpose microprocessor employing, according to the invention, incorporated special instructions and a smaller program and look-up tables that are off-chip.

FIG. 3B is a block diagram of a second configuration 410 for a general-purpose microprocessor 412 employing, according to the invention, incorporated special instructions 414 which allow the program code 416 to be smaller and faster in accessing off-chip look-up tables 418.

Figure 3C:
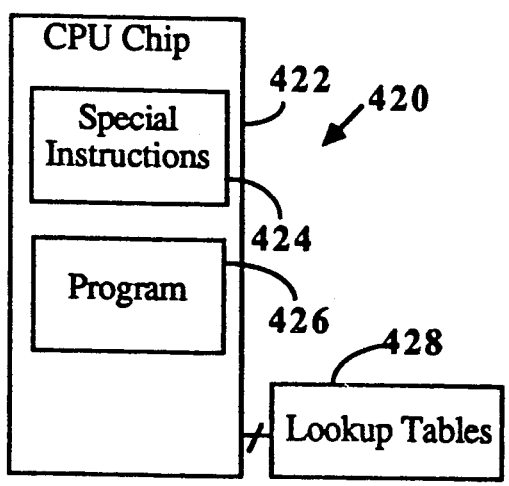
FIG. 3C is a block diagram of a third configuration for a general-purpose microprocessor employing, according to the invention, incorporated special instructions and an on-chip smaller program and off-chip look-up tables.

FIG. 3C is a block diagram of a third configuration 420 for a general-purpose microprocessor 422 employing, according to the invention, incorporated special instructions 424 which allow the program code 426 to be small enough to fit on-chip. The off-chip look-up tables 428 provides the economy of a smaller chip size.

Figure 3D:
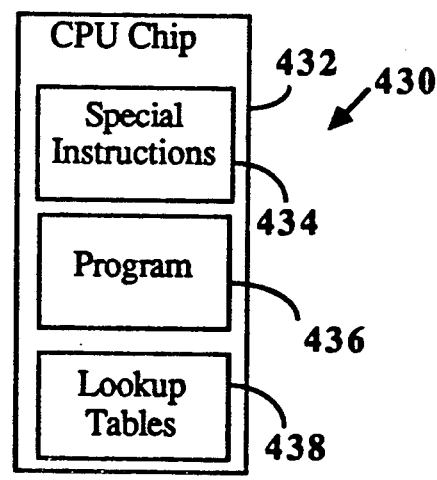
FIG. 3D is a block diagram of a fourth configuration for a general-purpose microprocessor employing, according to the invention, incorporated special instructions and a smaller program and look-up tables which are both on-chip.

FIG. 3D is a block diagram of a fourth configuration 430 for a general-purpose microprocessor 432 employing, according to the invention, incorporated special instructions 434 and a smaller program 436 and look-up tables 438 which are both on-chip for maximum speed.

The attached Appendices A, B, C, D and E provide additional disclosure supplementing the foregoing description. The Appendices are not essential to an understanding of the invention.

The invention has now been explained with reference to specific embodiments. Other embodiments will be apparent to those of ordinary skill in this art. The invention is therefore not intended to be limited except as indicated by the appended claims.

APPENDIX A

Terminology and Notation

Terminology for Logarithms and Exponentials

The argument of an exponential function is an "an exponent" so shortening the noun term "an exponential function" to "an exponent" would create a severe problem in distinguishing the function from the argument of the function. Instead, "an exponential function" is commonly shortened to the form "an exponential" (even though it may seem more like an adjective than a noun). Therefore, the terms "exponent" and "exponential" are fundamentally not interchangeable. In contrast, shortening "a logarithmic function" to "a logarithm function" or simply "a logarithm" usually causes much less ambiguity (and hence little need to invent a term like "a logarithmic").

Nouns are often appropriately used as adjectives. For example, a signal which is closely associated with an exponent (say, by taking on its value) can be clearly and compactly identified as "an exponent signal" which will generally be distinguished from "an exponential signal" which behaves like an exponential function. Thus, when used properly, "an exponential exponent signal" and "a logarithmic exponent signal" are generally nonredundant terms. Even "exponent exponentials" becomes a meaningful reference to exponential functions appearing in an exponent, i.e., as an argument of an exponential function. Such a circumstance often occurs in the design and use of exponential floating point processors. However, "exponential logarithmic signal" and "logarithmic exponential signal" are likely to be ambiguous or simply equivalent to "signal", because a logarithmic function and an exponential function are mutually inverse when both functions have a common base.

The simple relation $x = b^y$ is commonly read "x is a base-b exponential of y". This relation is equivalent to $y = \log_b x$ and is a remainder that x is an exponential, but the only exponent here is y and the only logarithm here is also y. Thus, an exponent is a logarithm, while an exponential is an inverse of a logarithm.

As an additional note, the phrase "a negative exponential of x" most typically means $e^{-x}$ or $b^{-x}$ rather than $-e^x$ or $-b^x$. (This circumstance is analogous to the familiar phrase "million and a half" referring to 1,500,000 rather than 1,000,000.5). Thus, clear warning should be given when referring to the sign of the function rather than the sign of its argument.

The design and use of exponential/logarithmic processors compounds the problem of clear communication regarding logarithms and exponentials. Explicit representations of numerical quantities are often fixed point, conventional floating point or exponential floating point, etc. However, constants such as the value of the base of a computational system may be implicit, i.e., included in the design of the computational elements rather than represented explicitly by signals.

The relations and conversions between such number representations correspond directly to, or otherwise require, logarithmic and exponential functions, both static and executed. The considerable complexity involved in clear description of these circumstances may seem much out of proportion to the apparent simplicity of the fundamental equation $x = b^y$. Nonetheless, clear communication regarding such real complexities is essentially impossible without a solid understanding of the foregoing terminology regarding the fundamentals.

Notation for Number Representations

Binary Numbers:

1) The decimal subscript 2 may be used to indicate binary numbers. Examples are $1110_2$ and $11000_2$.

2) Eight (8) digits between a comma and the radix point or another comma indicates a binary number. Parentheses may be used to avoid ambiguity in some contexts. Examples are (10,01100001.00100111) and (,00101100.).

3) Computer programs may also denote binary numbers with a trailing "B", e.g., as in 101010111000010100B, etc. where such cannot be interpreted as a hexadecimal value.

Decimal Numbers:

1) Decimal notation is the normal default. With nothing to indicate otherwise, numbers such as 10, 237.8372 and 0.0011 are to be considered decimal numbers.

2) Subscript numbers used to indicate the radix are decimal unless otherwise explicitly indicated. Examples are: $24_{10} = 18_{16}$, $14 = 1110_2$, $18_{16} = 11000_2$.

3) Three (3) digits between a comma and the radix point or another comma indicates a decimal number. Parentheses may be used to avoid ambiguity in some contexts. Examples are (123,456) and (0.123,45).

Hexadecimal Numbers:

1) The decimal subscript 16 may be used to indicate hexadecimal numbers. Examples are $1110_{16}$, $349_{16}$, and $ACF9_{16}$.

2) Two (2) or four (4) digits between a comma and the radix point or another comma indicates a hexadecimal number. Parentheses may be used to avoid ambiguity in some contexts. Examples are (12,34.56), (,1234.56), (,12.), (,0012.), and (0.1234,D5).

3) Computer programs may denote dexadecimal numbers in such forms as 0ADE4H or $ADE4.

Notation for logarithms and exponentials

The expression $a^u$ is universally accepted as unambiguous notation for the base-a exponential of u unless specifically defined otherwise. Similarly, the expression $\log_a u$ is universally accepted as unambiguous notation for the base-a logarithm of u. These two functions being mutually inverse with one using a superscript and the other a subscript suggests greater symmetry between these superscripts and subscripts than is realized in practice. In contexts where the base of the logarithm is restricted to but a single value, no ambiguity in that restricted context results from merely omitting the subscript in the interest of less-cluttered notation. This is a frequent custom for the natural logarithm, the decimal logarithm, the binary logarithm, and for other logarithms as well. On the other hand, simply omitting superscripted exponents is out of the question. They must be retained in some form—though perhaps not superscripted.

A conversational familiarity with exponentials and logarithms is invited here. This familiarity is to allow some extension to the sort of unambiguous but non-unique notation which permits $e^z$ and exp z to be synonymous functions. In the following sections a few expressions are dignified as named functions. Some of these newly named functions are different from exponentials and logarithms despite being intimately related to them and are collectively referred to as diff-exponentials and diff-logarithms, respectively.

Extended Exponential Notation

Frequent occasion to dispense with the superscripting of an exponent arises as when the expression for the exponent becomes too unwieldy. For the natural, i.e., base-e, exponential there is the universally accepted notational identity $\exp u \equiv e^u$. Extensions of this popular convention to include exponentials of bases which are constant, variable, integer, real, binary, decimal, or hexadecimal, can be defined as follows:

$$\text{axp } u \equiv a^u, \, a = \text{constant, say} \tag{198}$$

$$\text{bxp } u \equiv b^u, \, b = 2, \text{ usually} \tag{199}$$

$$\text{cxp } u \equiv c^u, \, c = \text{constant, say} \tag{200}$$

$$\text{dxp } u \equiv d^u, \, d = 10, \text{ say} \tag{201}$$

$$\text{exp } u \equiv e^u, \, e = \text{natural base, usually} \tag{202}$$

$$\text{hxp } u \equiv h^u, \, h = 16, \text{ say} \tag{203}$$

$$\text{mxp } u \equiv m^u, \, m = \text{integer base, usually} \tag{204}$$

$$\text{vxp } u \equiv v^u, \, v = \text{real variable, say} \tag{205}$$

$$\text{wxp } u \equiv w^u, \, w = \text{real variable, say} \tag{206}.$$

This notation easily extends to further parameters denoted by other letters and symbols.

Extended Logarithmic Notation

This general form of superscript-free notation for exponentials immediately suggests a corresponding general form of subscript-free notation for multiple logarithms as follows:

$$\text{alg } u \equiv \log_a u, \, a = \text{constant, say} \tag{207}$$

$$\text{blg } u \equiv \log_b u, \, b = 2, \text{ usually} \tag{208}$$

$$\text{clg } u \equiv \log_c u, \, c = \text{constant, say} \tag{209}$$

$$\text{dlg } u \equiv \log_d u, \, d = 10, \text{ usually} \tag{210}$$

$$\text{elg } u \equiv \log_e u, \, e = \text{natural base, say} \tag{211}$$

$$\text{hlg } u \equiv \log_h u, \, h = 16, \text{ perhaps} \tag{212}$$

$$\text{mlg } u \equiv \log_m u, \, m = \text{integer variable, say} \tag{213}$$

$$\text{vlg } u \equiv \log_v u, \, v = \text{real variable, say} \tag{214}$$

$$\text{wlg } u \equiv \log_w u, \, w = \text{real variable, say} \tag{215}.$$

This is a consistent set of extensions and alternatives to the following more restricted combination of alternative forms which are likely to remain popular:

$$\log u \equiv \log_{10} u \tag{216}$$

$$\ln u \equiv \log_e u \tag{217}$$

$$\lg u \equiv \log_2 u \tag{218}.$$

Then over appropriate ranges of u there is:

$$\text{axp alg } u = \text{alg axp } u = u \tag{219}$$

$$\text{bxp blg } u = \text{blg bxp } u = u \tag{220}$$

$$\text{cxp clg } u = \text{clg cxp } u = u \tag{221}$$

$$\text{dxp dlg } u = \text{dlg dxp } u = u \tag{222}$$

$$\text{exp elg } u = \text{elg exp } u = u \tag{223}$$

$$\text{hxp hlg } u = \text{hxp } u = u \tag{224}$$

$$\text{mxp mlg } u = \text{mlg mxp } u = u \tag{225}$$

$$\text{vxp vlg } u = \text{vlg vxp } u = u \tag{226}$$

$$\text{wxp wlg } u = \text{wlg wxp } u = u \tag{227}.$$

which gives a clear notation for the inverse relations between logarithms and exponentials.

The equivalent chain rules for logarithms $$(\log_u v)(\log_v w) \log_w u = 1 \tag{228}$$

$$\log_u w = (\log_u v) \log_v w \tag{229}$$

take the simpler and more mnemonic forms $$(\text{ulg } v)(\text{vlg } w) \text{ wlg } u = 1 \tag{230}$$

$$\text{ulg } w = (\text{ulg } v) \text{ vlg } w \tag{231}.$$

where "ulg" is to mean "$\log_u$."

DEFINITIONS FOR EXPONENTIALS AND LOGARITHMS

Diff-Functions: Diff-Exponentials and Diff-Logarithms

The functional expressions $-1 + \exp z \equiv e^z - 1 = e^z(1 - e^{-z})$ and $\ln(1+z)$ frequently accompany general use of the exp and ln functions. These occasions are so prominent in the discussion of the design of E/L systems that these expressions are designated as the named functions exd $z \equiv e^z - 1 \equiv -1 + \exp z$ and eld $z \equiv \ln(1+z) \equiv \text{elg}(1+z)$. These and similar functions of other bases are simply called diff-exponentials and dif-flogarithms-due to their definitions differing but slightly from their respective exponential and logarithmic functions. The following diff-functions are easily defined:

$$\text{axd } u \equiv -1 + \text{axp } u \equiv a^u - 1, \, a = \text{constant, say} \tag{232}$$

$$\text{bxd } u \equiv -1 + \text{bxp } u \equiv b^u - 1, \, b = 2, \text{ usually} \tag{233}$$

$$\text{dxd } u \equiv -1 + \text{dxp } u \equiv d^u - 1, \, d = 10, \text{ say} \tag{234}$$

$$\text{exd } u \equiv -1 + \exp u \equiv e^u - 1, \ e = \text{natural base, usually} \quad (235)$$

$$\text{hxd } u \equiv -1 + \text{hxp } u \equiv h^u - 1, \ h = 16, \text{ usually} \quad (236)$$

$$\text{mxd } u \equiv -1 + \text{mxp } u \equiv m^u - 1, \ m = \text{integer base, say} \quad (237)$$

$$\text{vxd } u \equiv -1 + \text{vxp } u \equiv v^u - 1, \ v = \text{real base, usually} \quad (238)$$

$$\text{wxd } u \equiv -1 + \text{wxp } u \equiv w^u - 1, \ w = \text{real base, usually} \quad (239)$$

$$\text{ald } u \equiv \text{alg}(1+u) \equiv \log_a(1+u), \ a = \text{constant, say} \quad (240)$$

$$\text{bld } u \equiv \text{blg}(1+u) \equiv \log_b(1+u), \ b = 2, \text{ usually} \quad (241)$$

$$\text{dld } u \equiv \text{dlg}(1+u) \equiv \log_d(1+u), \ d = 10, \text{ usually} \quad (242)$$

$$\text{eld } u \equiv \text{elg}(1+u) \equiv \log_e(1+u), \ e = \text{natural base, say} \quad (243)$$

$$\text{hld } u \equiv \text{hlg}(1+u) \equiv \log_h(1+u), \ h = 16, \text{ say} \quad (244)$$

$$\text{mld } u \equiv \text{mlg}(1+u) \equiv \log_m(1+u), \ m = \text{integer base, say} \quad (245)$$

$$\text{vld } u \equiv \text{vlg}(1+u) \equiv \log_v(1+u), \ v = \text{real base, say} \quad (246)$$

$$\text{wld } u \equiv \text{wlg}(1+u) \equiv \log_w(1+u), \ w = \text{real base, say} \quad (247)$$

Then over appropriate ranges of u there is:

$$\text{axd ald } u = \text{ald axd } u = u \quad (248)$$

$$\text{bxd bld } u = \text{bld bxd } u = u \quad (249)$$

$$\text{dxd dld } u = \text{dld dxd } u = u \quad (250)$$

$$\text{exd eld } u = \text{eld exd } u = u \quad (251)$$

$$\text{hxd hld } u = \text{hld hxd } u = u \quad (252)$$

$$\text{mxd mld } u = \text{mld mxd } u = u \quad (253)$$

$$\text{vxd vld } u = \text{vld vxd } u = u \quad (254)$$

$$\text{wxd wld } u = \text{wld wxd } u = u \quad (255)$$

which provides a clear notation for the inverse relations between the diff-logarithms and diff-exponentials.

ABBREVIATIONS

C-FLP conventional floating point.
EC-FLP equivalent conventional floating point.
E-FLP logarithmic floating point.
FXP fixed point.
LOP loss of precision.
LS least significant.
MS most significant.
NS next most significant.
PDOE product difference of exponentials.

NOTATION $\{x\} = x - \lfloor x \rfloor = x \bmod 1$, the unsigned fractional portion of x.

$\lfloor x \rfloor = \text{floor}(x) \equiv \text{integer}(x)$ The largest (signed) integer not greater than x.

$\tilde{x} \equiv x_{C-FLP}$ Conventional floating point value x.

$\hat{x} \equiv x_{E-FLP}$ Exponential floating point value x.

GLOSSARY

DENORML: A conversion operation for the E-FLP user. Conversion from C-FLP to FXP: $u_{FXP} = \text{DENORML}(u_{C-FLP})$. Usually handles $u_{C-FLP} < 0$ and $u_{C-FLP} = 0$. The inverse conversion is NORML.

diff-exponential: The base-a diff-exponential axd x of argument x is defined as axd $x \equiv -1 + \text{axp } x \equiv a^x - 1$ diff-logarithm: The base-a diff-logarithm ald x of argument x is defined as ald $x \equiv \text{alg}(1+x) \equiv \log_a(1+x)$ FLAT: A conversion operation for the E-FLP user. Conversion from C-FLP to E-FLP: $u_{E-FLP} = \text{FLAT}(u_{C-FLP})$. Usually handles $u_{C-FLP} < 0$ and $u_{C-FLP} = 0$. Twin mnemonics for this conversion are that a) it is an integral part of the FLOAT conversion, and that, at the FXP format data field level, b) it "flattens" the C-FLP significand into a linear fractional extension of the integer exponent. The inverse conversion is FLEX.

FLEX: A conversion operation for the E-FLP user. Conversion from E-FLP to C-FLP: $u_{C-FLP} = \text{FLEX}(u_{E-FLP})$. Usually handles $u_{E-FLP} < 0$ and $u_{E-FLP} = 0$. Twin mnemonics for this conversion are that a) it is an integral part of the FIX conversion, and that, at the fixed point format data field level, b) it "flexes" or bends the linear fraction extension of the integer portion of the E-FLP exponent into the C-FLP significand. The inverse conversion is FLAT.

FIX: A conversion operation for the E-FLP user. Conversion from E-FLP to C-FLP: $u_{FXP} = \text{FIX}(u_{E-FLP})$. Usually handles $u_{E-FLP} < 0$ and $u_{E-FLP} = 0$. The inverse conversion is FLOAT.

FLOAT: A conversion operation for the E-FLP user. Conversion from FXP to E-FLP: $u_{E-FLP} = \text{NORML}(u_{FXP})$. Usually handles $u_{FXP} < 0$ and $u_{FXP} 0$. The inverse conversion is FIX.

normal C-FLP form: Representation of a base-b C-FLP number in terms of the sign, exponent, and significand data format field quantities $S_u$, $E_u$, and D, i.e., $\tilde{u} \equiv u_{C-FLP} = (-1)^{S_u} b^{E_u - \beta} D \equiv (-1)^{S_u} b^{M_u} D$, where $S_u$ is zero or one and $\beta$ is a constant called the exponent bias. The radix of $E_u$ and $M_u$ is $B_E \equiv B_M$ and the radix of D is $B_D$. A particular single value of $E_u$ (or together with single values of $S_u$ and/or $D_u$), usually the smallest, is often redefined as C-FLP zero, i.e., $M_u = -\infty$.

normal E-FLP form Representation of a E-FLP number in terms of (positive real) base value b and the sign and exponent data format field quantities $S_u$ and $E_u$, i.e., $\hat{u} \equiv u_{E-FLP} = (-1)^{S_u} b^{E-\beta} = (-1)^{S_u} b^U$, where $S_u$ is zero or one and $\beta$ is a constant called the exponent bias. Radix-B quantity U is often referred to as the "format value" of $u_{E-FLP}$ when there is no confusion with the technical details of $S_u$ or $\beta$. A particular value of the complete data format or of some combination of its fields, e.g., a single value of $E_u$ (or of just the integer portion of $E_u$, possibly combined with the $S_u$ field), usually the smallest, is often redefined as E-FLP zero, i.e., $U = -\infty$.

NORML: A conversion operation for the E-FLP user. Conversion from FXP to C-FLP: $u_{C-FLP} = \text{NORML}(u_{FXP})$. Usually handles $u_{FXP} < 0$ and $u_{FXP} = 0$. The inverse conversion is DENORML.

PDOE: Product difference of exponentials. Refers to the expansion of $e^u - e^v$ in a product series of $u - v$ and exponentials of $u - v$ and $u + v$.

APPENDIX B

Prior Art C-FLP Conventions

Floating-Point Computational Mode

A conventional floating-point (C-FLP) system is built on a fixed-point (FXP) multiplier and employs a data format where the integer exponent field does not include the fraction field, i.e., the data format is partially or incompletely exponential/logarithmic. Furthermore, prior-art C-FLP exponential and logarithmic generation is comparatively inefficient.

General-purpose automatically scaled calculations are performed by a C-FLP system, particularly those computations related to the scientific and engineering applications requiring the kinds of functions commonly found with scientific calculators. The name "floating-point" derives from the fact that the system automatically shifts or "floats" the decimal or other radix point, keeping track of the number of shifts required to bring the value close to unity, thereby relieving the user of such tedious scaling duties. Once this scaling is automatic over a large dynamic range from very small magnitudes to very large magnitudes and there is provided arithmetic operations of at least an adequate number of significant digits of precision, the user can easily execute otherwise impossibly difficult and lengthy calculations with confidence that the results will be correct.

The set of fast mathematical operations of a C-FLP system is often called its "arithmetic" because the addition, subtraction, multiplication, and division operations are usually the principal members of this set. The multiply and divide operations are usually more expensive than the addition and subtraction operations. This cost appears either in the calculations as relatively increased execution time or in the system's construction as relatively increased demand for hardware, or in both. As is well known, a high-performance C-FLP processor requires a comparatively expensive high-performance fixed-point multiplier as an integral element of its construction.

The effective use of a floating-point system is very considerably easier than the design and implementation of such a system as this construction entails properly looking after all the details which the user may safely ignore. Moreover, to provide high performance and economical construction in the same design, the designer must track many more details properly, so that the user may take for granted both efficiency and correctness.

Internal Structure of a C-FLP System

A C-FLP system usually operates on at least two classes of numbers. The first is the class of nonsingular normalized "normal" C-FLP values. The second is a class of singular values which almost always includes an unsigned or signed zero and may include other individual values such as signed infinities, not-a-number (NaN) flags, etc. Some C-FLP systems also have a class of nonsingular nonnormal values variously called unnormalized, denormalized, or subnormal, which extend the dynamic range at the expense of precision. These values are most commonly used in the region about zero to provide what is sometimes called "gradual" underflow.

A floating-point system is used to overcome the many problems associated with computations on unscaled quantities. A C-FLP system is, nonetheless, constructed from the interaction of unscaled quantities. Thus, although the C-FLP user need not be concerned with these unscaled quantities, the system designer necessarily is. Accordingly, a few conventions regarding their description are helpful.

A fixed-point (FXP) number is the most common form of unscaled number. A FXP quantity $u \equiv u_{FXP}$ is written in the usual way with digits to the left and to the right of the radix point. The placement of this radix point is "fixed" which means that it is always between the integer and fraction portions of the value. Although each radix-r digit $d_i$ has its particular value from $0 \leq d_i \leq r-1$, the value of u is derived from an "exponentially weighted" sum of all these digits. Which is to say that each $d_i$ is multiplied by its own particular multiplying factor or "weight" $r^i$. This weight is the base-r exponential of the digit-place index i where i=0 for the digit immediately to the left of the radix point. Successively more positive and more negative values of i lie to the left and right, respectively, of this digit place. Thus in principle, $$U = \sum_{i=-\infty}^{\infty} d_i r^i \tag{256}$$

$$= \ldots + d_2 r^2 + d_1 r^1 + d_0 r^0 + d_{-1} r^{-1} + d_{-2} r^{-2} + \ldots \tag{257}$$

$$= \ldots d_2 d_1 d_0 . d_{-1} d_{-2} \ldots \tag{258}$$

where for finite positive $u < r^n$ all $d_i = 0$ to the left of $i = n-1$.

Practical restrictions are inevitable regarding how many digits can be dedicated to representing such FXP numbers. These restrictions often severely limit the dynamic range of FXP numbers. In order to solve the problem of small dynamic range in a FXP system, a C-FLP system deals with scaled rather than unscaled numbers. This scaling allows numbers over a wide dynamic range to be represented economically with many fewer digits than the FXP form demands. In a C-FLP system, this scaling of an unscaled radix-r value u is based on the ultrafast and economical multiplication or division by $r^n$ which results simply from shifting u through n digit places to the left or right, respectively, relative to the radix point. This corresponds to "floating" the radix point: this same quantity of shifts in the opposite direction relative to the unshifted value.

Thus an unscaled number may be scaled by keeping a radix-$r_M$ record of the quantity $M_u$ of shifts required to convert the unscaled number u into a radix-$r_D$ quantity called the significand $D_u$. This significand is usually about as close to unity as can be done solely by shifting. In the world of C-FLP this process is referred to as "normalization" (even though in formal analysis this term usually means scaling rather more precisely to unity). The value resulting from this normalization is referred to as the normal C-FLP number $\bar{u}$ when inferred according to $$\bar{u} = (-1)^{S_u} a^{M_u} D_u \tag{259}$$

which is called the "normal" equation. The sign bit $S_u$ is zero or one, respectively, to record whether the original FXP value u is positive or negative. Only $S_u$, $M_u$, and $D_u$ need be stored according to the data format as a is constant in a given system. As a matter of practical implementation the signed exponent $M_u$ is often stored in the exponent field of the data format in biased form as the unsigned integer $E_u = M_u + \beta$ where $\beta$ is a constant called the exponent bias. This bias generally simplifies detection of overflow and underflow. The single FXP value $u = 0$ cannot be normalized literally by shifting as this would correspond to $M_u = -\infty$. Implementation providing more individualized handling of this singular value is common.

The class of such singular values within a C-FLP system may be expanded to include unsigned or signed zeroes, signed or unsigned infinities, not-a-number (NaN) flags, etc. in order to further relieve the user of the chores related to keeping track of such additional details. Indeed, modern C-FLP standards such as those of the Institute of Electrical and Electronic Engineers (IEEE) include many such singular values. This class of values requires generally separate processing and separate encoding for storage in the data format. Thus a normal C-FLP number is a nonzero signed value $\tilde{u}$ which may be inferred from a sign bit $S_u$, a positive integer C-FLP base a, an unsigned significand $D_u$, an unsigned exponent data field value $E_u$, and an associated constant bias $\beta$ such that $E_u = M_u + \beta$ where $M_u$ is a signed integer exponent.

The data-format field values $E_u$ and $D_u$ are commonly represented in terms of exponentially-weighted radix-$r_E$ and radix-$r_D$ digits, respectively, residing in d-digit and p-digit fields, respectively, of the data format. Although a is not stored in the data format, implementation of each of the primitive C-FLP operations addition, subtraction, multiplication, and division requires severely nonlinear interactions between the Es and Ds of their respective operands. This circumstance has the effect of requiring that a be a single value and that this specific value be explicitly known.

As a practical matter, in order to relate the digit-place shifts of the value of $D_u$ to increments to the value of $E_u$, the value for a is chosen to be an integer power k of $r_D$ so that a shift of k digit places corresponds to a single count of $M_u$ or $E_u$ even when $r_D \neq r_E \equiv r_M$. A C-FLP system using such number conventions may be characterized as having p/k base-a significant digits of precision and d radix-$r_M$ digits of dynamic range. The most significant digit of $D_u$ is usually required to be nonzero. This allows a particular economy in the case $r_D = 2$ for this digit is then constant and need not be included in the data format as it can be reconstituted upon demand. This bit is popularly referred to as the "hidden bit" when it is omitted from the data format. A single-precision binary C-FLP system may for example use a hidden-bit type of 32-bit data format with 1 sign bit, 8 exponent bits, and 23 fraction bits, as in the IEEE single-precision standard.

Once a denormalized subnormal number has been normalized into an extended normal number, further processing may then proceed as for a normal number.

APPENDIX C

Note on E/L (E-FLP) System Parameters

Base, Dynamic Range, and Precision Are Not Independent

There is an invariance relation connecting the ordered 4-tuple (base value, quantity of digits of dynamic range, quantity of digits of precision, data format radix) of system parameters. In particular, each E-FLP value inferred from a data format in a system characterized by parameters (a, d, p, r) is the same as it would be if the system were characterized by ($a^r$, d−1, p+1, r) or by ($a^{1/r}$, d+1, p−1, r), etc. Repeated application of this invariance relation produces indefinitely large numbers of systems which are functionally indistinguishable, but which "identify" a given format value U quite differently. In particular, the format value U can be formally constrained to be completely fraction or completely integer. But in either case, a then corresponds to such an eccentric value that it completely obscures the critical distinction between precision and dynamic range. This is a decided impediment to practical characterization of such a system and an equally serious obstacle to easily applying such a system to effective calculations. Actual implementation of either U'=alg U or U'=$a^U$ requires knowing the specific value of a.

The combination of the foregoing logarithmic, exponential, and data mode conversion operations together with an exponentially-weighted digit representation of U provides generally maximum internal symmetry when a=r. Such symmetry contributes strongly to a more economical implementation of an efficient E-FLP system.

All but a discrete set of possible real values for a, d, and p yield systems corresponding to equivalent base-r systems with noninteger d' and p' values despite their sum d'+p'=d+p remaining integer. Such noninteger d' and p' values lead to the necessity of a literal scaling of the format value by the amount $(r \lg a)^{\pm 1} \equiv (\log_r a)^{\pm 1}$ before and/or after many operations, notably including addition and subtraction, thus requiring a costly FXP multiplier. Hence values of a corresponding to such non-integer d' and p' values are to be avoided when maximum performance without this multiplier component is desired.

There is the further consideration that in general-purpose calculations, whether performed in E-FLP or in C-FLP, extra precision often provides general insurance. The inclusion of at least a modest amount of such insurance is considered prudent. This extra precision usually comprises more than a fraction of a digit which then completely masks any fractional-digit fine partitioning of dynamic range and precision. This is particularly true for a binary E-FLP system. Thus in addition to the good reasons for choosing a=r, it is as if there are even stronger reasons for avoiding a≠r. Thus the actual value for a is properly chosen for maximum practical advantage, which generally means a=2 on binary hardware, a=10 on decimal hardware, etc., as is the case for C-FLP systems.

APPENDIX D

Standard references such as the one published by the NBS of the U.S. Department of Commerce in 1964, "Handbook of Mathematical Functions With Formulas, Graphs, and Mathematical Tables," edited by M. Abramowitz and I. A. Stegun, state the hyperbolic and inverse hyperbolic functions, their derivatives, and their indefinite integrals as follows:

Hyperbolic Functions $$\sinh u = 1/\operatorname{csch} u = \frac{1}{2}(e^u - e^{-u}) \quad (260)$$

$$\cosh u = 1/\operatorname{sech} u = \frac{1}{2}(e^u + e^{-u}) \quad (261)$$

$$\tanh u = 1/\coth u = \frac{e^u - e^{-u}}{e^u + e^{-u}} \quad (262)$$

$$\frac{d}{du} \sinh u = \cosh u \quad (263)$$

$$\frac{d}{du} \cosh u = \sinh u \quad (264)$$

$$\frac{d}{du} \tanh u = \operatorname{sech}^2 u \quad (265)$$

$$\frac{d}{du} \operatorname{csch} u = -\operatorname{csch} u \coth u \quad (266)$$

-continued $$\frac{d}{du} \text{sech } u = -\text{sech } u \tanh u \qquad (267)$$

$$\frac{d}{du} \coth u = -\text{csch}^2 u \qquad (268)$$

$$\int \sinh u \, du = \cosh u \qquad (269)$$
$$\int \cosh u \, du = \sinh u \qquad (270)$$
$$\int \tanh u \, du = \ln(\cosh u) \qquad (271)$$

$$\int \text{csch } u \, du = \ln\left(\tanh \frac{1}{2} u\right) \qquad (272)$$

$$\int \text{sech } u \, du = \arctan(\sinh u) \qquad (273)$$
$$\int \coth u \, du = \ln(\sinh u). \qquad (274)$$

Inverse Hyperbolic Functions

The inverse hyperbolic functions, their derivatives, and their indefinite integrals may be stated as follows:

$$\text{arcsinh } u = \text{arccsch } u^{-1} = \ln(u + (u^2 + 1)^{\frac{1}{2}}) \qquad (275)$$
$$\text{arccosh } u = \text{arcsech } u^{-1} = \ln(u + (u^2 - 1)^{\frac{1}{2}}), \qquad (276)$$
$$1 \leq u$$

$$\text{arctanh } u = \text{arccoth } u^{-1} = \frac{1}{2} \ln \frac{1+u}{1-u}, \qquad (277)$$
$$0 \leq u^2 < 1$$

$$\frac{d}{du} \text{arcsinh } u = (1 + u^2)^{-\frac{1}{2}} \qquad (278)$$

$$\frac{d}{du} \text{arccosh } u = (u^2 - 1)^{-\frac{1}{2}} \qquad (279)$$

$$\frac{d}{du} \text{arctanh } u = (1 - u^2)^{-1} \qquad (280)$$

-continued $$\frac{d}{du} \text{arccsch } u = -u^{-1}(1 + u^2)^{-\frac{1}{2}} \qquad (281)$$

$$\frac{d}{du} \text{arcsech } u = -u^{-1}(1 - u^2)^{-\frac{1}{2}} \qquad (282)$$

$$\frac{d}{du} \text{arccoth } u = (1 - u^2)^{-1} \qquad (283)$$

$$\int \text{arcsinh } u \, du = u \, \text{arcsinh } u - (1 + u^2)^{\frac{1}{2}} \qquad (284)$$
$$\int \text{arccosh } u \, du = u \, \text{arccosh } u - (u^2 - 1)^{\frac{1}{2}} \qquad (285)$$
$$\int \text{arctanh } u \, du = u \, \text{arctanh } u + \ln(1 - u^2) \qquad (286)$$
$$\int \text{arccsch } u \, du = u \, \text{arccsch } u + \text{arcsinh } u \qquad (287)$$
$$\int \text{arcsech } u \, du = u \, \text{arcsech } u + \arcsin u \qquad (288)$$

$$\int \text{arccoth } u \, du = u \, \text{arccoth } u + \frac{1}{2} \ln(u^2 - 1). \qquad (289)$$

APPENDIX E

Avoiding Loss of Precision—An Arctanh Example

When $|u|$ is close to the value one, the evaluation of arctanh u loses precision when executed directly according to the defining equation arctanh $u = \frac{1}{2} \ln((1+u)/(1+u))$. However, E-FLP computation can avoid this loss of precision because the analysis of such a situation in E-FLP computation can always be reduced to an analysis of the corresponding fixed-point format computations.

When an E-FLP value $\hat{u}$ is related to its format value U by $\hat{u} = 2^U$ and is less than but close to the value one, then U is negative but close to zero. In this region, an expression for the fixed-point format value for the E-FLP function (arctanh $\hat{u})_{E-FLP}$ given directly in terms of the fixed-point U may be derived as follows:

$$\text{blg}(\text{arctanh } 2^U) = \text{blg}\left(\frac{1}{2} \ln\left(\frac{1 + 2^U}{1 - 2^U}\right)\right) \qquad (290)$$

$$= \text{blg}\left(\frac{1}{2} \ln\left(\frac{1 - 2^{2U}}{(1 - 2^U)(1 - 2^U)}\right)\right) \qquad (291)$$

$$= \text{blg}\left(\frac{1}{2} \ln\left(\frac{1 - 2^{2U}}{(1 - 2^U)^2}\right)\right) \qquad (292)$$

$$= \text{blg}\left(\frac{1}{2} \ln\left(\frac{(1 - 2^{-(-2U)})}{(1 - 2^{-(-2U)})}\right)\right) \qquad (293)$$

$$= \text{blg}\left\{\frac{1}{2} \ln\left(\frac{(-2U)q^{-1} \, \text{bxp}\left(\sum_{n=1}^{\infty} \frac{B_n(-2U)^n}{n \, n! \, q^{n-1}}\right)}{(-U)^2 q^{-2} \, \text{bxp}\left(\sum_{n=1}^{\infty} \frac{B_n 2(-U)^n}{n \, n! \, q^{n-1}}\right)}\right)\right\}, |U| < \pi \qquad (294)$$

$$= \text{blg}\left(\frac{1}{2} \ln\left(\frac{2q}{-U} \, \text{bxp}\left(\sum_{n=1}^{\infty} \frac{B_n(2^n - 2)(-U)^n}{n \, n! \, q^{n-1}}\right)\right)\right), |U| < \pi \qquad (295)$$

$$= \text{blg}\left(\frac{1}{2q} \, \text{blg}\left(\frac{2q}{-U} \, \text{bxp}\left(\sum_{n=2}^{\infty} \frac{B_n(2^n - 2)(-U)^n}{n \, n! \, q^{n-1}}\right)\right)\right), |U| < \pi \qquad (296)$$

$$= \text{blg}\left(\frac{1}{2q}\left(1 + Q - \text{blg}(-U) + \sum_{n=2}^{\infty} \frac{B_n(2^n - 2)(-U)^n}{n \, n! \, q^{n-1}}\right)\right), |U| < \pi \qquad (297)$$

$$= -1 - Q + \text{blg}\left(1 + Q - \text{blg}(-U) + \sum_{n=2}^{\infty} \frac{B_{2n}(2^{2n} - 2)(-U)^{2n}}{2n(2n)! \, q^{2n-1}}\right), |U| < \pi \qquad (298)$$

$$= -1 - Q + \text{blg}\left(1 + Q - \text{blg}(-U) + \sum_{n=2}^{\infty} (-1)^{n+1} \, \text{bxp}(d_n + 2n \, \text{blg}(-U))\right), \qquad (299)$$

$$d_n = \text{blg} \left| \frac{B_{2n}(2^{2n} - 2)}{2n(2n)! \, q^{2n-1}} \right|, -U < \pi. \tag{300}$$

What is claimed is:

1. In a number processor for processing exponential floating point (E-FLP) numbers wherein a representation of a represented E-FLP number comprises an exponent signal comprising a logarithmic function of said represented E-FLP number, apparatus for extracting a portion of an input E-FLP operand, which is related to a ratio of integers, to produce an E-FLP output, comprising:

means coupled to receive an input exponent signal comprising said logarithmic function of a magnitude of said input E-FLP operand for routing in accordance with a partitioning between a first characteristic signal and a first mantissa signal;

exponential function signal generator coupled to receive said first mantissa signal to produce a first significand signal comprising an exponential function, corresponding to said logarithmic function, of said first mantissa signal;

means comprising combinatorial logic coupled to receive a most significant portion of said input exponent signal and said first significant signal for selectively altering digits of said first significand signal to produce a first interim signal;

logarithmic function signal generator coupled to receive said first interim signal to produce a second interim signal comprising said logarithmic function of said first interim signal; and means coupled to receive said first characteristic signal and said second interim signal for adding to produce an output exponent signal comprising said logarithmic function of a magnitude of said E-FLP output and thus to produce said E-FLP output.

2. In a number processor for processing exponential floating point (E-FLP) numbers wherein a representation of a represented E-FLP number comprises an exponent signal comprising a logarithmic function of said represented E-FLP number, apparatus for extracting an approximate integer portion of an input E-FLP operand which is not less than one to produce an E-FLP output, comprising:

means coupled to receive an input exponent signal comprising said logarithmic function of a magnitude of said input E-FLP operand for routing in accordance with a partitioning between a first characteristic signal and a first mantissa signal;

exponential function signal generator coupled to receive said first mantissa signal to produce a first significand signal comprising an exponential function, corresponding to said logarithmic function, of said first mantissa signal and comprising a radix equal to a base of said exponential function;

means comprising combinatorial logic coupled to receive said first characteristic signal and said first significand signal for masking digits of said first significand signal to produce an interim signal wherein all digits of said interim signal at digit places which are less significant than a digit place representing a reciprocal of said exponential function of said first characteristic signal are cleared to zero and all other digits of said interim signal are matched with corresponding digits of said first significand signal;

logarithmic function signal generator coupled to receive said interim signal to produce a second mantissa signal comprising said logarithmic function of said interim signal; and means coupled to receive said first characteristic signal and said second mantissa signal for concatenating to produce an output exponent signal comprising said logarithmic function of a magnitude of said E-FLP output and thus to produce said E-FLP output.

3. In a number processor for processing exponential floating point (E-FLP) numbers wherein a representation of a represented E-FLP number comprises an exponent signal comprising a logarithmic function of said represented E-FLP number, apparatus for extracting an approximate fraction portion of an input E-FLP operand, to produce an E-FLP output, comprising:

means coupled to receive an input exponent signal comprising said logarithmic function of a magnitude of said input E-FLP operand for routing in accordance with a partitioning between a first characteristic signal and a first mantissa signal;

exponential function signal generator coupled to receive said first mantissa signal to produce a first significant signal comprising an exponential function, corresponding to said logarithmic function, of said first mantissa signal;

means comprising combinatorial logic coupled to receive said first characteristic signal and said first significand signal for masking digits of said first significand signal to produce an interim signal wherein all digits of said interim signal at digit places which are not less significant than a digit place representing a reciprocal of said exponential function of said first characteristic signal are cleared to zero and all other digits of said interim signal are matched to corresponding digits of said first significand signal; and means coupled to receive said interim signal for detecting a zero interim signal, to produce an E-FLP status signal which flags a zero E-FLP output;

means coupled to receive said interim signal and said status signal for normalizing said interim signal, to produce a second characteristic signal and a second significand signal;

logarithmic function signal generator coupled to receive said second significand signal to produce a second mantissa signal comprising said logarithmic function of said second significand signal; and means coupled to receive said first characteristic signal, said second characteristic signal and said second mantissa signal for adding to produce an output exponent signal comprising said logarithmic function of a magnitude of said E-FLP output and thus to produce said E-FLP output.

4. In a number processor for processing binary exponential floating point (bE-FLP) numbers wherein a representation of a represented bE-FLP number comprises an exponent signal comprising a binary logarithmic function of a magnitude of said represented bE-FLP number, apparatus for decrementing, by a constant number one, an input bE-FLP operand which is greater than one and less than about two, to produce a decremented bE-FLP operand, comprising:

means coupled to receive an input exponent signal comprising a binary logarithmic function of a magnitude of said input bE-FLP operand for normalizing to produce a characteristic signal and a significand signal;

binary logarithmic function signal generator coupled to receive said significand signal to produce a mantissa signal comprising a binary logarithmic function of said significand signal; and means coupled to receive said characteristic signal, said mantissa signal and a bias comprising a binary logarithmic function of a reciprocal of a binary logarithmic function of a Napierian constant for adding to produce an output exponent signal comprising a binary logarithmic function of a magnitude of said decremented bE-FLP operand and thus to produce said decremented bE-FLP operand.

5. The apparatus as set forth in claim 4 wherein said adding means is replaced by:

means coupled to receive said input exponent signal for scaling by one half to produce a half input exponent signal; and means coupled to receive said characteristic signal, said mantissa signal, a bias comprising a binary logarithmic function of a reciprocal of a binary logarithmic function of a Napierian constant and said half input exponent signal for adding to produce an output exponent signal comprising a binary logarithmic function of a magnitude of said decremented bE-FLP operand and thus to produce said decremented bE-FLP operand.

6. The apparatus as set forth in claim 5 wherein said adding means producing said output exponent signal is replaced by:

means coupled to receive said characteristic signal and said mantissa signal for adding to produce an interim signal;

means coupled to receive a most significant portion of said interim signal for extracting a most significant interim signal;

means coupled to receive said most significant interim signal for doubling to produce a doubled most significant interim signal;

means coupled to receive said doubled most significant interim signal and a coefficient bias which comprises a sum of said constant bias and a binary logarithmic function of a reciprocal of twenty four for adding to produce an interim coefficient biased signal;

binary exponential function signal generator coupled to receive said interim coefficient biased signal to produce a correction function signal comprising a binary exponential function of said coefficient biased signal; and means coupled to receive said interim signal, said constant bias, said half input signal and said correction function signal for adding to produce an output exponent signal comprising a binary logarithmic function of a magnitude of said decremented bE-FLP operand and thus to produce said decremented bE-FLP operand.

7. In a number processor for processing signed binary exponential floating point (bE-FLP) numbers wherein a representation of a represented bE-FLP number comprises a signal pair comprising a sign signal and an exponent signal wherein said sign signal represents a sign of said represented bE-FLP number and said exponent signal comprises a binary logarithmic function of a magnitude of said represented bE-FLP number, apparatus for adding a first input bE-FLP operand whose representation comprises a first input signal pair comprising a first input sign signal and a first input exponent signal and a second input bE-FLP operand whose representation comprises a second input signal pair comprising a second input sign signal and a second input exponent signal wherein said second bE-FLP operand does not equal said first bE-FLP operand, to produce an output bE-FLP sum whose representation comprises an output signal pair comprising an output sign signal and an output exponent signal, comprising:

means coupled to receive said first input exponent signal and said second input exponent signal for subtracting said second input exponent signal from said first input exponent signal to produce an exponent difference signal;

means coupled to receive said first input exponent signal, said second input exponent signal and a most significant portion of said exponent difference signal for selecting, in accordance with said most significant portion of said exponent difference signal, between said first input exponent signal and said second input exponent signal to produce a reference exponent signal comprising a lesser of said first input exponent signal and said second input exponent signal;

means which comprises combinatorial logic coupled to receive said exponent difference signal for rectifying to produce a positive exponent signal comprising a magnitude of said exponent difference signal;

means coupled to receive said positive exponent signal for routing in accordance with a partitioning of said positive exponent signal between an integer portion and a fraction portion;

binary exponential function signal generator coupled to receive said fraction portion to produce a first function signal comprising a binary exponential function of said fraction portion wherein said binary exponential function signal generator comprises: means coupled to receive digits of said fraction portion for partitioning and arranging to produce a multiplicity of latent indices; a multiplicity of latent mapping means coupled to receive selected ones of said multiplicity of latent indices for mapping into a multiplicity of latent mapped signals; and means comprising combinatorial logic coupled to receive said multiplicity of latent mapped signals for combining to produce said first function signal;

means comprising combinatorial logic coupled to receive said integer portion for decoding to produce a decoded signal comprising a reciprocal of a binary exponential function of said integer portion;

means comprising combinatorial logic coupled to receive said first sign signal and said second input sign signal for attaching a sign polarity to said decoded signal to produce a signed decoded signal;

means coupled to receive said first function signal and said signed decoded signal for adding to produce an interim signal;

means coupled to receive said interim signal for normalizing to produce a characteristic signal and a significand signal;

binary logarithmic function signal generator coupled to receive said significand signal to produce a second function signal comprising a binary logarithmic function of said significand signal;

means coupled to receive said characteristic signal and said second function signal for adding to produce a third function signal;

means coupled to receive said integer portion, said reference exponent signal and said third function signal for adding to produce said output exponent signal;

means comprising combinatorial logic coupled to receive said first input sign signal, said second input sign signal and a most significant portion of said exponent difference signal for logical combining to produce said output sign signal; and means coupled to receive said output sign signal and said output exponent signal for associating to produce said output signal pair and thus to produce said output bE-FLP sum.

8. The apparatus as set forth in claim 7 further comprising:

means coupled to receive a most significant portion of said third function signal for routing to produce a status signal which characterizes precision of said bE-FLP output.

9. In a number processor for processing binary exponential floating point (bE-FLP) numbers wherein a representation of a represented bE-FLP number comprises an exponent signal comprising a binary logarithmic function of a magnitude of said represented bE-FLP number, apparatus for incrementing, by a constant number one, an input bE-FLP operand which is greater than one to produce an incremented bE-FLP operand, comprising:

means coupled to receive an input exponent signal comprising a binary logarithmic function of a magnitude of said input bE-FLP operand for routing in accordance with a partitioning of said input exponent signal between an integer portion and a fraction portion;

binary exponential function signal generator coupled to receive said fraction portion to produce a first function signal comprising a binary exponential function of said fraction portion wherein said binary exponential function signal generator comprises: means coupled to receive digits of said fraction portion for partitioning and arranging to produce a multiplicity of latent indices; a multiplicity of latent mapping means coupled to receive selected ones of said multiplicity of latent indices for mapping into a multiplicity of latent mapped signals; and means comprising combinatorial logic coupled to receive said multiplicity of latent mapped signals for combining to produce said first function signal means comprising combinatorial logic coupled to receive said integer portion for decoding to produce a decoded signal comprising a reciprocal of a binary exponential function of said integer portion;

means coupled to receive said first function signal and said decoded signal for adding to produce an interim signal;

binary logarithmic function signal generator coupled to receive said interim signal to produce a second function signal comprising a binary logarithmic function of said interim signal; and means coupled to receive said integer portion and said second function signal for adding to produce an output exponent signal comprising a binary logarithmic function of a magnitude of said incremented bE-FLP operand and thus to produce said incremented bE-FLP operand.

10. In a number processor for processing base-a exponential floating point (aE-FLP) numbers wherein a representation of a represented aE-FLP number comprises an exponent signal comprising a base-a logarithmic function of a magnitude of said represented aE-FLP number wherein said base a is nominally greater than one, apparatus for incrementing, by a constant number one, an input positive aE-FLP operand which is less than one to produce an incremented aE-FLP operand, comprising:

means comprising combinatorial logic coupled to receive an input exponent signal comprising a base-a logarithmic function of a magnitude of said input bE-FLP operand for rectifying to produce a positive exponent signal;

means coupled to receive said positive exponent signal for routing in accordance with a partitioning of said positive exponent signal between an integer portion and a fraction portion;

base-a exponential function signal generator coupled to receive said fraction portion to produce a first function signal comprising a base-a exponential function of said fraction portion;

means comprising combinatorial logic coupled to receive said integer portion for decoding to produce a decoded signal comprising a reciprocal of a base-a exponential function of said integer portion;

means coupled to receive said first function signal and said decoded signal for adding to produce an interim signal;

base-a logarithm function signal generator coupled to receive said interim signal to produce a second function signal comprising a base-a logarithmic function of said interim signal; and means coupled to receive said input exponent signal, said integer portion and said second function signal for adding to produce an output exponent signal comprising a base-a logarithmic function of a magnitude of said incremented operand and thus to produce said incremented aE-FLP operand.

11. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number, apparatus for decrementing, by a constant number one, an input aE-FLP operand which is greater than about two to produce a decremented aE-FLP operand, comprising:

means coupled to receive an input exponent signal comprising a base-a logarithmic function of a magnitude of said input aE-FLP operand for routing in accordance with a partitioning of said input exponent signal between an integer portion and a fraction portion;

base-a exponential function signal generator coupled to receive said fraction portion to produce a first function signal comprising a base-a exponential function of said fraction portion;

means comprising combinatorial logic coupled to receive said integer portion for decoding to produce a decoded signal comprising a reciprocal of a base-a exponential function of said integer portion;

means coupled to receive said first function signal and said decoded signal for subtracting said decoded signal from said first function signal to produce an interim signal;

base-a logarithmic function signal generator coupled to receive said interim signal to produce a second function signal comprising a base-a logarithmic function of said interim signal; and means coupled to receive said integer portion and said second function signal for adding to produce an output exponent signal comprising a base-a logarithmic function of a magnitude of said decremented aE-FLP operand and thus to produce said decremented aE-FLP operand.

12. The apparatus of claim 11 wherein said input aE-FLP operand is greater than one and said base-a logarithmic function signal generator is replaced by:

means coupled to receive said interim signal for normalizing to produce a characteristic signal and a significand signal;

base-a logarithmic function signal generator coupled to receive said significand signal to produce a mantissa signal comprising a base-a logarithmic function of said significant signal; and means coupled to receive said characteristic signal and said mantissa signal for adding to produce said second function signal.

13. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number, apparatus for subtracting an input positive aE-FLP operand which is less than one from a constant number one to produce a complementary aE-FLP operand, comprising:

means comprising combinatorial logic coupled to receive an input exponent signal comprising a base-a logarithmic function of a magnitude of said input positive E-FLP operand for rectifying said input exponent signal to produce a positive exponent signal;

means coupled to receive said positive exponent signal for routing in accordance with a partitioning of said positive exponent signal between an integer portion and a fraction portion;

base-a exponential function signal generator coupled to receive said fraction portion to produce a first function signal comprising a base-a exponential function of said fraction portion;

means comprising combinatorial logic coupled to receive said integer portion for decoding to produce a decoded signal comprising a reciprocal of a base-a exponential function of said integer portion;

means coupled to receive said first function signal and said decoded signal for subtracting said decoded signal from said first function signal to produce an interim signal;

means coupled to receive said interim signal for normalizing to produce a characteristic signal and a significand signal;

base-a logarithmic function signal generator coupled to receive said significand signal to produce a mantissa signal comprising a base-a logarithmic function of said significand signal; and means coupled to receive said characteristic signal, said mantissa signal, said input exponent signal and said integer portion for adding to produce an output exponent signal comprising a base-a logarithmic function of a magnitude of said complementary aE-FLP operand and thus to produce said complementary aE-FLP operand.

14. In a number processor for processing signed base-a exponential floating point (aE-FLP) numbers wherein a representation of a represented aE-FLP number comprises a signal pair comprising a sign signal and an exponent signal wherein said sign signal represents a sign of said represented aE-FLP number and said exponent signal comprises a base-a logarithmic function of a magnitude of said represented aE-FLP number wherein said base a is nominally greater than one, apparatus for adding a first input aE-FLP operand whose representation comprises a first input signal pair comprising a first input sign signal and a first input exponent signal and a second input aE-FLP operand whose representation comprises a second input signal pair comprising a second input sign signal and a second input exponent signal wherein a magnitude of one of said input aE-FLP operands is many times greater than a magnitude of another of said input aE-FLP operands, to produce an output aE-FLP sum whose representation comprises an output signal pair comprising an output sign signal and an output exponent signal, comprising:

means coupled to receive said first input exponent signal and said second input exponent signal for subtracting said second input exponent signal from said first input exponent signal to produce an exponent difference signal;

means coupled to receive said first input signal pair, said second input signal pair and said exponent difference signal for selecting, in accordance with said exponent difference signal, between said first input signal pair and said second input signal pair to produce a reference signal pair comprising a greater exponent signal;

means which comprises combinatorial logic coupled to receive said exponent difference signal for negatively rectifying to produce a negative signal comprising a magnitude equal to a magnitude of said exponent difference signal;

means coupled to receive said negative signal and a bias which comprises a base-a logarithmic function of a base-a logarithmic function of a Napierian constant for adding to produce a biased negative signal;

base-a exponential function signal generator coupled to receive said biased negative signal to produce a first function signal comprising a base-a exponential function of said biased negative signal;

means which comprises combinatorial logic coupled to receive said first function signal and said second function signal for attaching a first sign polarity to said first function signal to produce a signed first function signal;

means coupled to receive said signed first function signal and an exponent signal of said reference signal pair for adding to produce said output exponent signal;

means coupled to receive a sign signal of said reference signal pair for routing to produce said output sign signal; and means coupled to receive said output sign signal and said output exponent signal for associating to produce said output signal pair and thus to produce said output aE-FLP sum.

15. The apparatus of claim 14 wherein said sign attaching means and said adding means to produce said output exponent signal are replaced by:
  means coupled to receive said first function signal for scaling by one half to produce a half first function signal;
  means which comprises combinatorial logic coupled to receive said half first function signal, said first input sign signal and said second input sign signal for attaching a first sign polarity to said half first function signal to produce a signed half first function signal;
  means coupled to receive said signed half first function signal and said biased negative signal for adding to produce a corrected biased negative signal;
  binary exponential function signal generator coupled to receive said corrected biased negative signal to produce a corrected function signal comprising a binary exponential function of said corrected biased negative signal;
  means which comprises combinatorial logic coupled to receive said corrected function signal, said first input sign signal and said second input sign signal for attaching a second sign polarity to said corrected function signal to produce a signed corrected function signal; and
  means coupled to receive said signed corrected function signal and an exponent signal of said reference signal pair for adding to produce said output exponent signal.

16. In a number processor for processing exponential floating point (E-FLP) numbers wherein a representation of a represented E-FLP number comprises an exponent signal comprising a logarithmic function of a magnitude of said represented E-FLP number, apparatus for a machine instruction that conditionally executes, subject to a condition that a first function signal generator comprises a logarithmic function signal generator, a decrementing, by a constant number one, of an input E-FLP operand which is greater than one and less than about two, to produce a decremented E-FLP operand, comprising:
  means coupled to receive an input exponent signal comprising said logarithmic function of a magnitude of said input E-FLP operand for normalizing to produce a characteristic signal and a significand signal;
  said first function signal generator coupled to receive said significand signal to produce a mantissa signal; and
  means coupled to receive said characteristic signal, said mantissa signal and a bias comprising said logarithmic function of a reciprocal of said logarithmic function of a Napierian constant for adding to produce an output exponent signal conditionally comprising said logarithmic function of a magnitude of said decremented E-FLP operand and thus conditionally to produce said decremented E-FLP operand.

17. The machine instruction apparatus as set forth in claim 16 wherein said adding means is replaced by:
  means coupled to receive said input exponent signal for scaling by one half to produce a half input exponent signal; and
  means coupled to receive said characteristic signal, said mantissa signal, a bias comprising said logarithmic function of a reciprocal of said logarithmic function of a Napierian constant and said half input exponent signal for adding to produce an output exponent signal conditionally comprising said logarithmic function of a magnitude of said decremented E-FLP operand and thus conditionally to produce said decremented E-FLP operand.

18. The machine instruction apparatus as set forth in claim 17 wherein said adding means to produce said output exponent signal is replaced by:
  means coupled to receive said characteristic signal and said mantissa signal for adding to produce an interim signal;
  means coupled to receive a most significant portion of said interim signal for extracting a most significant interim signal;
  means coupled to receive said most significant interim signal for doubling to produce a doubled most significant interim signal;
  means coupled to receive said doubled most significant interim signal and a coefficient bias comprising a sum of said constant bias and said logarithmic function of a reciprocal of twenty four for adding to produce an interim coefficient biased signal;
  correction function signal generator coupled to receive said interim coefficient biased signal to produce a correction function signal; and
  means coupled to receive said interim signal, said constant bias, said half input signal and said correction function signal for adding to produce an output exponent signal;
  whereby, subject to a further condition that said correction function signal generator comprises an exponential function signal generator wherein said exponential function corresponds to said logarithmic function, said output exponent signal conditionally comprises said logarithmic function of a magnitude of said decremented E-FLP operand and thus conditionally produces said decremented E-FLP operand.

19. In a number processor for processing signed base-a exponential floating point (aE-FLP) numbers, wherein said base a is nominally greater than one and a representation of a represented aE-FLP number comprises a signal pair comprising a sign signal and an exponent signal wherein said sign signal represents a sign of said represented aE-FLP number and said exponent signal comprises a base-a logarithmic function of a magnitude of said represented aE-FLP number, apparatus for a machine instruction that conditionally executes, subject to twin conditions that a first function signal generator comprises a base-a exponential function signal generator and that a second function signal generator comprises a base-a logarithmic function signal generator, an adding of a first input aE-FLP operand whose representation comprises a first input signal pair comprising a first input sign signal and a first input exponent signal and a second input aE-FLP operand whose representation comprises a second input signal pair comprising a second input sign signal and a second input exponent signal, wherein said second aE-FLP operand does not equal said first aE-FLP operand, to produce an output aE-FLP sum whose representation comprises an output signal pair comprising an output sign signal and an output exponent signal, comprising:
  means coupled to receive said first input exponent signal and said second input exponent signal for subtracting said second input exponent signal from said first input exponent signal to produce an exponent difference signal;

means coupled to receive said first input exponent signal, said second input exponent signal and a most significant portion of said exponent difference signal for selecting, in accordance with said most significant portion of said exponent difference signal, between said first input exponent signal and said second input exponent signal to produce a reference exponent signal comprising a lesser of said first input exponent signal and said second input exponent signal:

means comprising combinatorial logic coupled to receive said exponent difference signal for rectifying to produce a positive exponent signal comprising a magnitude of said exponent difference signal;

means coupled to receive said positive exponent signal for routing in accordance with a partitioning of said positive exponent signal between an integer portion and a fraction portion;

said first function signal generator coupled to receive said fraction portion to produce a first function signal;

means comprising combinatorial logic coupled to receive said integer portion for decoding to produce a decoded signal comprising a reciprocal of a base-a exponential function of said integer portion;

means coupled to receive said decoded signal, said first input sign signal and said second input sign signal for attaching a sign polarity to said decoded signal to produce a signed decoded signal;

means coupled to receive said first function signal and said signed decoded signal for adding to produce an interim signal;

means coupled to receive said interim signal for normalizing to produce a characteristic signal and a significand signal;

said second function signal generator coupled to receive said significand signal to produce a second function signal;

means coupled to receive said characteristic signal and said second function signal for adding to produce a third function signal;

means coupled to receive said integer portion, said reference exponent signal and said third function signal for adding to produce said output exponent signal;

means comprising combinatorial logic coupled to receive said first input sign signal, said second input sign signal and a most significant portion of said exponent difference signal for logical combining to produce said output sign signal; and means coupled to receive said output sign signal and said output exponent signal for associating to produce said output signal pair and thus to produce said output aE-FLP sum.

20. The machine instruction apparatus as set forth in claim 19 further comprising:

means coupled to receive a most significant portion of said third function signal for routing to produce a status signal which characterizes precision of said output aE-FLP sum.

21. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number apparatus for a machine instruction that conditionally executes, subject to twin conditions that a first function signal generator comprises a base-a exponential function signal generator and that a second function signal generator comprises a base-a logarithmic function signal generator, an incrementing, by a constant number one, of an input aE-FLP operand which is greater than one, to produce an incremented aE-FLP operand, comprising:

means coupled to receive an input exponent signal comprising a base-a logarithmic function of a magnitude of said input operand for routing in accordance with a partitioning of said input exponent signal between an integer portion and a fraction portion;

said first function signal generator coupled to receive said fraction portion to produce a first function signal;

means comprising combinatorial logic coupled to receive said integer portion for decoding to produce a decoded signal comprising a reciprocal of a base-a exponential function of said integer portion;

means coupled to receive said first function signal and said decoded signal for adding to produce an interim signal;

said second function signal generator coupled to receive said interim signal to produce a second function signal; and means coupled to receive said integer portion and said second function signal for adding to produce said output exponent signal conditionally comprising a base-a logarithmic function of a magnitude of said incremented aE-FLP operand, thus conditionally to produce said incremented aE-FLP operand.

22. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number, apparatus for a machine instruction that conditionally executes, subject to twin conditions that a first function signal generator comprises a base-a exponential function signal generator and that a second function signal generator comprises a base-a logarithmic function signal generator, an incrementing, by a constant number one, of an input positive aE-FLP operand which is less than one, to produce an incremented aE-FLP operand, comprising:

means comprising combinatorial logic coupled to receive an input exponent signal comprising a base-a logarithmic function of a magnitude of said input aE-FLP operand for rectifying to produce a positive exponent signal;

means coupled to receive said positive exponent signal for routing in accordance with a partitioning of said positive exponent signal between an integer portion and a fraction portion;

said first function generator coupled to receive said fraction portion to produce a first function signal;

means comprising combinatorial logic coupled to receive said integer portion for decoding to produce a decoded signal comprising a reciprocal of a base-a exponential function of said integer portion;

means coupled to receive said first function signal and said decoded signal for adding to produce an interim signal;

said second function signal generator coupled to receive said interim signal to produce a second function signal; and means coupled to receive said input exponent signal, said integer portion and said second function signal for adding to produce an output exponent signal conditionally comprising a base-a logarithmic function of a magnitude of said incremented aE-FLP operand and thus conditionally producing said incremented aE-FLP operand.

23. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number, apparatus for a machine instruction that conditionally executes, subject to twin conditions that a first function signal generator comprises a base-a exponential function signal generator and that a second function signal generator comprises a base-a logarithmic function signal generator, a decrementing, by a constant number one, of an input aE-FLP operand which is greater than about two, to produce a decremented aE-FLP operand, comprising:

means coupled to receive an input exponent signal comprising a base-a logarithmic function of a magnitude of said input aE-FLP operand for routing in accordance with a partitioning of said input exponent signal between an integer portion and a fraction portion;

said first function generator coupled to receive said fraction portion to produce a first function signal:

means comprising combinatorial logic coupled to receive said integer portion for decoding to produce a decoded signal comprising a reciprocal of a base-a exponential function of said integer portion;

means coupled to receive said first function signal and said decoded signal for subtracting said decoded signal from said first function signal to produce an interim signal;

said second function generator coupled to receive said interim signal to produce a second function signal; and means coupled to receive said integer portion and said second function signal for adding to produce an output exponent signal conditionally comprising a base-a logarithmic function of a magnitude of said decremented aE-FLP operand and thus conditionally producing said decremented aE-FLP operand.

24. The machine instruction apparatus of claim 23 wherein said input operand is greater than one and said second function signal generator is replaced by:

means coupled to receive said interim signal for normalizing to produce a characteristic signal and a significand signal;

function signal generator coupled to receive said significand signal to produce a mantissa signal; and means coupled to receive said characteristic signal and said mantissa signal for adding to produce said second function signal.

25. In a number processor for processing base-a exponential floating point (aE-FLP) numbers wherein said base a is nominally greater than one and a representation of a represented aE-FLP number comprises an exponent signal comprising a base-a logarithmic function of a magnitude of said represented aE-FLP number, apparatus for a machine instruction that conditionally executes, subject to twin conditions that a first function signal generator comprises a base-a exponential function signal generator and that a second function signal generator comprises a base-a logarithmic function signal generator, a subtracting of an input positive aE-FLP operand which is less than one, from a constant number one, to produce a complementary aE-FLP output, comprising:

means comprising combinatorial logic coupled to receive an input exponent signal comprising a base-a logarithmic function of a magnitude of said input positive aE-FLP operand for negatively rectifying to produce a positive exponent signal;

means coupled to receive said positive exponent signal for routing in accordance with a partitioning of said positive exponent signal between an integer portion and a fraction portion;

said first function generator coupled to receive said fraction portion to produce a first function signal:

means comprising combinatorial logic coupled to receive said integer portion for decoding to produce a decoded signal comprising a reciprocal of a base-a exponential function of said integer portion;

means coupled to receive said first function signal and said decoded signal for subtracting said decoded signal from said first function signal to produce an interim signal;

means coupled to receive said interim signal for normalizing to produce a characteristic signal and a significand signal;

said second function signal generator coupled to receive said significand signal to produce a mantissa signal;

means coupled to receive said characteristic signal, said mantissa signal said input exponent signal and said integer portion for adding to produce an output exponent signal conditionally comprising a base-a logarithmic function of a magnitude of said output complementary aE-FLP operand and thus conditionally producing said complementary aE-FLP output.

26. In a number processor for processing signed base-a exponential floating point (aE-FLP) numbers wherein a representation of a represented aE-FLP number comprises a signal pair comprising a sign signal and an exponent signal wherein said sign signal represents a sign of said represented aE-FLP number and said exponent signal comprises a base-a logarithm of a magnitude of said represented bE-FLP number wherein said base a is nominally greater than one, apparatus for a machine instruction that conditionally executes, subject to a condition that a function signal generator comprises a base-a exponential function signal generator, an adding of a first input aE-FLP operand whose representation comprises a first input signal pair comprising a first input sign signal and a first input exponent signal and a second aE-FLP operand whose representation comprises a second input signal pair comprising a second input sign signal and a second input exponent signal wherein a magnitude of one of said input aE-FLP operands is many times greater than a magnitude of another of said input aE-FLP operands, to produce an output aE-FLP sum whose representation comprises an output signal pair comprising an output sign signal and an output exponent signal, comprising:

means coupled to receive said first input exponent signal and said second input exponent signal for subtracting said second input exponent signal from said first input exponent signal to produce an exponent difference signal;

means comprising combinatorial logic coupled to receive said first input signal pair, said second input signal pair and said exponent difference signal for selecting, in accordance with said exponent difference signal, between said first input signal pair and said second input signal pair to produce a reference signal pair comprising a greater exponent signal;

means which comprises combinatorial logic coupled to receive said exponent difference signal for negatively rectifying to produce a negative signal comprising a magnitude equal to a magnitude of said exponent difference signal;

means coupled to receive said negative signal and a bias which comprises a base-a logarithmic function of a base-a logarithmic function of a Napierian constant for adding to produce a biased negative signal;

said function generator coupled to receive said biased negative signal to produce a first function signal;

means comprising combinatorial logic coupled to receive said first input sign signal, said second input sign signal and said first function signal for attaching a first sign polarity to said first function signal to produce a signed first function signal;

means coupled to receive said signed first function signal and an exponent signal of said reference signal pair for adding to produce said output exponent signal conditionally comprising a base-a logarithmic function of a magnitude of said output aE-FLP sum;

means coupled to receive a sign signal of said reference signal pair for routing to produce said output sign signal; and means coupled to receive said output sign signal and said output exponent signal for associating to produce said output signal pair and thus conditionally to produce said output aE-FLP sum.

27. The machine instruction apparatus of claim 26 wherein said sign attaching means and said adding means to produce said output exponent signal are replaced by:

means coupled to receive said function signal for scaling by one half to produce a half function signal;

means comprising combinatorial logic coupled to receive said first input sign signal, said second input sign signal and said half function signal for attaching a first sign polarity to said half function signal to produce a signed half function signal;

means coupled to receive said signed half function signal and said biased negative signal for adding to produce a corrected biased negative signal;

second function signal generator coupled to receive said corrected biased negative signal to produce a corrected function signal;

means which comprises combinatorial logic coupled to receive said first input sign signal, said second input sign signal and said corrected function signal for attaching a second sign polarity to said corrected function signal to produce a signed corrected function signal; and means coupled to receive said signed corrected function signal and an exponent signal of said reference signal pair for adding to produce said output exponent signal.

* * * * *